United States Patent
Sisto

(10) Patent No.: US 11,054,083 B2
(45) Date of Patent: *Jul. 6, 2021

(54) SUPPORT ASSEMBLY

(71) Applicant: Salto, LLC, Philadelphia, PA (US)

(72) Inventor: Salvatore Sisto, East Brunswick, NJ (US)

(73) Assignee: SALTO LLC

( * ) Notice: Subject to any disclaimer, the term of this patent is extended or adjusted under 35 U.S.C. 154(b) by 0 days.

This patent is subject to a terminal disclaimer.

(21) Appl. No.: 16/528,788

(22) Filed: Aug. 1, 2019

(65) Prior Publication Data

US 2019/0353300 A1  Nov. 21, 2019

Related U.S. Application Data

(63) Continuation-in-part of application No. 15/877,938, filed on Jan. 23, 2018, now Pat. No. 10,393,311, which is a continuation of application No. 14/934,429, filed on Nov. 6, 2015, now Pat. No. 9,874,309, which is a continuation-in-part of application No. 16/231,660, filed on Dec. 24, 2018, now Pat. No. 10,506,878.

(60) Provisional application No. 62/609,713, filed on Dec. 22, 2017.

(51) Int. Cl.
| | | |
|---|---|---|
| *F16M 13/02* | (2006.01) | |
| *A47K 17/02* | (2006.01) | |
| *A47B 96/02* | (2006.01) | |
| *A47K 3/12* | (2006.01) | |

(52) U.S. Cl.
CPC ......... *F16M 13/025* (2013.01); *A47B 96/022* (2013.01); *A47K 3/125* (2013.01); *A47K 17/022* (2013.01)

(58) Field of Classification Search
CPC ... F16M 13/025; A47K 17/022; A47B 96/022
USPC ............... 248/297.21, 220.1, 222.14, 251
See application file for complete search history.

(56) References Cited

U.S. PATENT DOCUMENTS

| | | | |
|---|---|---|---|
| 1,286,588 A | * | 12/1918 | Goodykoontz ...... F16M 13/025 108/28 |
| 1,325,143 A | | 12/1919 | Conterio |
| 2,182,600 A | | 12/1939 | Spetz et al. |
| 2,338,310 A | | 1/1944 | Barnes |
| 3,260,021 A | | 7/1966 | Katz |
| 3,580,397 A | | 5/1971 | Triplett |
| 3,891,091 A | | 6/1975 | Anderson |
| 3,901,389 A | | 8/1975 | Belokin, Jr. |

(Continued)

FOREIGN PATENT DOCUMENTS

| | | | | |
|---|---|---|---|---|
| DE | 19848697 | | 4/2000 | |
| JP | 2004332404 | | 11/2004 | |
| JP | 2004332404 A | * | 11/2004 | ........... A47K 17/022 |

*Primary Examiner* — Muhammad Ijaz
(74) *Attorney, Agent, or Firm* — Belles Katz LLC

(57) ABSTRACT

A support assembly that includes a structural member that is delimited by a first end and a second end with a first end cap configured to be at least partially disposed within the first end of the structural member and a second end cap configured to be at least partially disposed within the second end of the structural member to mount the structural member to a structure. The support assembly allows for forces to be applied in all directions without causing rotation or disengagement of the support assembly from a mounting structure.

17 Claims, 46 Drawing Sheets

(56) References Cited

U.S. PATENT DOCUMENTS

| | | |
|---|---|---|
| 4,022,327 A | 5/1977 | Anderson |
| 4,102,529 A | 7/1978 | Neblung et al. |
| D252,004 S | 6/1979 | Leventhal |
| D253,802 S | 1/1980 | Loud et al. |
| 4,220,316 A | 9/1980 | Naka et al. |
| 4,653,714 A * | 3/1987 | Andrasko, Jr. ......... F16B 9/058 248/251 |
| 4,795,038 A | 1/1989 | Johnson et al. |
| 5,042,766 A | 8/1991 | Baker |
| 5,154,384 A | 10/1992 | Owens |
| 5,193,786 A | 3/1993 | Guenther |
| 5,197,612 A | 3/1993 | Thomson |
| 5,469,682 A | 11/1995 | Knight |
| 6,126,256 A | 10/2000 | Doces, II |
| D433,632 S | 11/2000 | Bender |
| 6,283,566 B1 | 9/2001 | Doces |
| 6,361,129 B1 | 3/2002 | Borgen et al. |
| 6,386,518 B1 | 5/2002 | Shreiner |
| 6,463,754 B1 | 10/2002 | Matesanz |
| 6,763,956 B2 | 7/2004 | Woods |
| 7,080,743 B1 | 7/2006 | Wolseth |
| 7,195,125 B1 | 3/2007 | Wolseth |
| 7,441,668 B2 | 10/2008 | O'Malley |
| D635,809 S * | 4/2011 | O'Brien ......................... D6/562 |
| 8,033,402 B1 | 10/2011 | Bevis |
| 8,070,137 B2 | 12/2011 | Bennet |
| 8,839,980 B2 | 9/2014 | Baines |
| 9,763,515 B2 | 9/2017 | Fratilla et al. |
| 2003/0209642 A1 * | 11/2003 | Fontana ................. A63B 29/00 248/231.91 |
| 2004/0089621 A1 | 5/2004 | Gangloff |
| 2005/0082242 A1 | 4/2005 | Hurst |
| 2008/0179476 A1 * | 7/2008 | McGinness ......... E04F 11/1804 248/220.21 |
| 2011/0155880 A1 | 6/2011 | Stimpson |
| 2012/0286117 A1 * | 11/2012 | Leary ................. E04F 11/1812 248/251 |

* cited by examiner

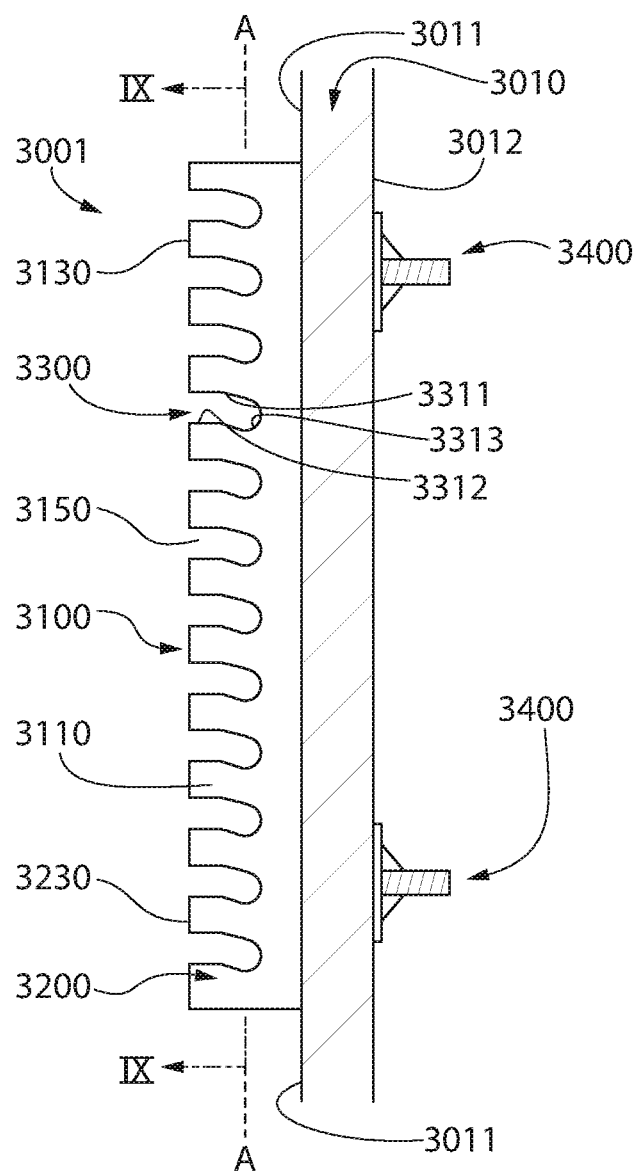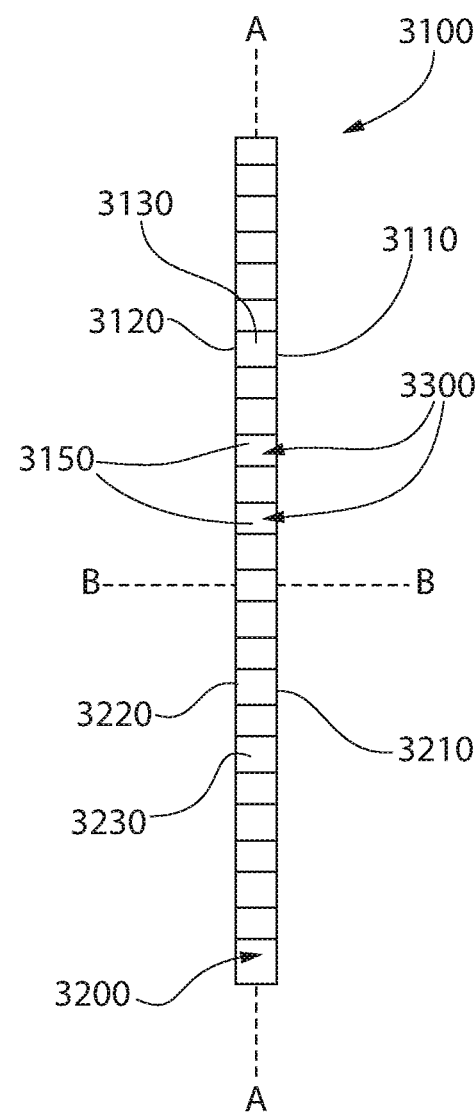
FIG. 34  FIG. 35
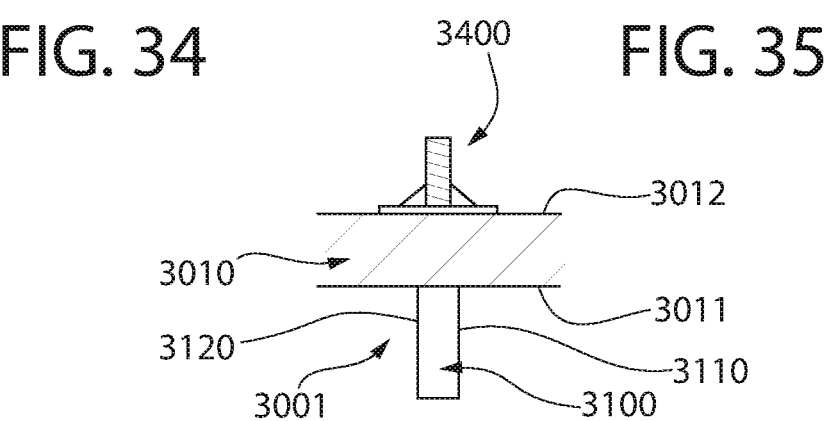
FIG. 36

SUPPORT ASSEMBLY

CROSS-REFERENCE TO RELATED APPLICATIONS

This application is a continuation-in-part of U.S. patent application Ser. No. 15/877,938, filed Jan. 23, 2018, which is a continuation of U.S. patent application Ser. No. 14/934,429, filed Nov. 6, 2015.

This application is also a continuation-in-part of U.S. patent application Ser. No. 16/231,660, filed Dec. 24, 2018, which claims priority to U.S. Provisional Patent Application Ser. No. 62/609,713, filed Dec. 22, 2017.

The entireties of the aforementioned applications are hereby incorporated herein by reference.

BACKGROUND

The present invention relates generally to a supporting structure and more particularly to a support assembly that is mountable between two converging structures.

Support assemblies that are mountable in a corner of a room between two converging walls are known. These support assemblies, such as footrests, grab bars, and shelving systems are commonly used, for example, in household showers, locker rooms, spas and the like. However, existing support assemblies do not allow for any significant force to be applied thereon without the support assembly rotating and/or becoming disengaged from a fixed position. As such, an individual can be severely injured due to the limited force that can safely sustained by known support assemblies.

Further, the present application also relates to racks for removable storage of containers in the form of bottles such as wine or other bottles.

Numerous types of racks are available for storage and display of containers such as wine or other bottles. Some storage racks are complex structures with many different components or parts, which are visually unattractive and more utilitarian in nature rather than ornamental. It is desirable to provide a container storage rack which combines the utilitarian aspects of the rack with a visually attractive and simple appearance that is aesthetically pleasing for displaying the containers in a public or private space.

BRIEF SUMMARY

The present invention is directed to a support assembly that allows for significant forces to be applied in all directions without causing rotation or disengagement of the support assembly from a mounting structure. This is because, as will be described in more detail below, the end caps of the support assembly are not mounted in parallel to each other. As a result, the rotational axes of the end caps contrast each other and in turn stabilize a structure extending between and from the end caps. Moment forces only exist in the area of the structure that exceeds the axes of the end caps. As such, the moment forces are minimized and the torsion forces are negated by opposing each other resulting in an assembly that is stable and does not rotate upon a force being applied thereto.

In one aspect, the invention may be a support assembly comprising: a first end cap configured to be coupled to a first support surface; a second end cap configured to be coupled to a second support surface that is substantially perpendicular to the first support surface; each of the first and second end caps comprising a block element; a support member comprising a first end face and a second end face, the first end face lying in a first plane and the second end face lying in a second plane that is substantially perpendicular to the first plane; a first slot formed into the first end face of the support member and a second slot formed into the second end face of the support member; and wherein the support member is coupled to the first and second end caps so that the block element of the first end cap is positioned within the first slot and the block element of the second end cap is positioned within the second slot to mount the support member from the first and second support surfaces.

In another aspect, the invention may be a support assembly comprising: a support member extending along a first axis and comprising a first end oriented at a first angle that is oblique relative to the first axis and a second end oriented at a second angle that is oblique relative to the first axis; a first end cap being mountable to a first support surface, the first end cap comprising a first body having a front surface and a rear surface and a first block element extending from the front surface; and a second end cap being mountable to a second support surface that is substantially perpendicular to the first support surface, the second end cap comprising a second body having a front surface and a rear surface and a second block element extending from the front surface; and wherein the support member is mounted to the first and second end caps with the first block element of the first end cap disposed within the first end of the support member and the second block element of the second end cap is disposed within the second end of the support member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 34 is side view of the rack apparatus of FIG. 33 in the installed state;

FIG. 35 is a front view of the rack apparatus of FIG. 33;

FIG. 36 is a top view of the rack apparatus of FIG. 33 in the installed state;

DETAILED DESCRIPTION

Figure 1:
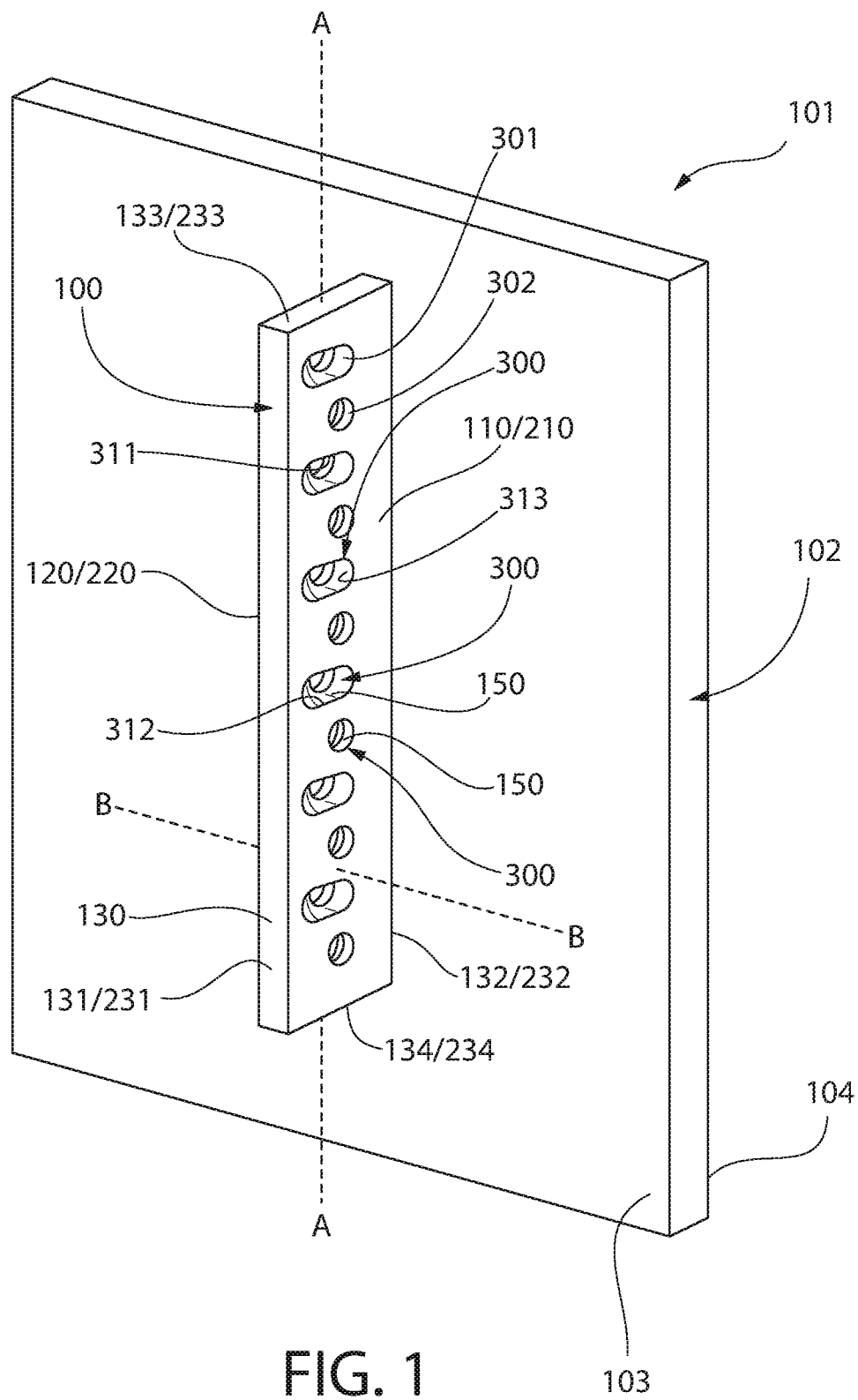
FIG. 1 is perspective view of a rack apparatus in an installed state on a support structure according an embodiment of the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value.

Referring now to FIGS. 1-4 and 6, the present invention includes a storage system 101 that comprises a support structure 102, a vertically oriented storage rack apparatus 100 (or "storage rack" or "rack" for brevity) coupled to the support structure, and at least one fastener 400. The rack apparatus 100 may be coupled to the support surface 102 by the at least one fastener 400—herein referred to as the "installed-state." In preferred embodiments, at least two vertically spaced fasteners are provided. In the installed-state, the rack apparatus 100 may be used to support and store one or more containers 500—herein also referred to as the "in-use state." The term "container" is used synonymously and interchangeably with the term "bottle" also referred to herein. Non-limiting examples of containers/bottles 500 include alcoholic and non-alcoholic beverage containers (e.g., wine bottles, etc.), as well as other non-beverage liquid containers (e.g. olive oil, etc.).

In a non-limiting embodiment, the support structure 102 may be a preferably rigid wall having an outer surface 103 that is opposite an inner surface 104. The outer surface 103 may face a room environment (i.e., the interior of a kitchen, restaurant, or the like) and the inner surface 104 may face a partition space or outer superstructure of a building (i.e., voids between adjacent dry wall boards and laterally spaced framing boards). Non-limiting examples of the wall may include dry-wall, gypsum board, plywood, and the like. The wall may optimally have a vertical orientation in one embodiment; however, the rack 100 may be used with a wall oriented at an acute angle to a vertical reference plane between 0 and 90 degrees.

The rack apparatus 100 may be vertically elongated in structure and oriented when installed on wall 102 comprising a first side or lateral major surface 110 that is opposite a second side or lateral major surface 120, and a plurality of side surfaces 130 that extend between the first and second major surfaces 110, 120. The major surfaces may be substantially parallel to each other and planar/flat in one embodiment as shown. In other possible configurations, the major surfaces may be arranged at an acute angle to each other. When facing the support surface wall 102, the first major surface 110 may be considered a left lateral major surface and the second major surface 120 may be considered a right lateral major surface for convenience of reference. The plurality of side surfaces 130 of rack apparatus 100 may collectively define a perimeter of each of the first major surface 110 and the second major surface 110.

The plurality of side surfaces 130 of rack apparatus 100 may comprise a first vertical front side surface 131 facing away from support structure 102 (e.g. wall) that is opposite a second vertical rear side surface 132 facing the support structure. The plurality of side surfaces 130 of rack apparatus 100 may further comprise an upward facing top surface 133 that is opposite a downward facing bottom surface 134. The first vertical side surface 131 of rack apparatus 100 may intersect the top surface 133 and the bottom surface 134 of rack apparatus 100. The second vertical side surface 132 may intersect the top surface 133 and the bottom surface 134 of rack apparatus 100. The first vertical side surface 131 and the second vertical side surface 132 of rack apparatus 100 may be substantially parallel. The top surface 133 and the bottom surface 134 of rack apparatus 100 may be substantially parallel.

The rack apparatus 100 may be elongated (i.e. length greater than lateral width and front-rear depth) such that the first and second major surfaces 110, 120 of the rack apparatus 100 extend along and substantially parallel to a longitudinal axis A-A, which defines a vertical centerline of the rack equally spaced between front and rear side surfaces and right and left lateral surfaces. The first vertical side surface 131 and the second vertical side surface 132 may extend along the longitudinal axis A-A. The longitudinal axis A-A may intersect the top surface 133 and the bottom surface 134. The rack apparatus 100 may further comprise a transverse axis B-B that extends perpendicular to the longitudinal axis A-A, whereby the transverse axis B-B intersects both the first and second major surface 110, 120 of the rack apparatus 100.

In the installed state, the second vertical rear surface 132 may face the outer surface 103 of the support structure 102. As discussed in greater detail herein, in the installed-state the fastener 400 may extend from the second vertical side surface 132 of the rack apparatus 100 and through the support structure 10. The second vertical side surface 132 of the rack apparatus 100 may abut and directly contact the outer surface 103 of the support structure 102. In the installed state, the first and second major surfaces 120 may be oriented in a direction that is substantially orthogonal to the outer surface 103 of the support structure 102.

Figure 22A:
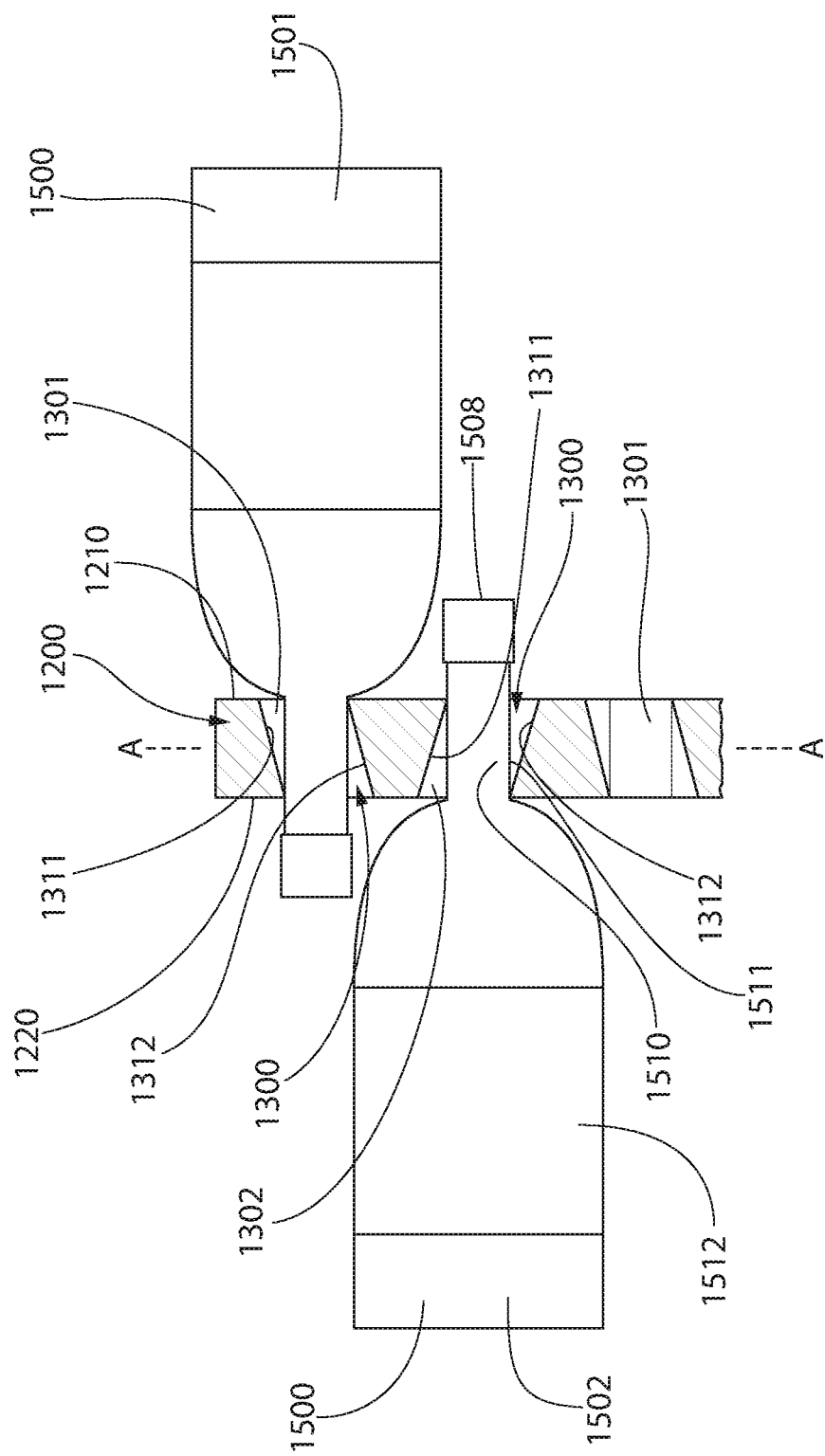
FIG. 22A is a close-up cross-sectional view of the rack apparatus along line VII-VII of FIG. 18 before insertion of a bottle.
Figure 22B:
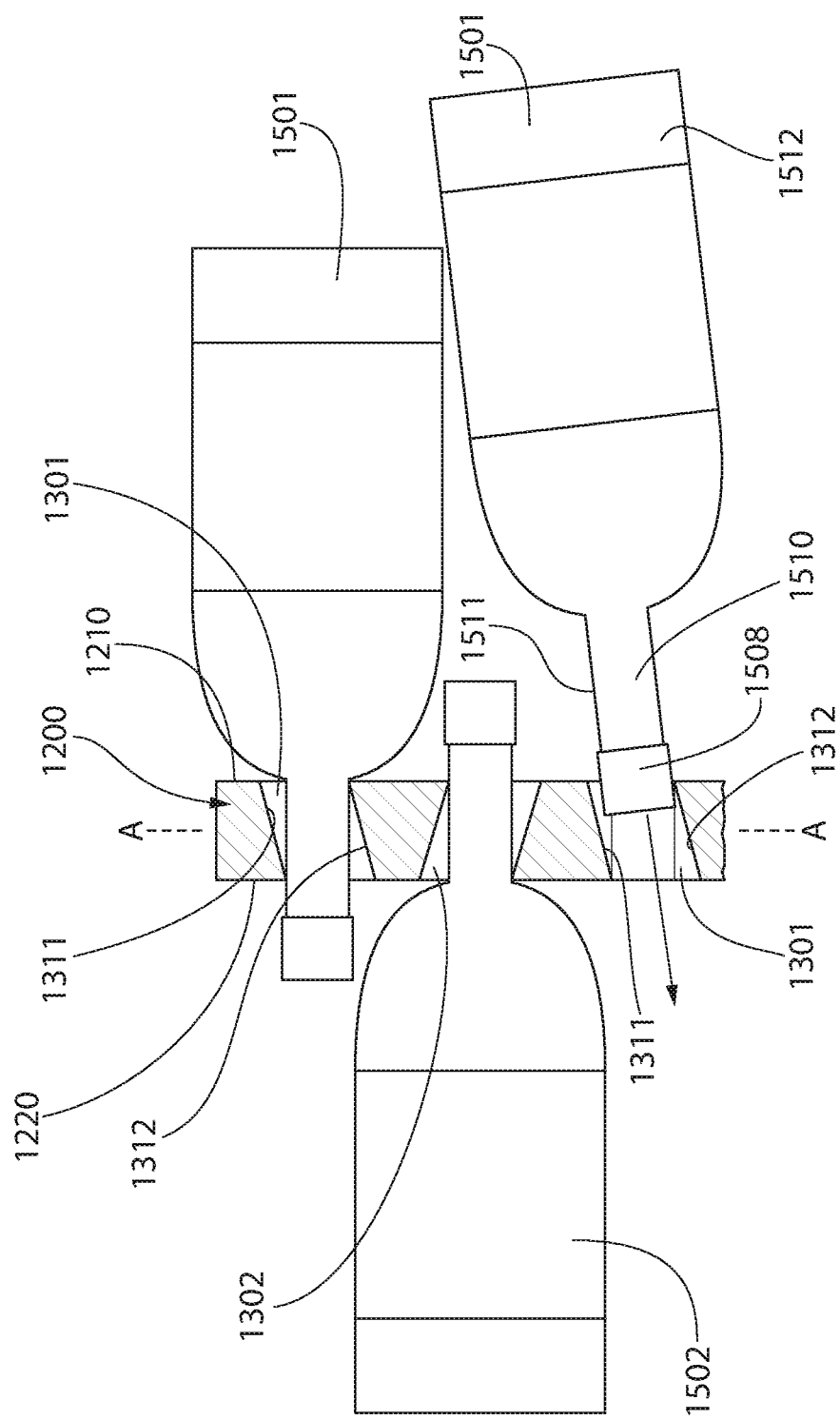
FIG. 22B is the close-up cross-sectional view of FIG. 22A during insertion of the bottle.
Figure 22C:
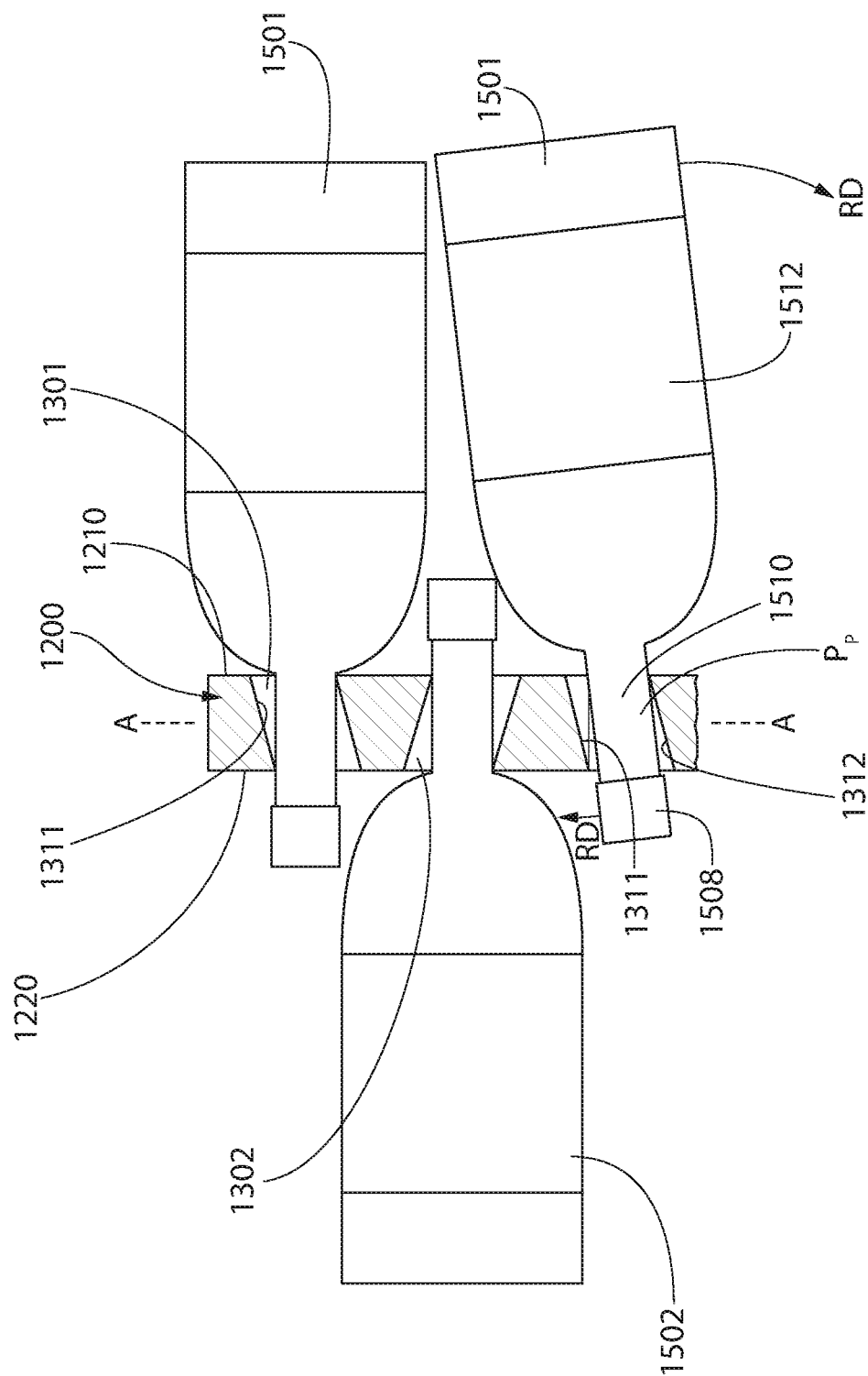
FIG. 22C is the close-up cross-sectional view of FIG. 22A during insertion of the bottle.
Figure 22D:
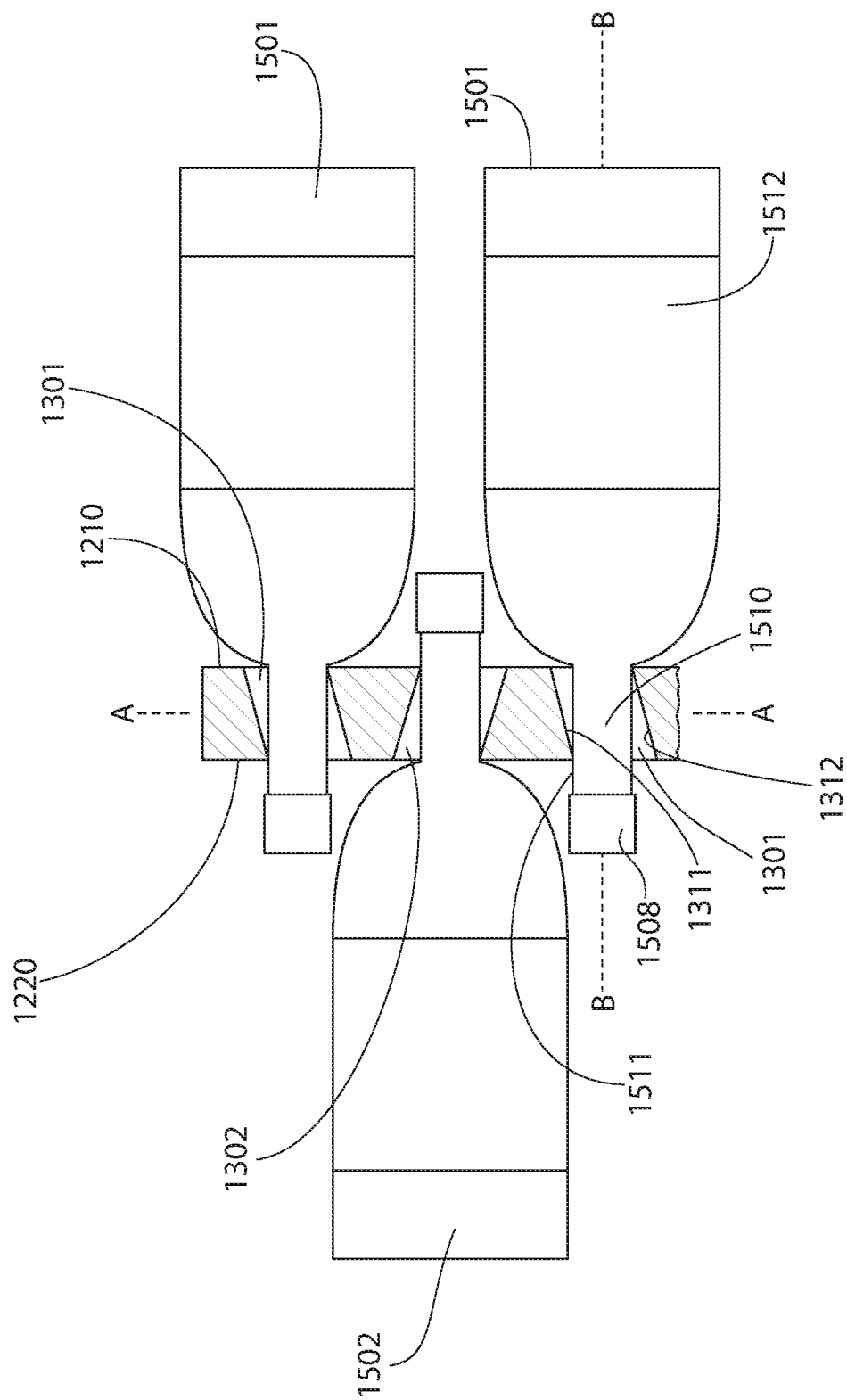
FIG. 22D is the close-up cross-sectional view of FIG. 22A after insertion of the bottle into the in-use state.
Figure 23:
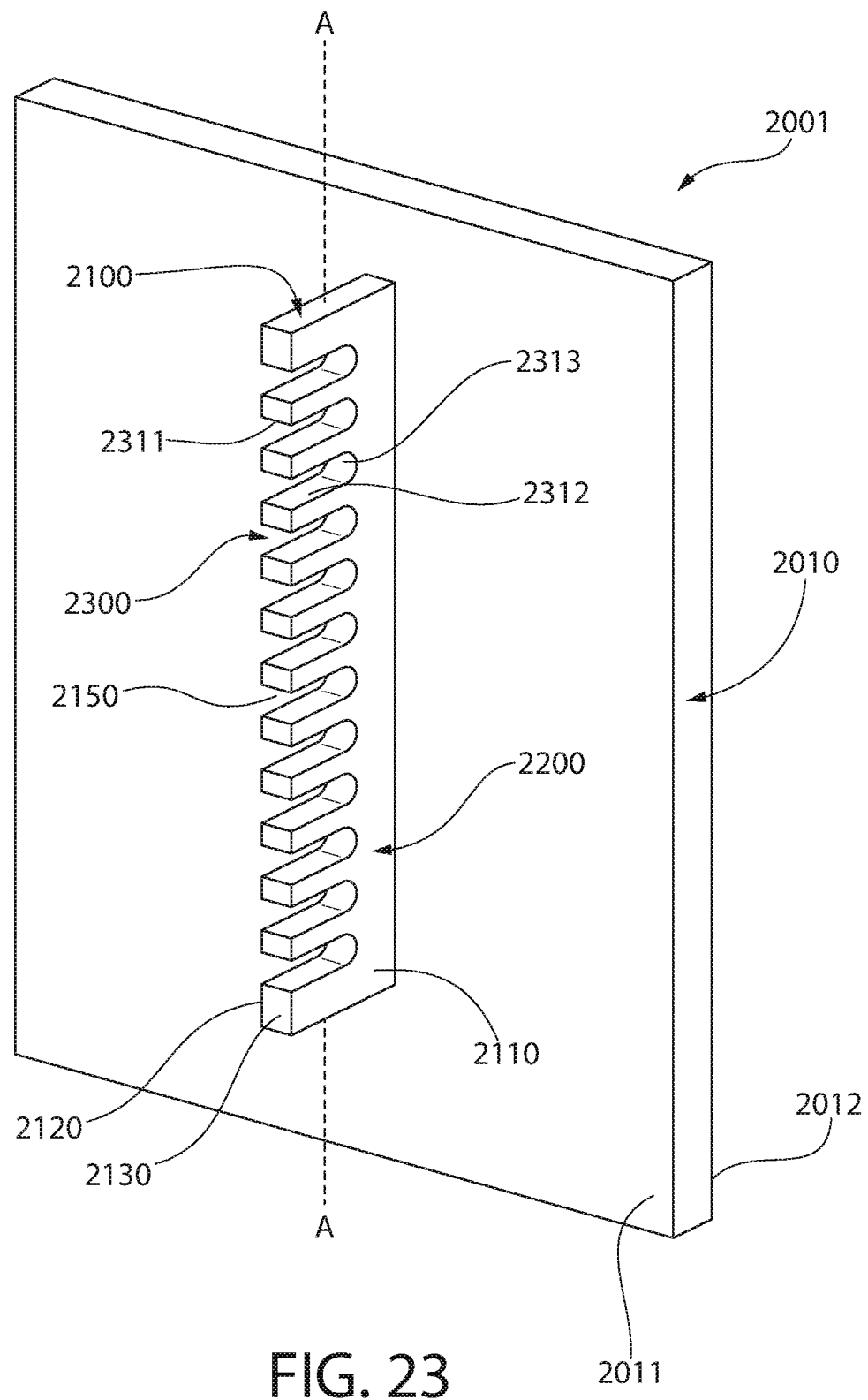
FIG. 23 is perspective view of a rack apparatus in an installed state according a third embodiment of the present invention.
Figure 24:
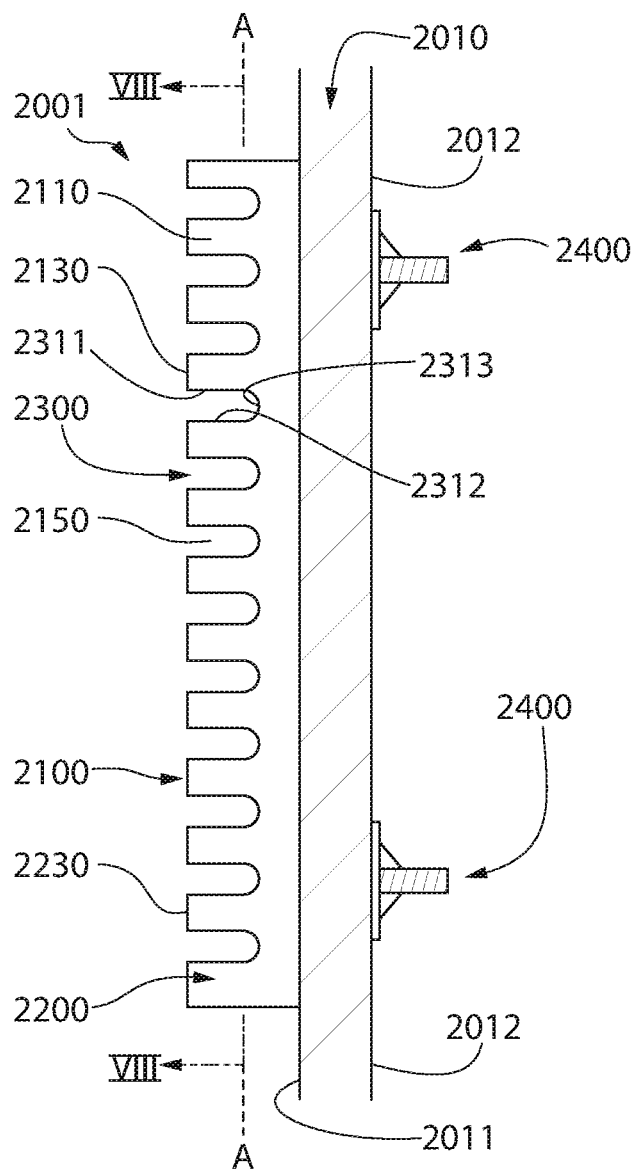
FIG. 24 is side view of the rack apparatus of FIG. 23 in the installed state.
Figure 25:
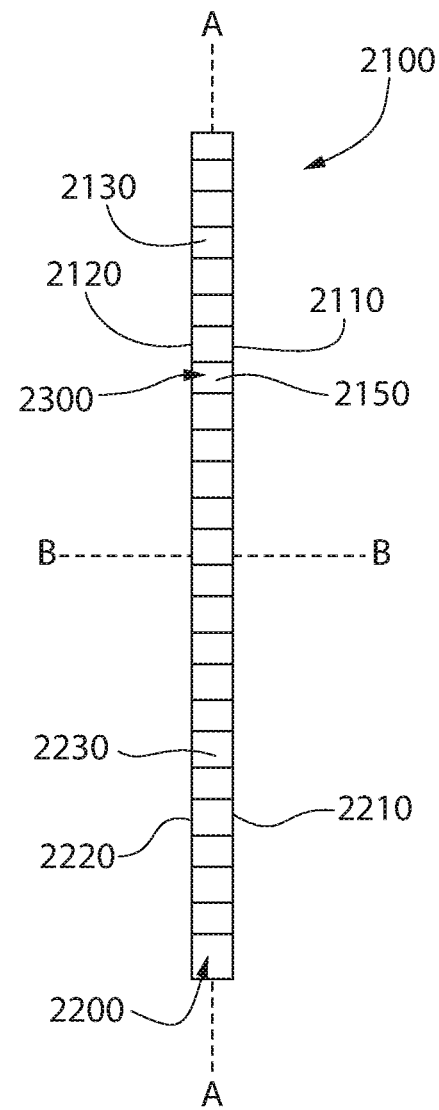
FIG. 25 is a front view of the rack apparatus of FIG. 23.
Figure 26:
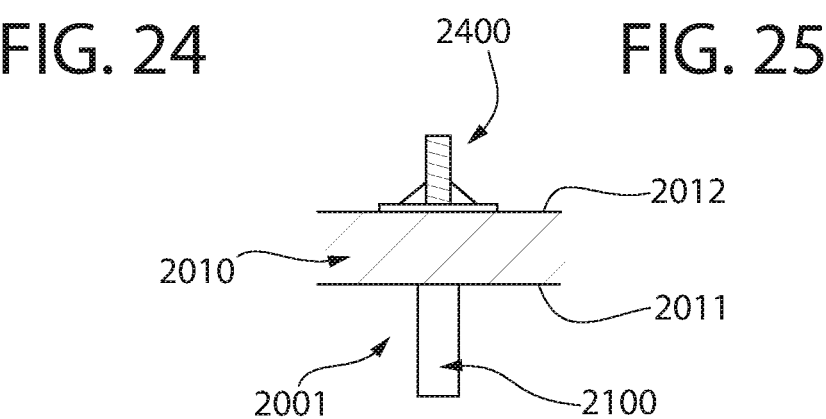
FIG. 26 is a top view of the rack apparatus of FIG. 23 in the installed state.
Figure 27:
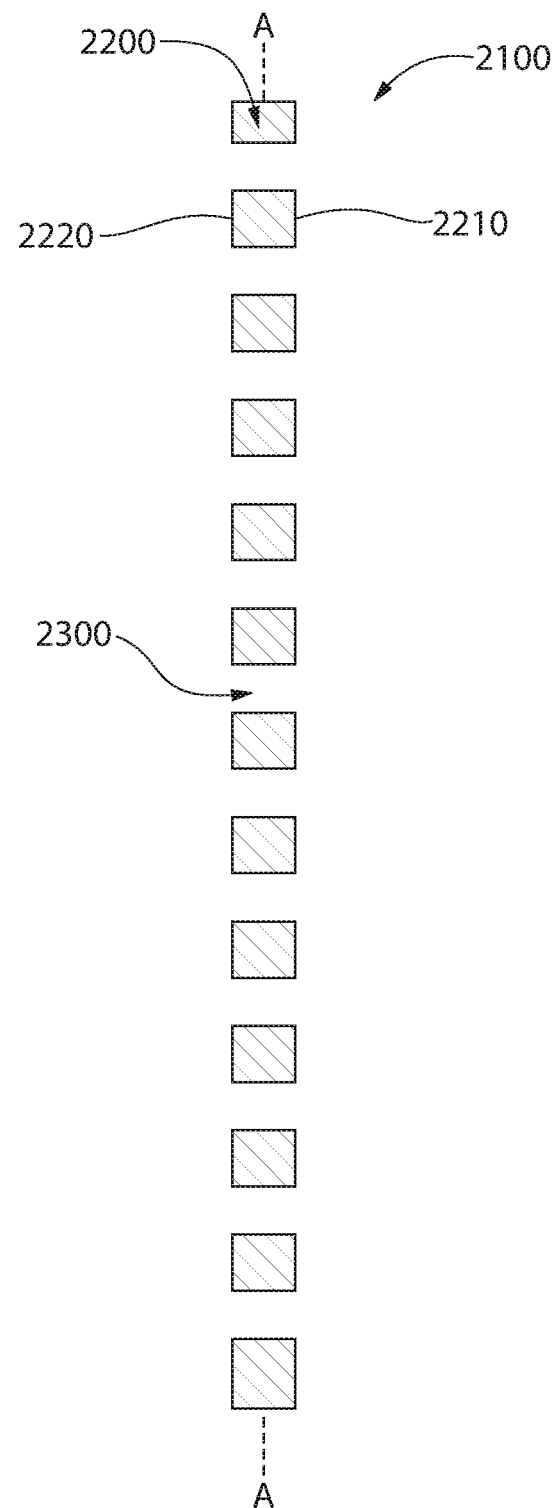
FIG. 27 is a cross-sectional view of the rack apparatus along line VIII-VIII of FIG. 24.
Figure 28:
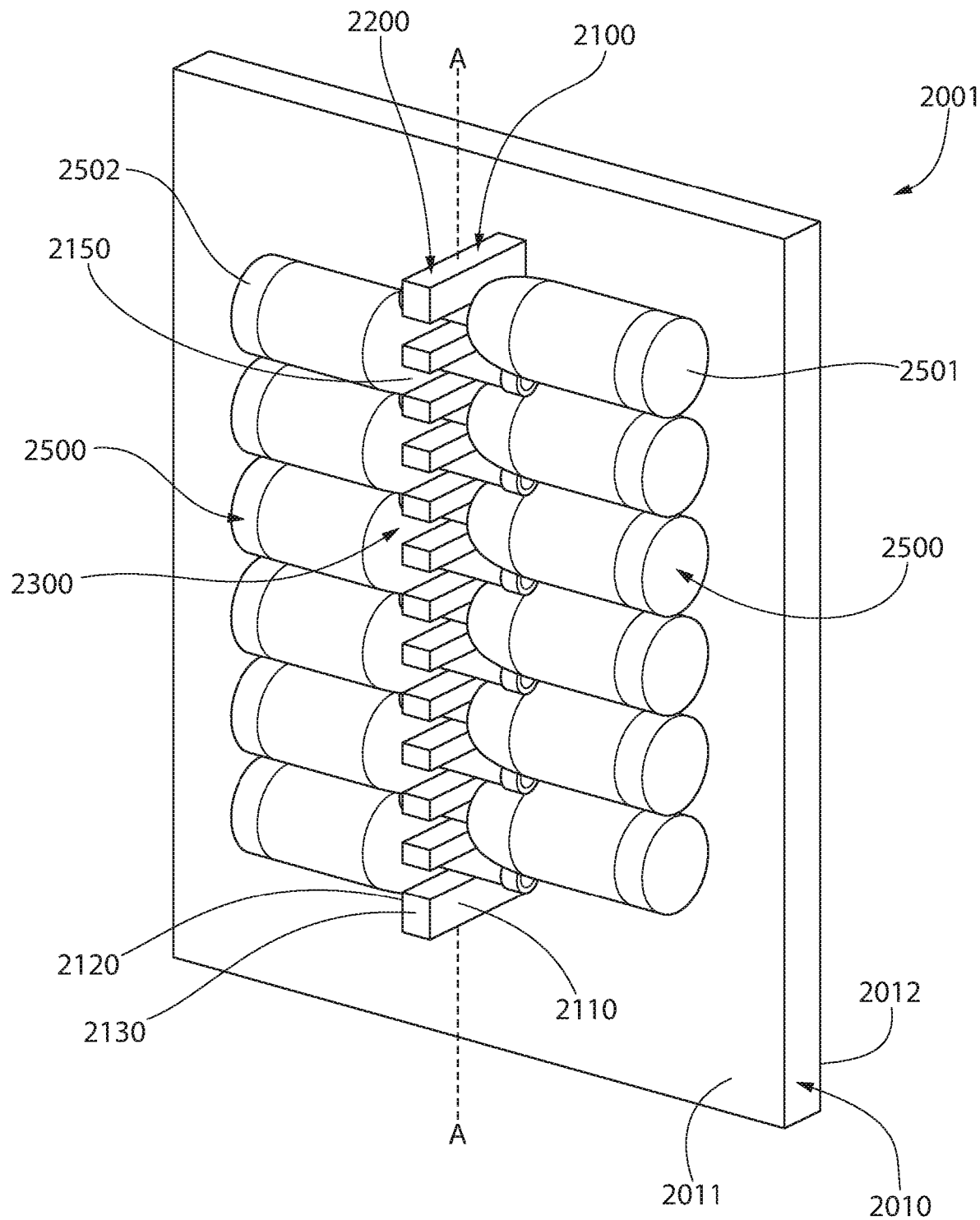
FIG. 28 is a perspective view of the rack apparatus of FIG. 23 in an in-use state.
Figures 29, 30:
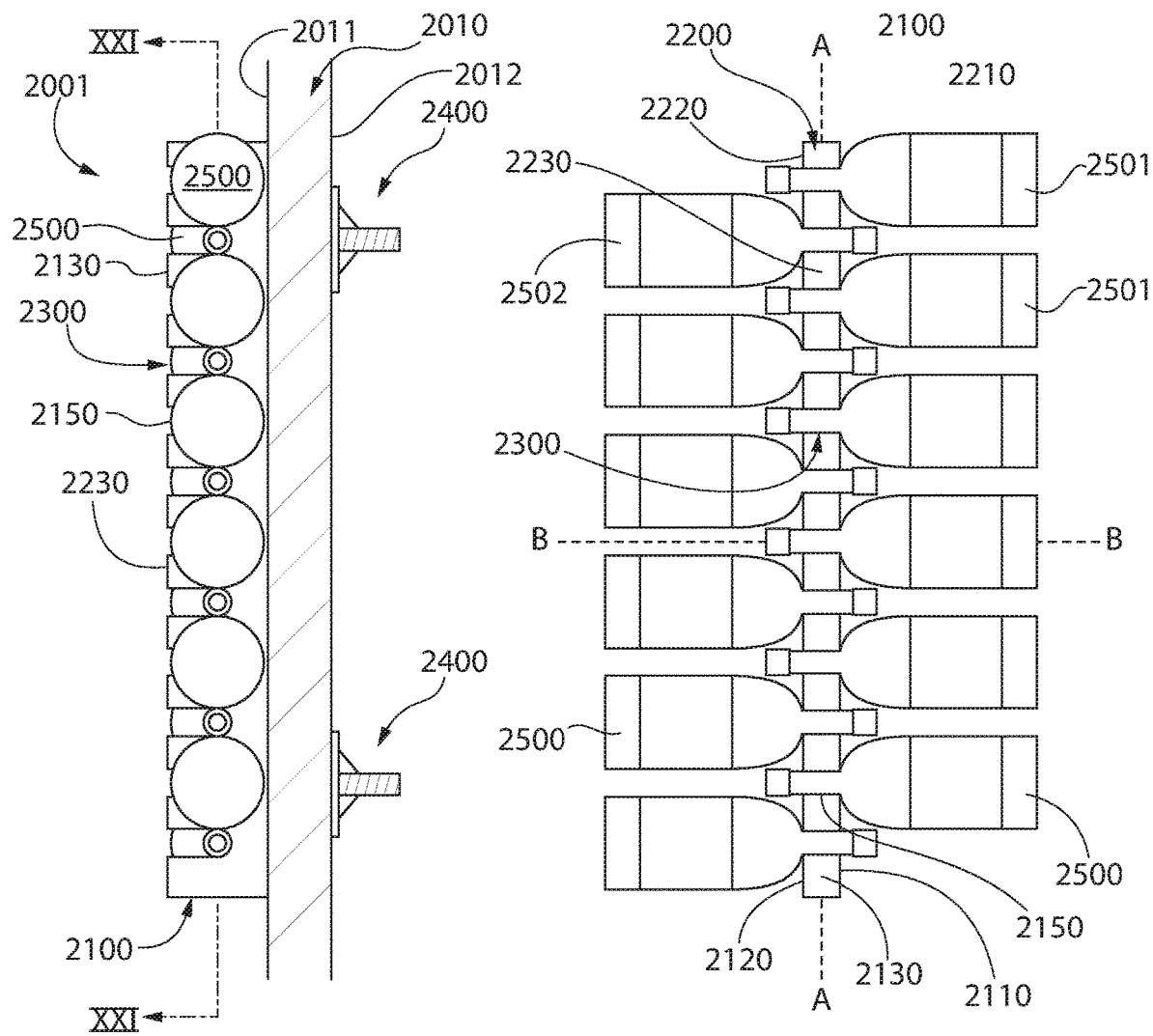
FIG. 29 is side view of the rack apparatus of FIG. 28 in the in-use state.
FIG. 30 is a front view of the rack apparatus of FIG. 28 in the in-use state.
Figure 31:
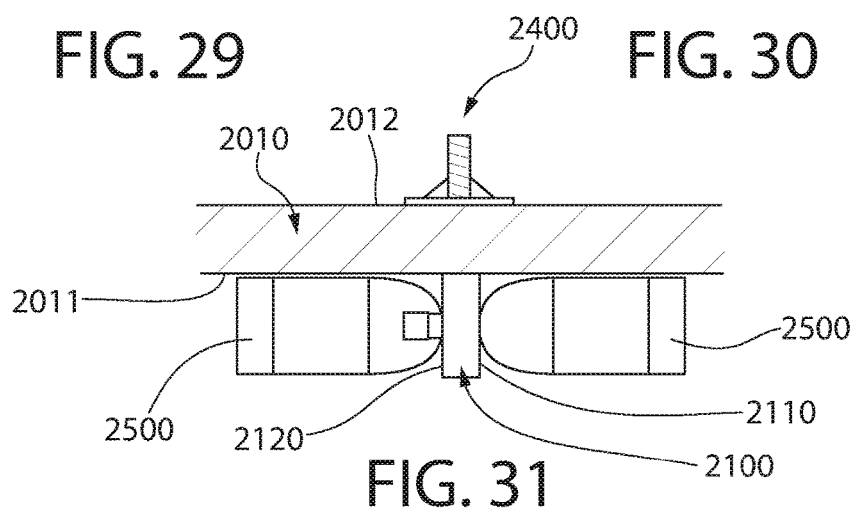
FIG. 31 is a top view of the rack apparatus of FIG. 28 in the in-use state.
Figure 32:
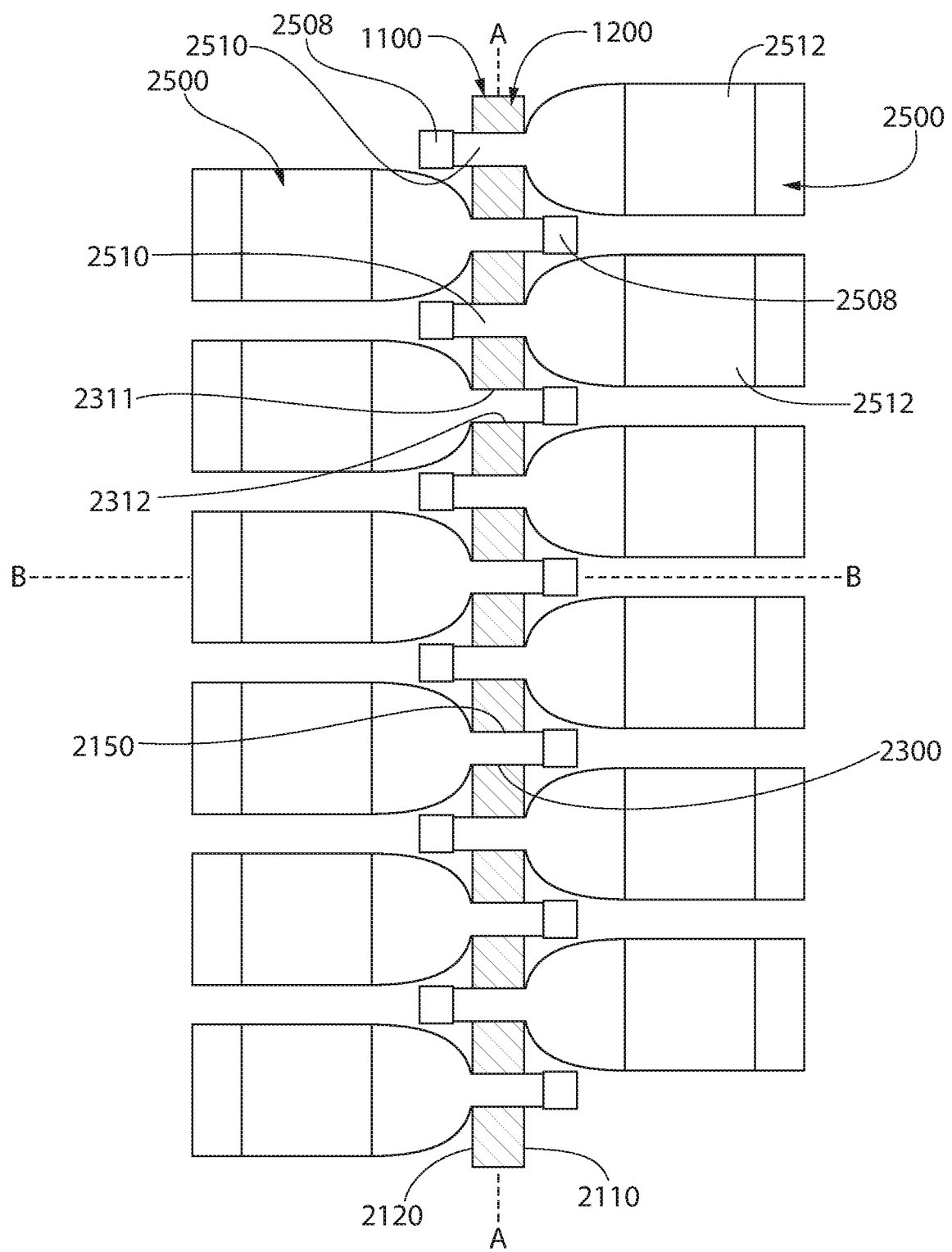
FIG. 32 is a cross-sectional view of the rack apparatus in the in-use state along line XXI-XXI of FIG. 29.

The body 200 of rack apparatus 100 comprises a plurality of vertically spaced apart container-mounting apertures 300 extending through and between major surfaces 110 and 120, as further described herein. The apertures are used to support the containers 500 from rack 100. In the embodiment of FIGS. 1-11, the mounting apertures 300 each define an aperture centerline CL which is oriented parallel to transverse axis B-B and perpendicular to longitudinal axis A-A (see, e.g. FIG. 5). In other embodiments, the mounting embodiments may be obliquely angled both the transverse and longitudinal axes (see, e.g. FIGS. 22A-B).

The rack apparatus 100 further comprises a plurality of container mounting features 150. These features include through passageways 150-1 defined by the mounting apertures 300 that extend from and through the first major surface 110 to the second major surface 120. As discussed in greater detail herein, the passageways 150-1 formed by each of the mounting features 150 may extend continuously from the first major surface 110 to the second major surface 120 to create an open channel there-between for inserting a neck portion of the container 500 therethrough. Each passageway 150-1 formed by each mounting feature 150 extends from the first major surface 110 to the second major surface 120 along a transverse axis B-B in a direction that is transverse the longitudinal axis A-A. The plurality of passageways 150-1 are arranged in a linear array that extends vertically along the longitudinal axis A-A, whereby each passageway is offset from an adjacent passage way by a non-zero distance as measured along the longitudinal axis A-A (the term "non-zero" connoting that the distance has some measurement value greater than zero).

In some embodiments, the rack apparatus 100 may further comprise an outer layer 200-2 that surrounds at least a portion of the body 200—as discussed in greater detail herein.

The rack body 200 may comprise a lateral first major surface 210 (e.g. right side when facing support structure wall 102) that is opposite a lateral second side major surface 220 (left side), and a plurality of side surfaces 230 that extend between the first and second major surfaces 210, 220 of the body 200. The plurality of side surfaces 230 may collectively define a perimeter of each of the first major surface 210 and the second major surface 210 of the body 200. The plurality of side surfaces 230 of the body 200 may comprise a first vertical front side surface 231 that is opposite a second vertical rear side surface 232. The plurality of side surfaces 230 of the body 200 may further comprise a top surface 233 that is opposite a bottom surface 234. The first vertical side surface 231 of the body 200 may intersect the top surface 233 and the bottom surface 234 of the body 200. The second vertical side surface 232 may intersect the top surface 233 and the bottom surface 234 of the body 200. The first vertical side surface 231 and the second vertical side surface 232 of the body 200 may be substantially parallel. The top surface 233 and the bottom surface 234 of the body 200 may be substantially parallel.

It bears noting that major surfaces 110, 120 of the rack apparatus 100 correspond to major surfaces 210, 220 of the rack body 200, respectively. Similarly, side surfaces 130 of the rack apparatus 100 described above (front 131, rear 132, top 133, bottom 134) each correspond to side surfaces 230 of the rack body 200 (front 231, rear 232, top 233, bottom 234). For convenience of reference, rack body 200 defines a lateral width between right and left lateral major surfaces 210, 220 (lateral major surfaces 110, 120), a depth between front and rear side surfaces 231, 232, and a length or height between top and bottom surfaces 233, and 234.

The surfaces 210 (right), 220 (left), 231 (front), 232 (rear), 233 (top), and 234 (bottom) are defined by right, left, front, rear, top, and bottom walls of the rack body 200 corresponding to these surfaces.

The rack body 200 is elongated in one embodiment such that the first and second major surfaces 210, 220 of the body 200 extend along and substantially parallel to the longitudinal axis A-A. The first vertical side surface 231 and the second vertical side surface 232 may extend along and parallel to the longitudinal axis A-A. The longitudinal axis A-A may intersect the top surface 233 and the bottom surface 234 of the body 200. The transverse axis B-B may intersect both the first and second major surface 210, 220 of the body 200.

The body 200 is preferably rigid in construction and may be formed from a first material such as wood, metal, ceramic, rigid/hard plastic, or a composite material (e.g. plywood, MDF, etc.) as some non-limiting examples. The first material may be rigid and have a first hardness. In a non-limiting example, the body 200 is formed from wood. In a non-limiting example, the body 200 may be formed from metal. The body 200 may be provided as a board or plank shaped piece of material, whereby the mounting apertures 300 are formed by cutting material from the board and/or plank. Non-limiting examples of cutting include drilling, CNC routing, and the like.

According to some embodiments, the first major surface 110 of the rack apparatus 100 may be formed from the body 200 such that the first major surface 110 comprises at least a portion of the first major surface 210 of the body 200. According to some embodiments, the second major surface 120 of the rack apparatus 100 may be formed from the body 200 such that the second major surface 120 may comprise at least a portion of the second major surface 220 of the body 200. According to some embodiments, the plurality of side surfaces 130 of the rack apparatus 100 may be formed from the body 200 such that at least one of the plurality of side surfaces 130 comprises at least a one of the plurality of side surfaces 230 of the body 200.

In particular, the first vertical side surface 131 of the rack apparatus 130 may comprise the first vertical side surface 231 of the body 200. The second vertical side surface 132 of the rack apparatus 130 may comprise the second vertical side surface 232 of the body 200. The top surface 133 of the rack apparatus 130 may comprise the top surface 233 of the body 233. The bottom surface 134 of the rack apparatus 130 may comprise the bottom surface 234 of the body 233.

According to the embodiments where the rack apparatus 100 may further comprise an outer layer 200-2 (represented by dashed lines in FIG. 3) to assist with retaining the container 500 (e.g. bottle) to the rack 200. The outer layer may form at least a portion of one or more of the first major surface 110 of the rack apparatus 100, the second major surface 120 of the rack apparatus 100, and/or one of the side surfaces 130 of the rack apparatus 100. In a non-limiting example, the outer layer 200-2 may be formed from a second material that is relatively softer than the first material which forms an inner core 200-1. The second material of the outer layer 200-2 may have a second hardness, whereby the second hardness is lower than the first hardness of the core material of the rack body 200. The second material may be formed a deformable resilient material in some embodiments. Non-limiting examples of the second material include organic polymers, inorganic polymers, elastomers, rubber, and composite materials as some non-limiting examples. The second material may be selected such to provide a frictional grip on rigid and hard materials from which the container 500 (e.g. bottle) may be constructed, such as hard plastic, glass, ceramic, metal, and the like. As discussed in greater detail here, the second material may help provide an increased frictional engagement/interference fit against an outer surface 511 of a container 500—specifically the outer surface 511 of a neck portion 510 of a container 500, to retain the container in the mounting aperture 300.

Referring now generally to FIGS. 1-2, 5 and 11, as discussed, the container mounting apertures 300 of rack 100 will now be discussed in greater detail. The plurality of apertures 300 form at least a portion of the mounting features 150 of the rack apparatus 100, along with the rack walls that define the apertures. Specifically, each aperture 300 forms the through passageway 150-1 of the mounting feature 150 that extends from the first major surface 110 to the second major surface 120 of the rack apparatus 100. Each aperture 300 is formed as a "closed-geometry" completely bounded and circumscribed by aperture walls 310 all around. Accordingly, aperture 300 does not penetrate the front or rear surfaces 131, 132 of the rack 100 in the present embodiment, only the major surfaces (see, e.g. FIG. 5). Each aperture 300 thus is defined by the aperture walls 310 that extend completely through the rack body 200 from the first major surface 110 of the rack apparatus 100 to the second major surface 120 of the rack apparatus 100.

As discussed in greater detail herein, each of the plurality of apertures 300 are configured to receive a portion of the container 500, specifically the narrowed neck portion, whereby at least a portion of the aperture walls 310 are configured to contact and engage an outer surface 511 of the neck portion of the container 500, thereby supporting the container 500 in a cantilevered manner when the storage system 101 is in the in-use state.

Figure 33:
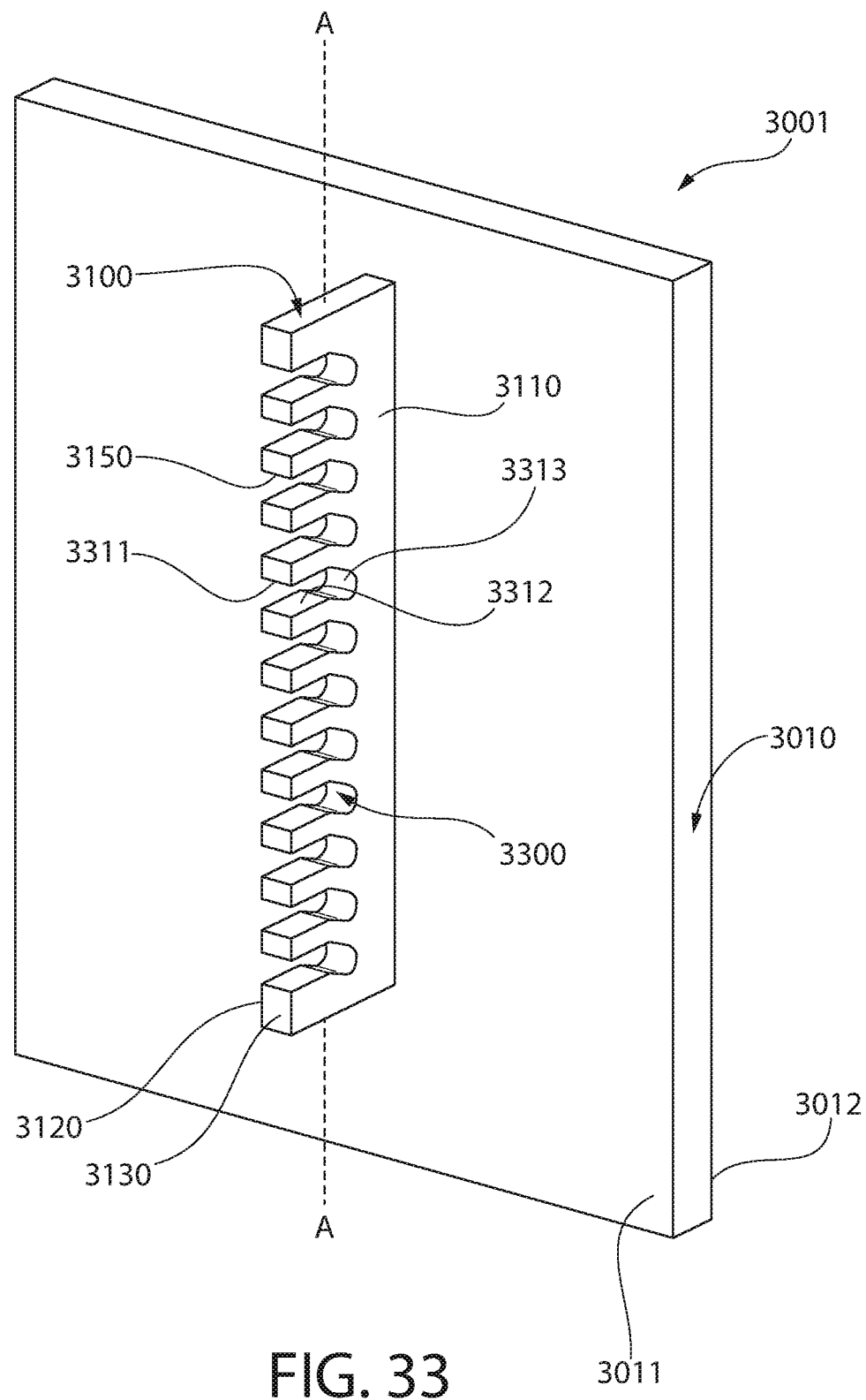
FIG. 33 is perspective view of a rack apparatus in an installed state according a fourth embodiment of the present invention.
Figure 37:
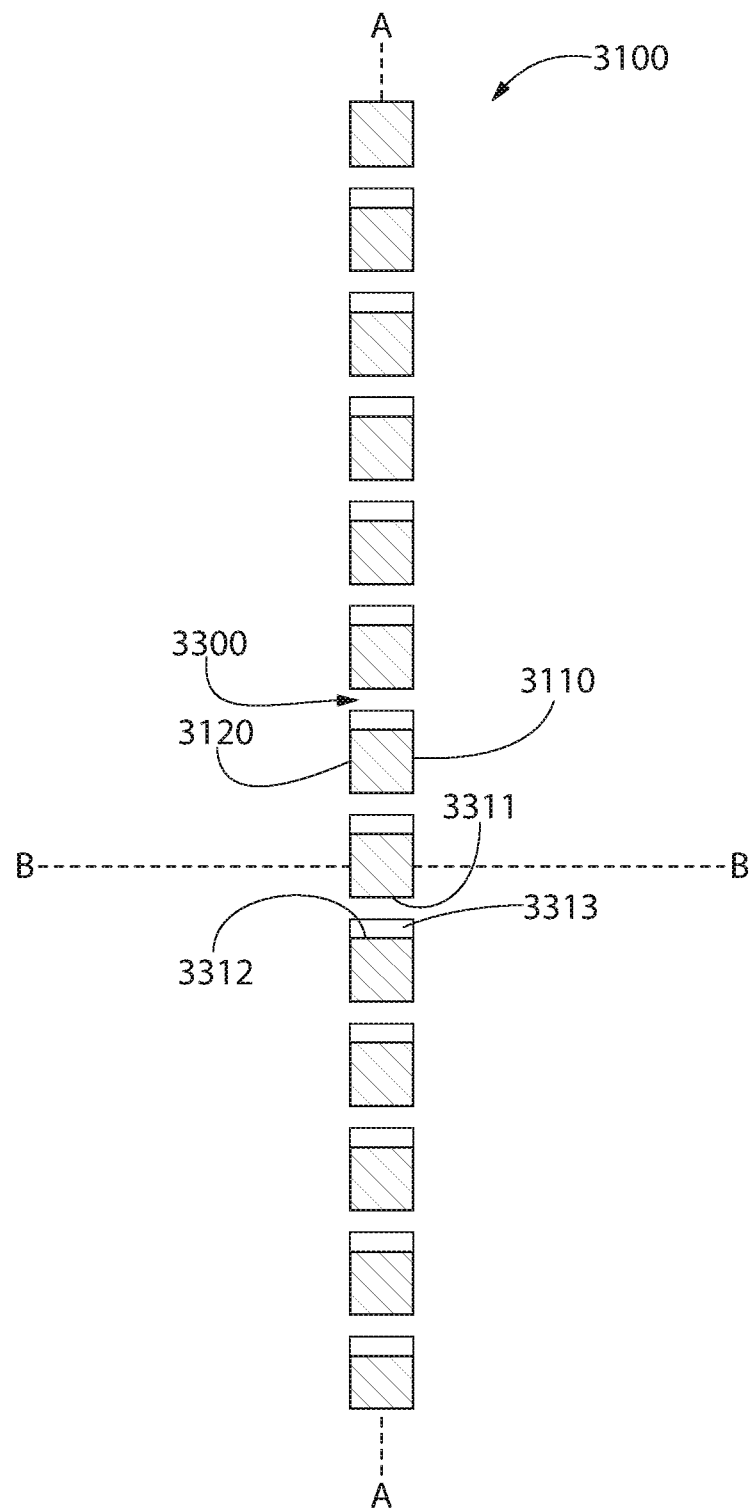
FIG. 37 is a cross-sectional view of the rack apparatus along line IX-IX of FIG. 34.
Figure 38:
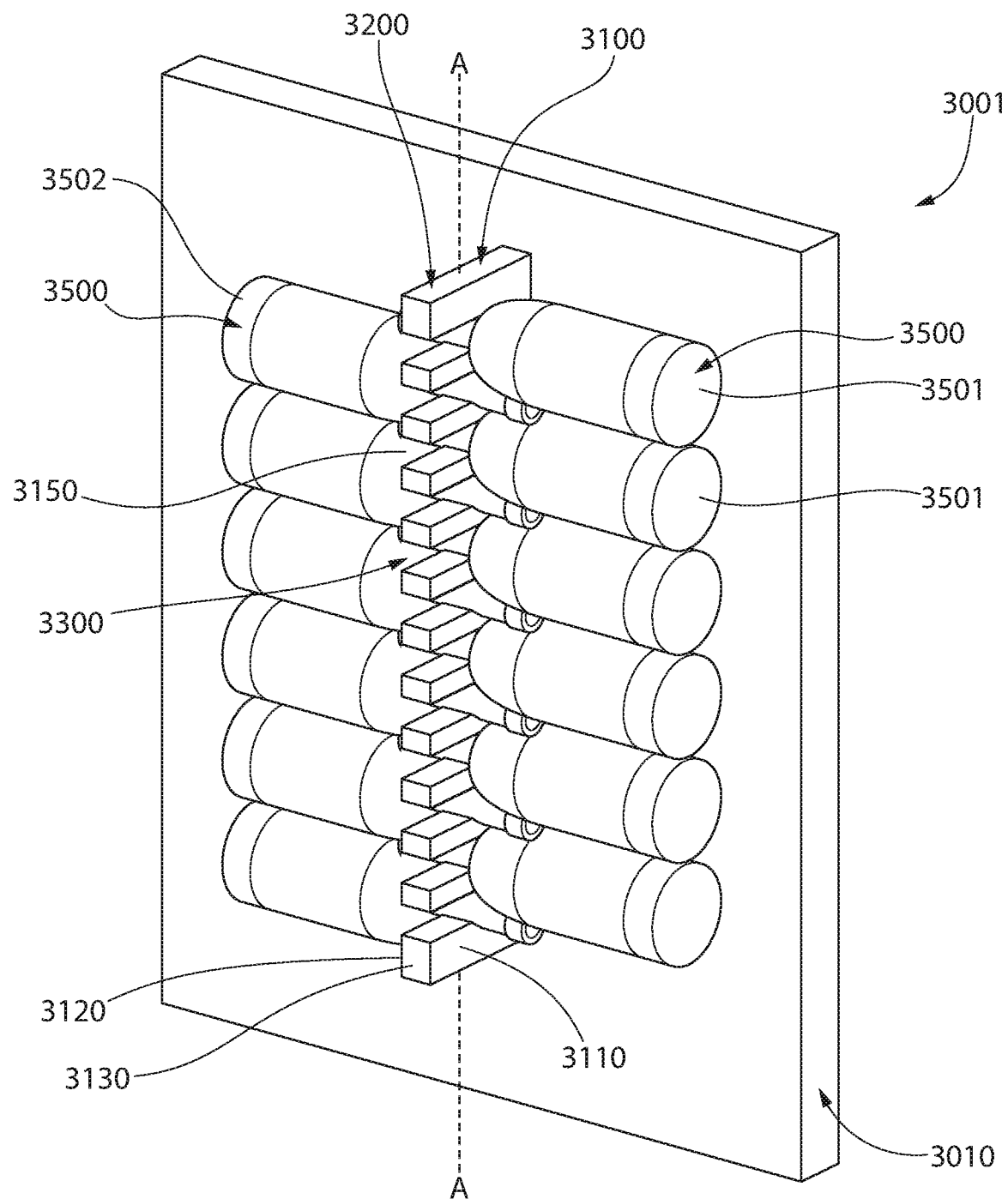
FIG. 38 is a perspective view of the rack apparatus of FIG. 33 in an in-use state.
Figures 39, 40:
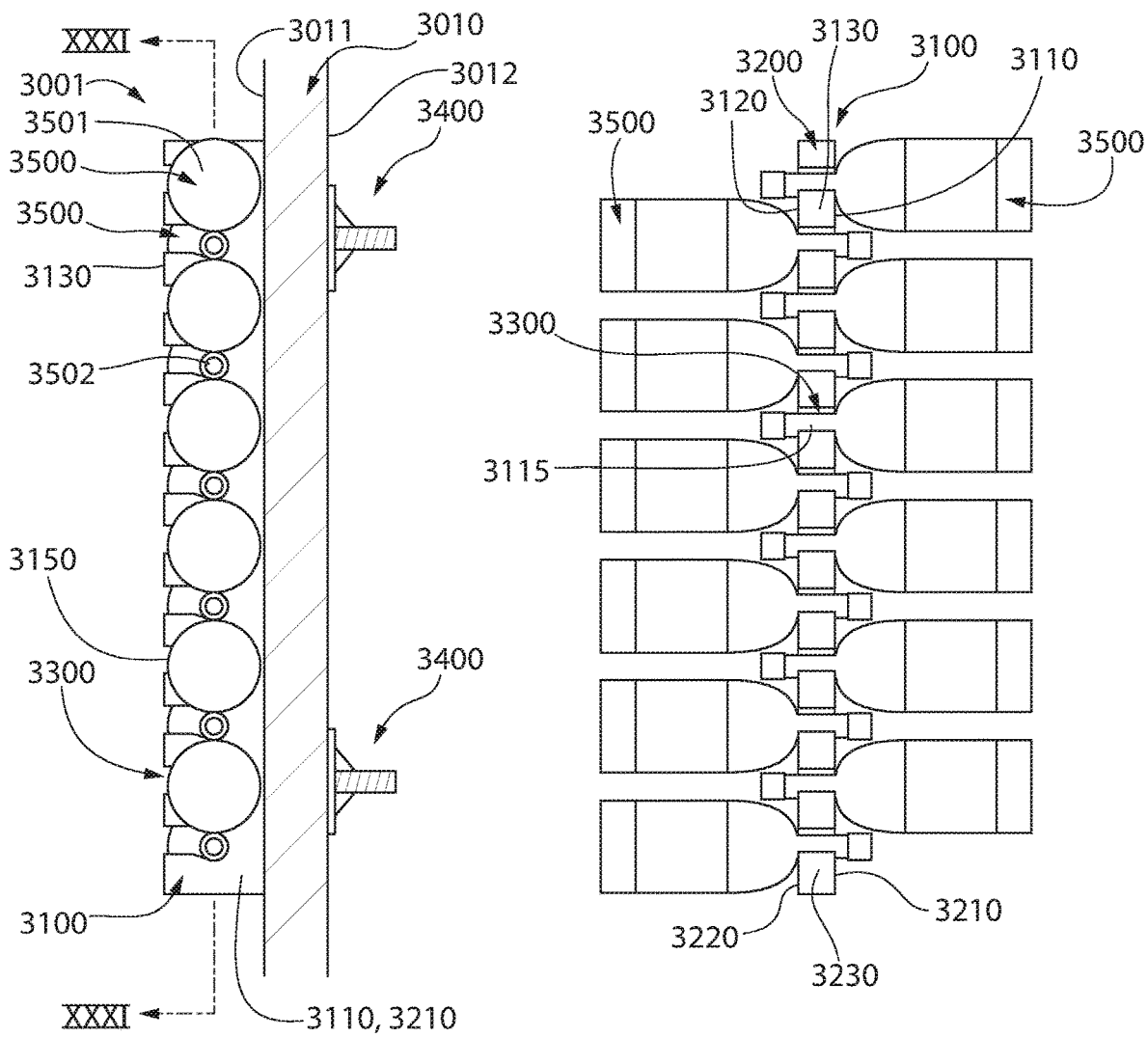
FIG. 39 is side view of the rack apparatus of FIG. 33 in the in-use state.
FIG. 40 is a front view of the rack apparatus of FIG. 33 in the in-use state.
Figure 41:
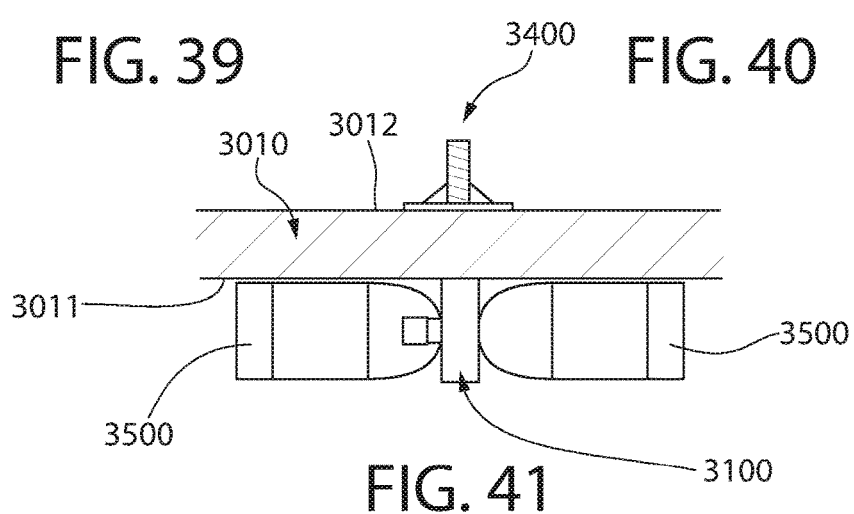
FIG. 41 is a top view of the rack apparatus of FIG. 33 in the in-use state.
Figure 42:
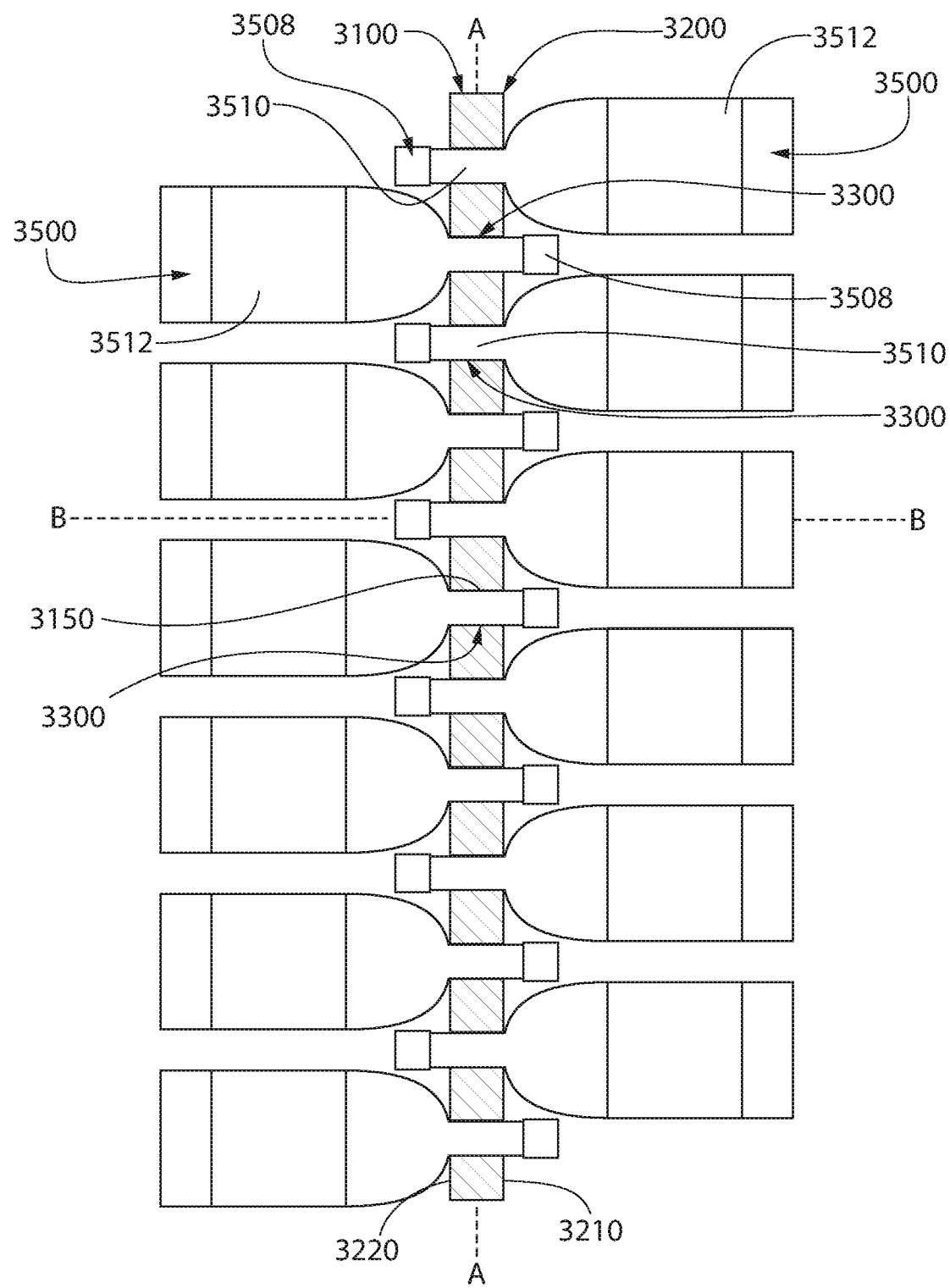
FIG. 42 is a cross-sectional view of the rack apparatus in the in-use state along line XXXI-XXXI of FIG. 39.
Figure 43:
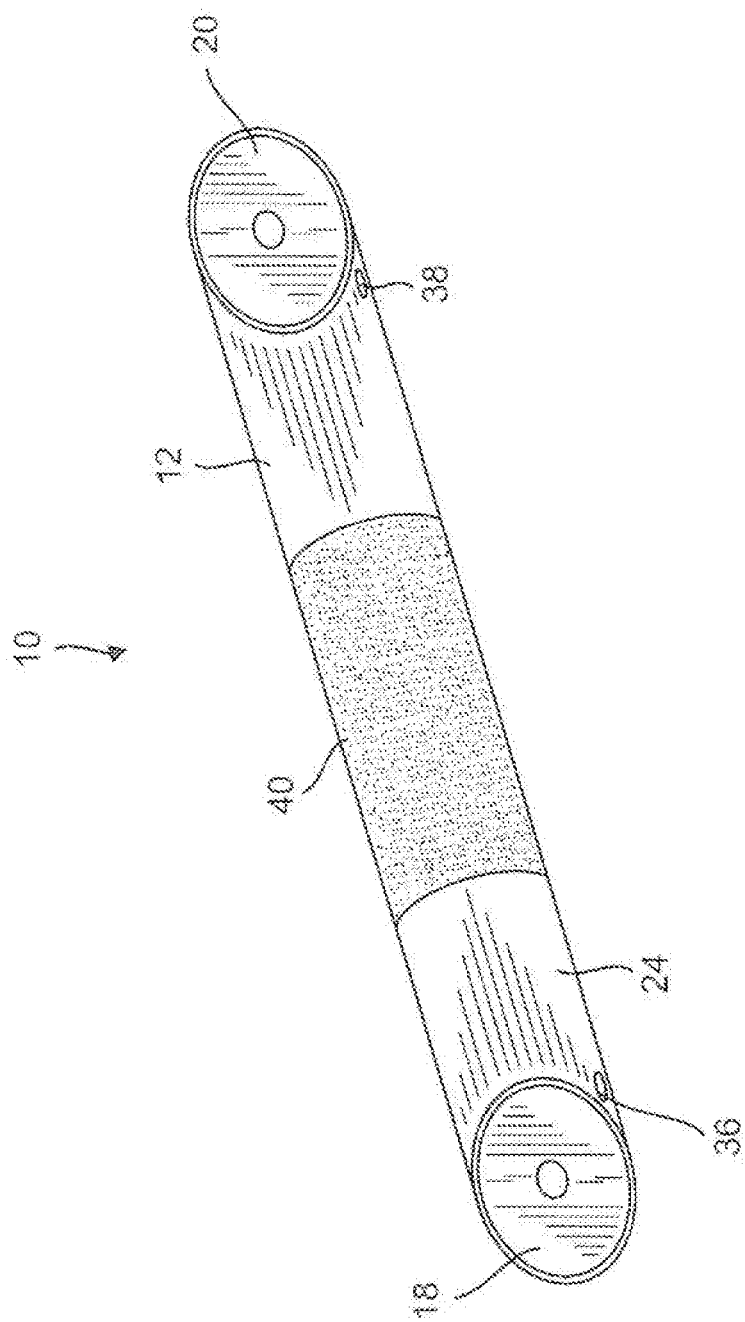
FIG. 43 is a perspective view of an embodiment of a support assembly of the present invention.

The aperture walls 310 may comprise an upper aperture wall 311 that is opposite a lower aperture wall 312. The aperture walls 310 may further comprise at least one aperture side wall 313 extending between the upper aperture wall 311 and the lower aperture wall 312 in some embodiments where the mounting apertures may have an open side wall and a closed side wall (see, e.g. FIGS. 33 and 34). In the present construction being addressed as shown in FIGS. 1, 2, 5, and 11 in which the mounting aperture has a "closed geometry" when viewed laterally (FIG. 2), two aperture side walls 313 comprising a front side wall 314 and rear side wall 315 are provided. The upper aperture wall 311, the lower aperture wall 312, and the aperture side walls 313 may form a continuous annular surface that collectively defines a closed-perimeter boundary or geometry of the aperture 300. Each of the lower aperture wall 312, upper aperture wall 311, and/or the aperture side walls 313 may be independently planar or curved.

The upper aperture wall 311 may define a surface that extends between the first major surface 210 of the body 200 and the second major surface 220 of the body 200 (but does not penetrate those surfaces) at an angle that is substantially perpendicular to the longitudinal axis A-A. In other embodiments, the upper aperture wall 311 may define a surface that extends between the first major surface 210 of the body 200 and the second major surface 220 of the body 200 at an angle that is oblique to the longitudinal axis A-A.

The lower aperture wall 312 may define a surface that extends between m the first major surface 210 of the body 200 and the second major surface 220 of the body 200 at an angle that is substantially perpendicular to the longitudinal axis A-A. In other embodiments, the lower aperture wall 312 may define a surface that extends between the first major surface 210 of the body 200 to the second major surface 220 of the body 200 at an angle that is oblique to the longitudinal axis A-A. Different portions of the walls 311 and 312 may be parallel or oblique.

The aperture side walls 313 may each define a surface that extends from the first lateral major surface 210 of the body 200 to the second lateral major surface 220 of the body 200 at an angle that is substantially parallel to the transverse axis B-B. In other embodiments, the aperture side walls 313 may define a surface that extends from the first major surface 210 of the body 200 to the second major surface 220 of the body 200 at an angle that is oblique to the transverse axis B-B. Different portions of the side walls 313 may be parallel or oblique.

Figure 5:
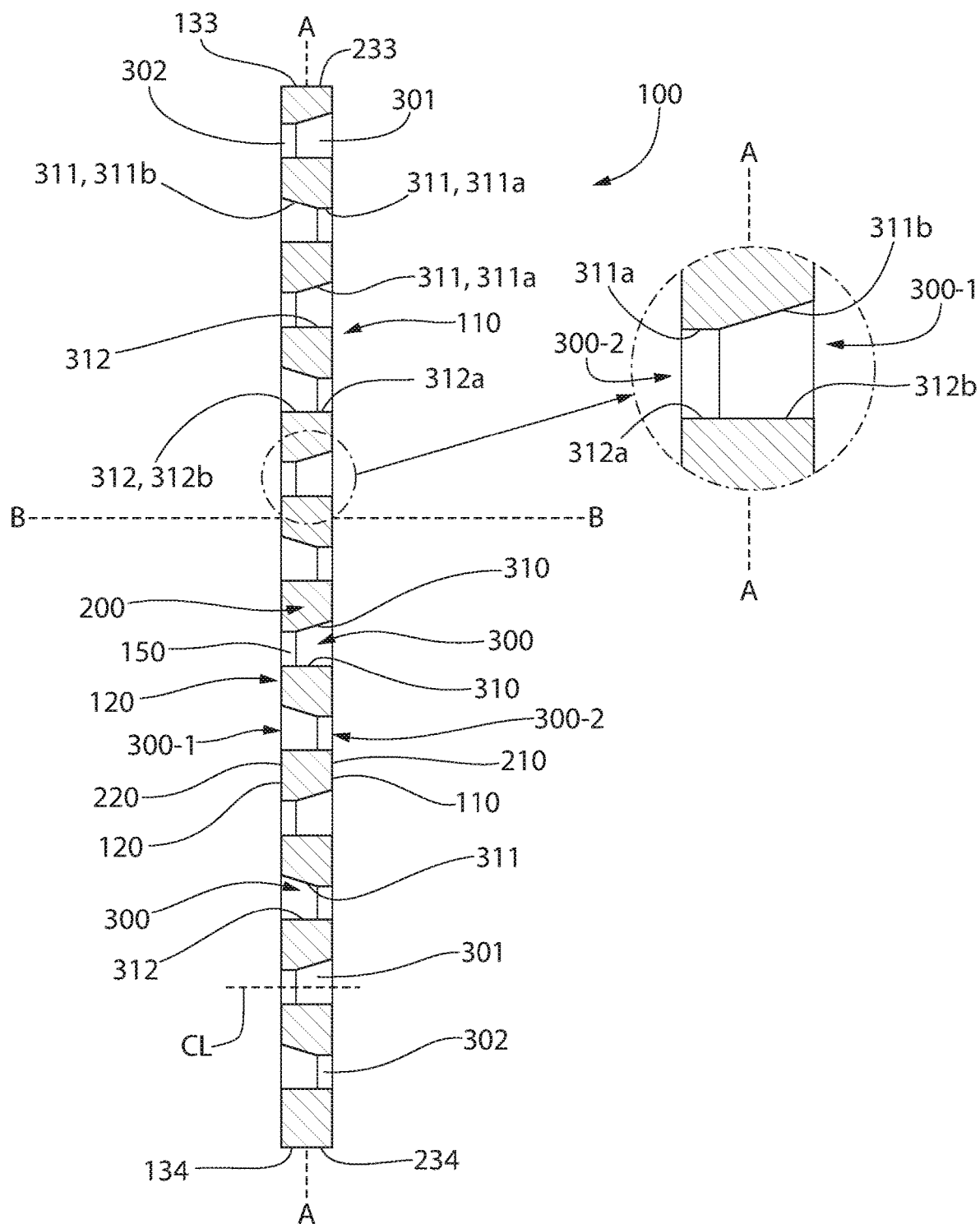
FIG. 5 is a cross-sectional view of the rack apparatus along line V-V of FIG. 2.

In some embodiments, the upper aperture wall 311 may be a multi-directional surface having at least a first upper portion 311a and a second upper portion 311b. Referring to FIG. 5, the first upper portion 311a may extend from the first major surface 210 of the body 200 to the second upper portion 311b at a first angle relative to the longitudinal axis A-A. The second upper portion 311b may extend from the first upper portion 311a to the second major surface 220 of the body 200 at a second angle relative to the longitudinal axis A-A. The first and second angle of the first and second upper portions may be equal. In other embodiments, the first and second angle of the upper portions may be different.

The first angle formed between the first upper portion 311a and the longitudinal axis A-A may be substantially orthogonal or perpendicular (i.e. 90 degrees) as seen in FIG. 5. In other embodiments, the first angle formed between the first upper portion 311a and the longitudinal axis A-A may be oblique. The second angle formed between the second upper portion 311b and the longitudinal axis A-A may be substantially orthogonal or perpendicular. In other embodiments, the second angle formed between the second upper portion 311b and the longitudinal axis A-A may be oblique (see, e.g. FIG. 5). The second upper portion 311b may be laterally wider than the first upper portion 311a.

In some embodiments, the lower aperture wall 312 may be a multi-directional surface having at least a first lower portion 312a and a second lower portion 312b. The first lower portion 312a may extend from the first major surface 210 of the body 200 to the second lower portion 312b at a first angle relative to the longitudinal axis A-A. The second lower portion 312b may extend from the first lower portion 312a to the second major surface 220 of the body 200 at a second angle relative to the longitudinal axis A-A. The first and second angle of the lower portions 312a, 312b may be equal. In other embodiments, the first and second angle of the lower portions 312a, 312b may be different.

The first angle formed between the first lower portion 312a and the longitudinal axis A-A may be substantially orthogonal or perpendicular (see, e.g. FIG. 5). In other embodiments, the first angle formed between the first lower portion 312a and the longitudinal axis A-A may be oblique. The second angle formed between the second lower portion 312b and the longitudinal axis A-A may be substantially orthogonal or perpendicular (see, e.g. FIG. 5). In other embodiments, the second angle formed between the second lower portion 312b and the longitudinal axis A-A may be oblique. The second lower portion 312b may be wider than the first lower portion 312a.

In some embodiments, the first upper portion 311a and the first lower portion 312a may be parallel to each other (see, e.g. FIG. 5). In some embodiments, the first upper portion 311a and the first lower portion 312a may be non-parallel. In some embodiments, the second upper portion 311b and the second lower portion 312b may be parallel. In some embodiments, the second upper portion 311b and the second lower portion 312b may be non-parallel to each other as shown in FIG. 5. The illustrated embodiment forms an asymmetric surface defining a partial frustoconical shaped wall surface and concomitantly shaped entrance opening 300-1 between upper and lower second portions 311b and 312b, which is laterally offset to one major side surface 110 or 120 of the rack 100; the second upper portion 311b being obliquely angled and non-perpendicular to the longitudinal axis A-A (and obliquely angled to transverse axis B-B). The second lower portion 312b is perpendicular to longitudinal axis A-A and parallel to transverse axis B-B.

Figure 11:
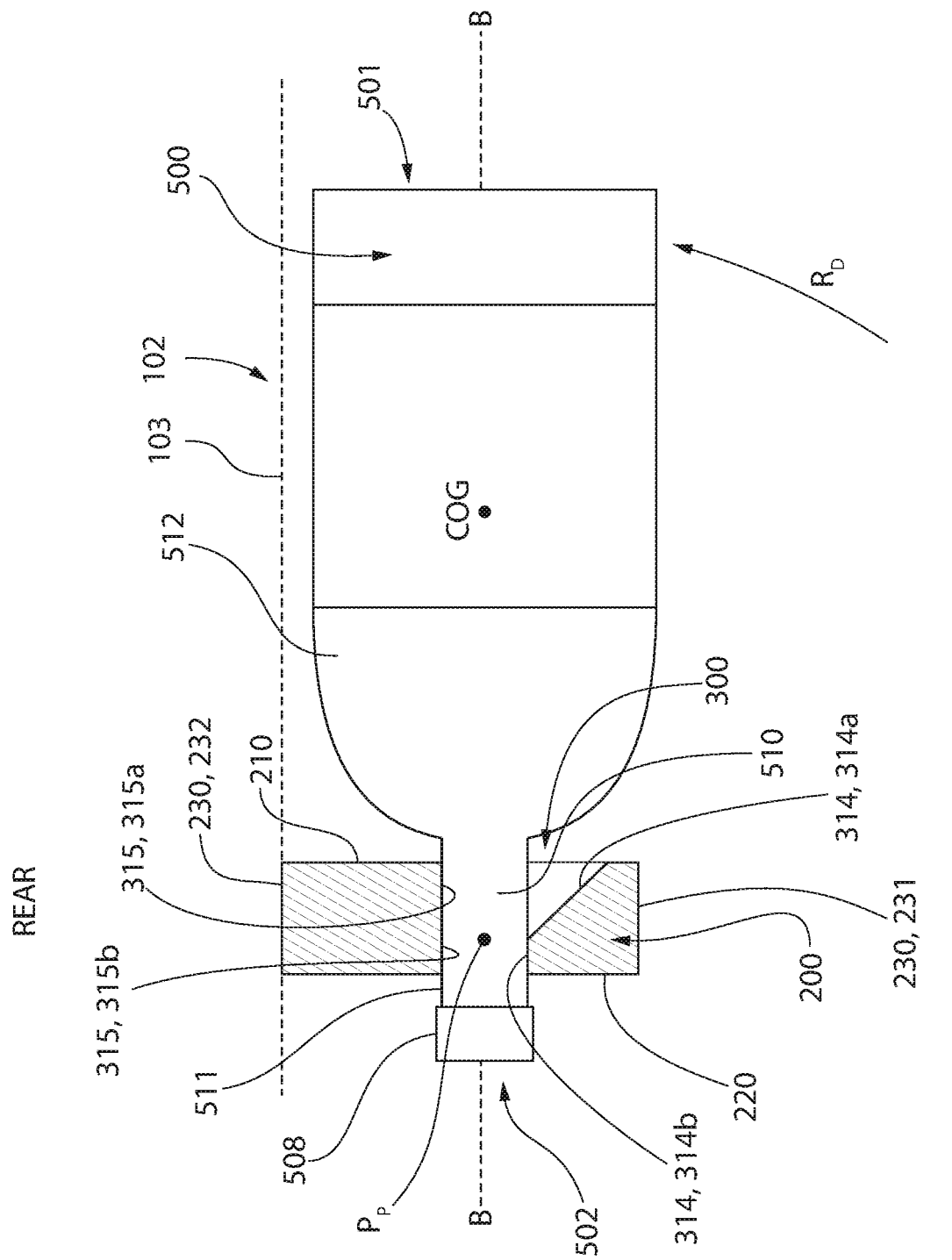
FIG. 11 is a close-up cross-sectional view of the rack apparatus along line XI-XI of FIG. 10 before insertion of a bottle.
Figure 12:
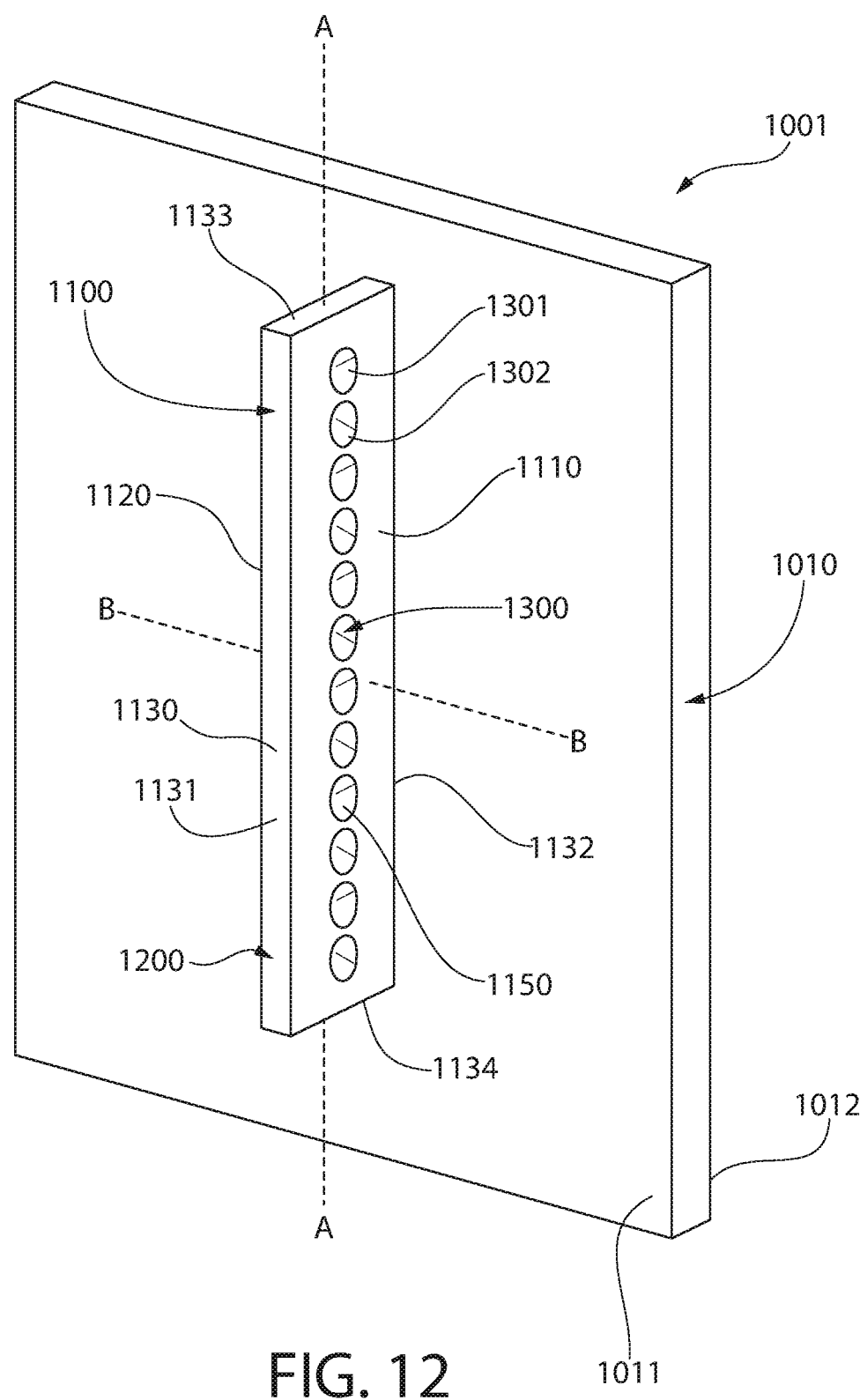
FIG. 12 is perspective view of a rack apparatus in an installed state according a second embodiment of the present invention.
Figures 13, 14:
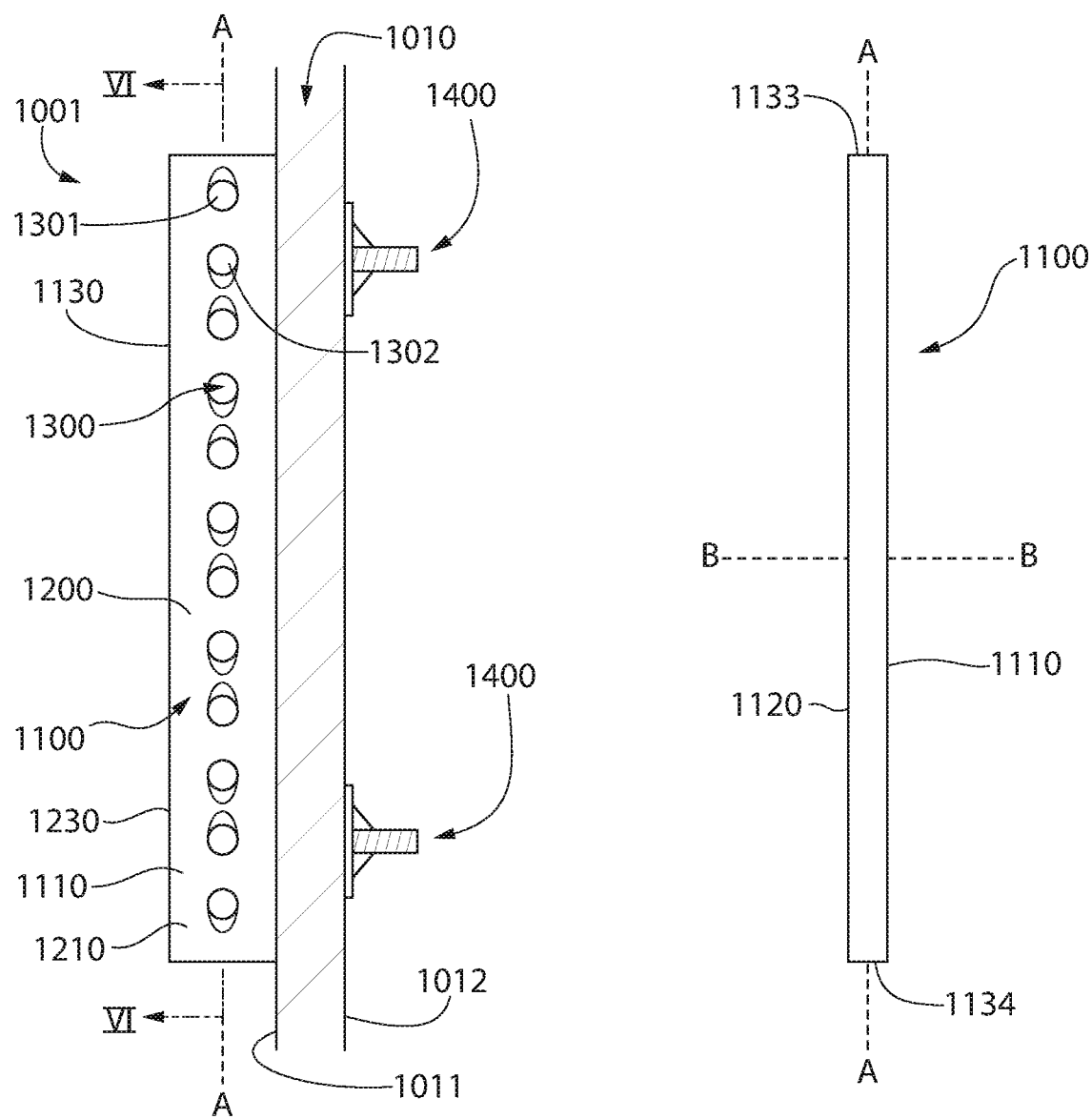
FIG. 13 is side view of the rack apparatus of FIG. 12 in the installed state.
FIG. 14 is a front view of the rack apparatus of FIG. 12.
Figure 15:
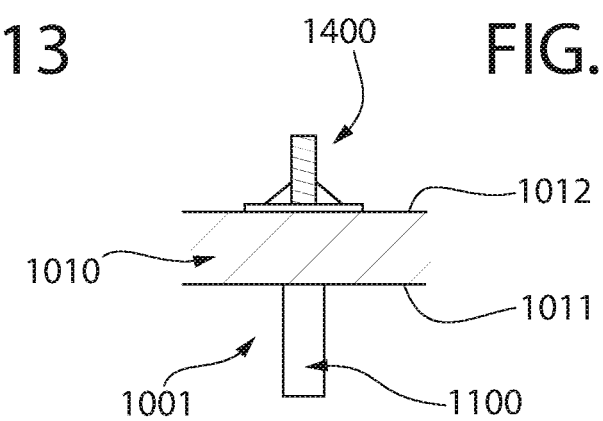
FIG. 15 is a top view of the rack apparatus of FIG. 12 in the installed state.
Figure 16:
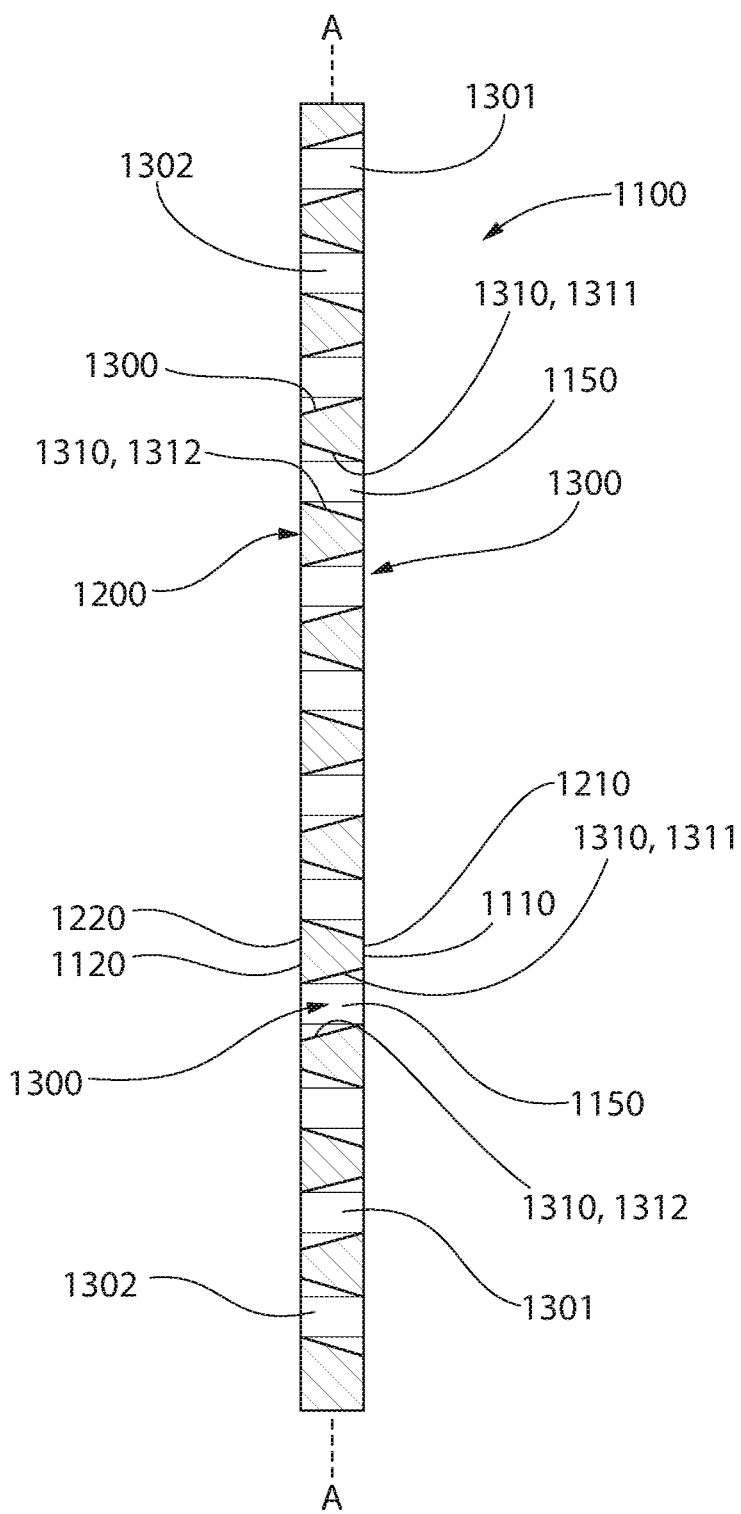
FIG. 16 is a cross-sectional view of the rack apparatus along line VI-VI of FIG. 13.
Figure 17:
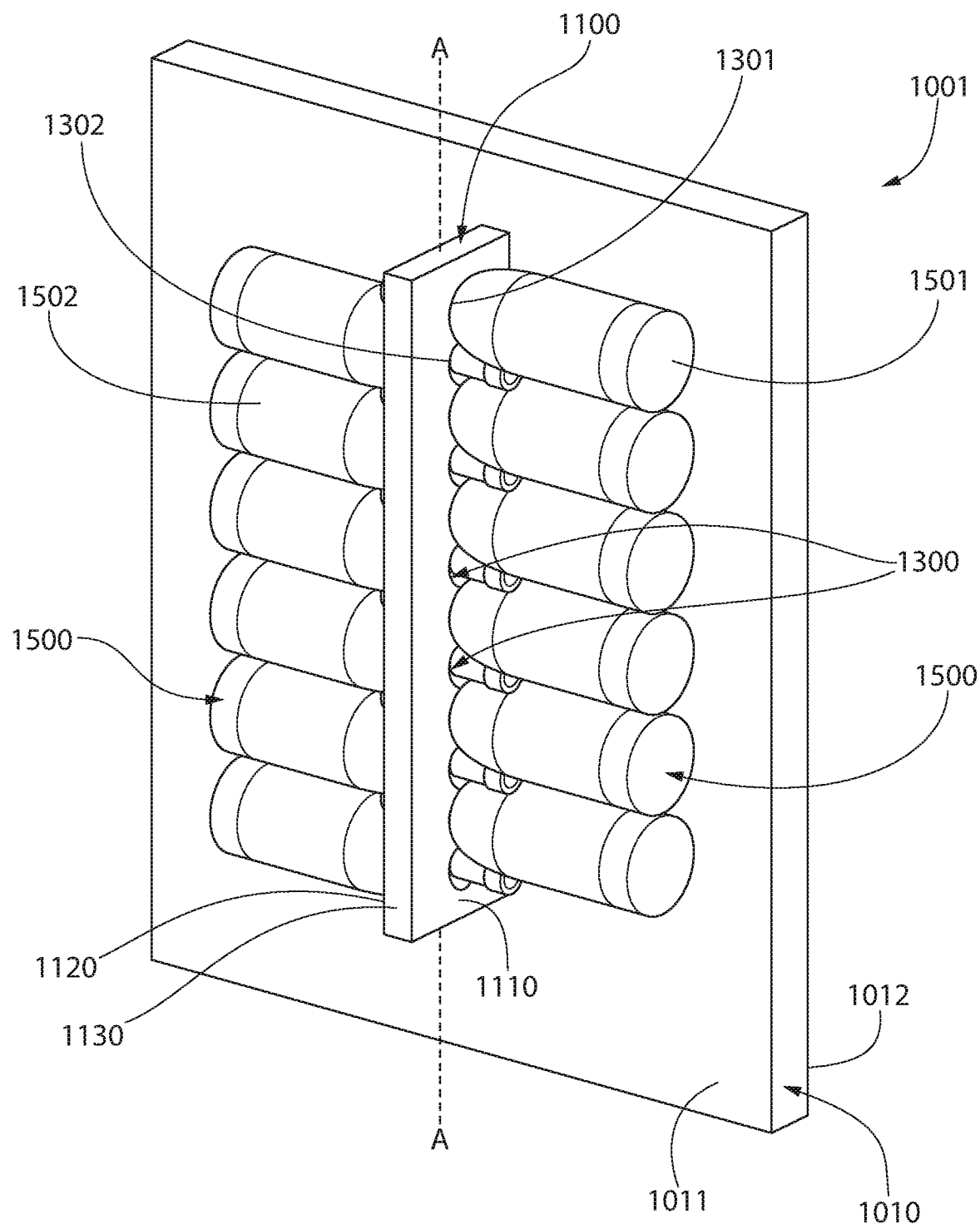
FIG. 17 is a perspective view of the rack apparatus of FIG. 12 in an in-use state.
Figures 18, 19:
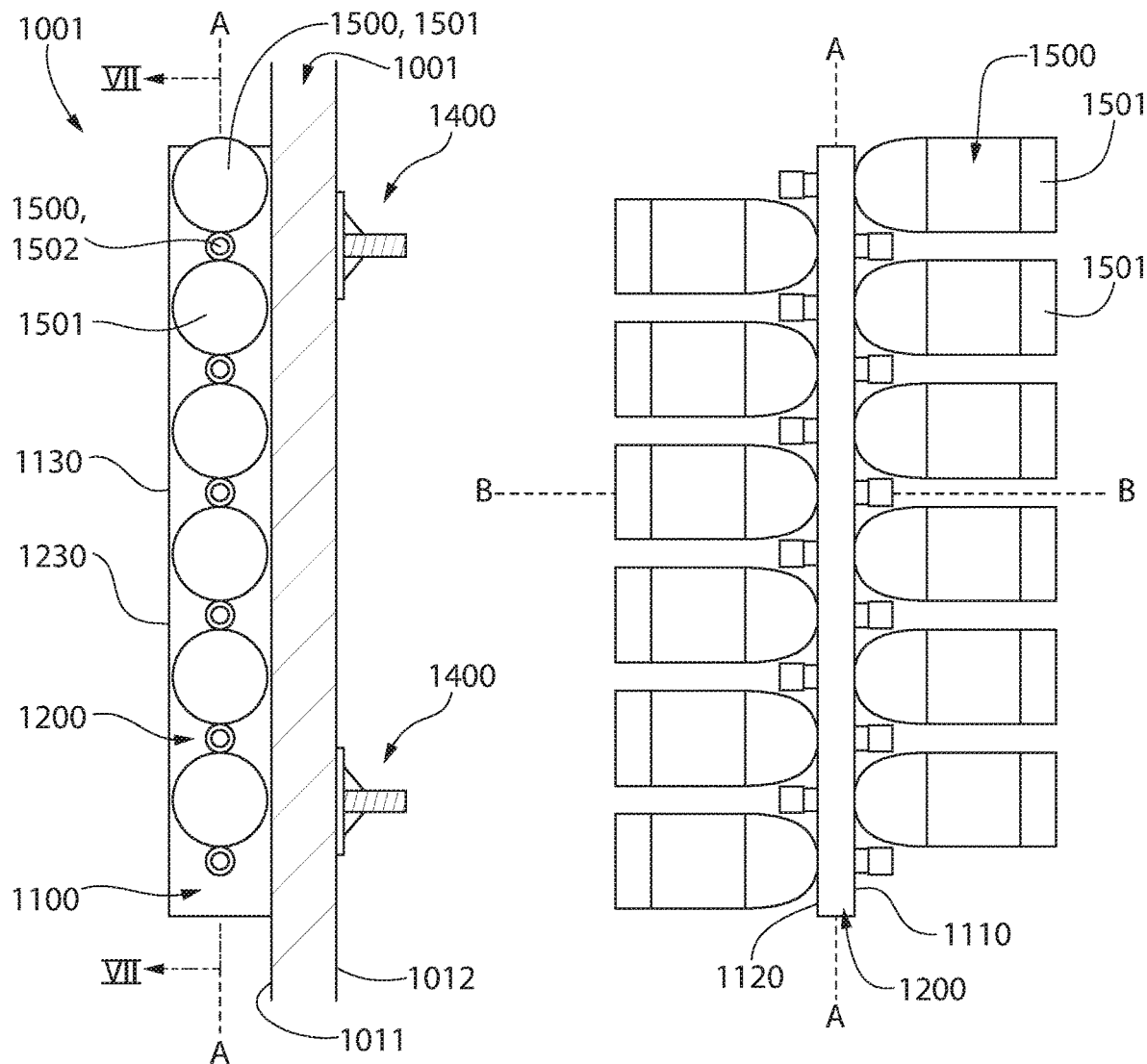
FIG. 18 is side view of the rack apparatus of FIG. 17 in the in-use state.
FIG. 19 is a front view of the rack apparatus of FIG. 17 in the in-use state.
Figure 20:
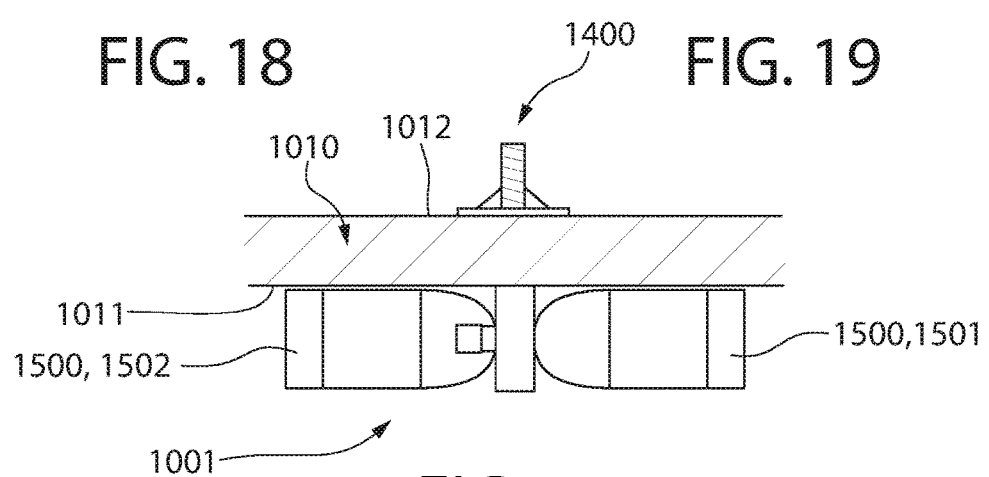
FIG. 20 is a top view of the rack apparatus of FIG. 17 in the in-use state.
Figure 21:
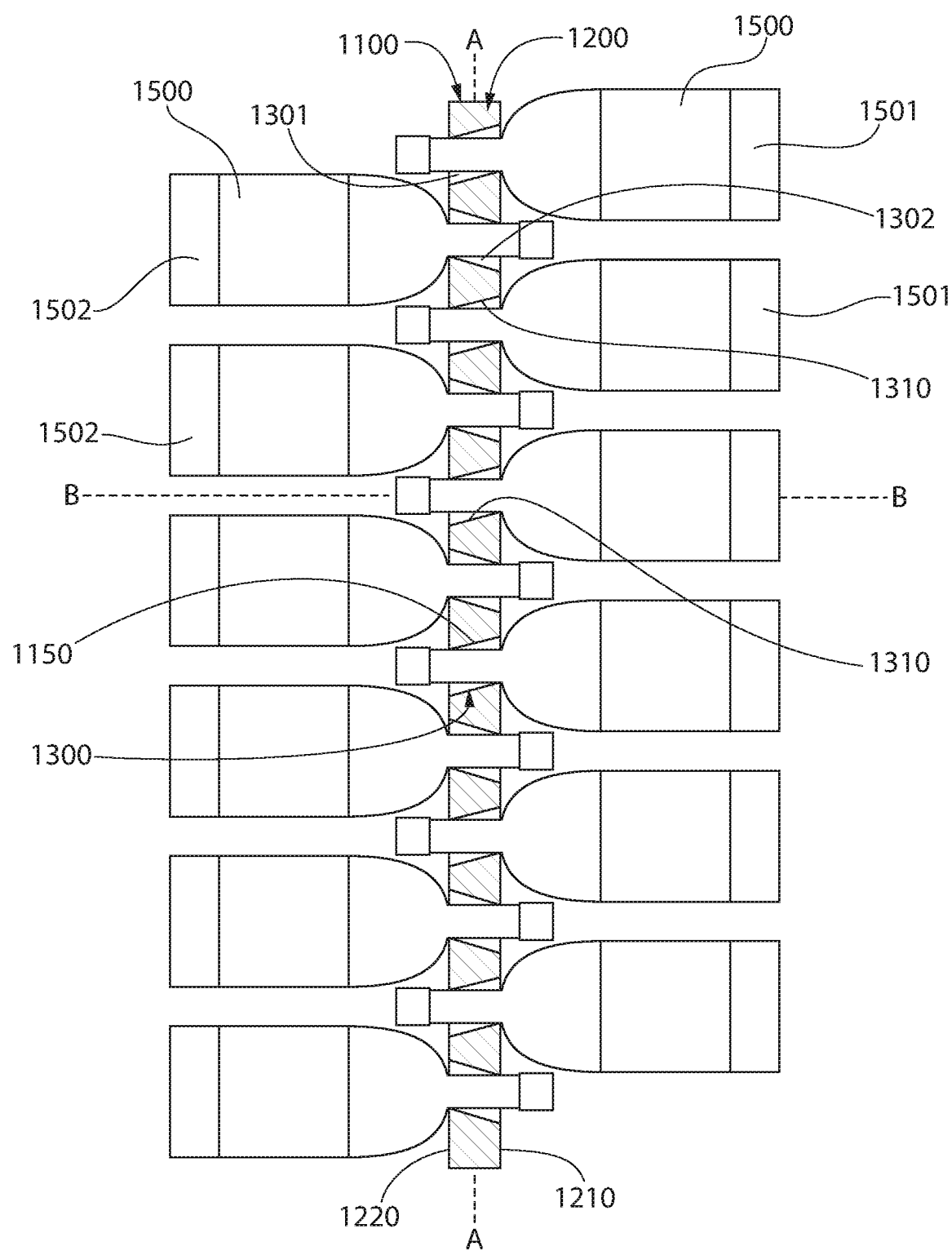
FIG. 21 is a cross-sectional view of the rack apparatus in the in-use state along line VII-VII of FIG. 18.

In some embodiments, referring to FIG. 11, the aperture side walls 313 may comprise a front aperture side wall 314 that is opposite a rear aperture side wall 315. As generally discussed with respect to the aperture side walls 313, the front aperture side wall 314 may extend between but does not penetrate the first and second major surfaces 210, 220 of the body 200 at an angle that is substantially parallel to the transverse axis B-B. In other embodiments as shown in FIG. 11, the front aperture side wall 314 may include a portion that is at an angle that is oblique to the transverse axis B-B.

With continuing reference to FIG. 11, as generally discussed with respect to the aperture side walls 313, the rear aperture side wall 315 may extend between but does not penetrate the first and second major surfaces 210, 220 of the body 200 at an angle that is substantially parallel to the transverse axis B-B as shown. In other embodiments, the rear aperture side wall 315 may include a portion that is at an angle that is oblique to the transverse axis B-B.

In some embodiments, the front aperture wall 314 may be a multi-directional surface having at least a first front portion 314a and a second front portion 314b. The first front portion 314a may extend at a first angle that is substantially parallel to the transverse axis B-B. In other embodiments, the first front portion 314a may extend from the first major surface 210 of the body 200 to the second front portion 314b at a first angle that is oblique to the transverse axis B-B as shown in FIG. 11. The second front portion 314b may extend from the first front portion 314a of the body 200 to the second major surface 220 of the body a second angle that is substantially parallel to the transverse axis B-B as shown. In other embodiments, the second front portion 314b may extend from the first front portion 314a to the second major surface 220 of the body 220 at a second angle that is oblique to the transverse axis B-B. The illustrated embodiment forms an asymmetric surface defining a partial frustoconical shaped wall surface and concomitantly shaped opening between front and rear first portions 314a and 315a, which is offset to towards the front surface 131 of the rack 100; the first front portion 314a being obliquely angled and non-perpendicular to the transverse axis B-B (see, e.g. FIG. 11). This places the front edge of the asymmetric surface defined by first front portion 314a closer to front surface 131 of rack 100 than the front edge of the circumferential surface defined by second front portion 314b.

The first and second angle of the first and second front portions 314a, 314b may be equal in lateral width. In other embodiments, the first and second angle of the first and second front portions 314a 314b may be different in lateral width with portion 314a being wider as shown in FIG. 11.

It bears noting that obliquely angled portion 314a of front wall 314 and obliquely angled portion 311b of upper wall 311 of the mounting apertures 300 may be considered to define sloped or inclined walls and surfaces. These sloped surfaces define the slot-shaped asymmetric frustoconical wall surface and opening as further described herein.

In some embodiments, the rear aperture wall 315 may be a multi-directional surface having at least a first rear portion 315a and a second rear portion 315b. The first rear portion 315a may extend from the first major surface 210 of the body 200 to the second rear portion 315b at a first angle that is substantially parallel to the transverse axis B-B as shown in FIG. 11. In other embodiments, the first rear portion 315a may extend from the first major surface 210 of the body 200 to the second rear portion 315b at a first angle that is oblique to the transverse axis B-B. The second rear portion 315b may extend from the first rear portion 315a of the body 200 to the second major surface 220 of the body a second angle that is substantially parallel to the transverse axis B-B as shown. In other embodiments, the second rear portion 315b may extend from the first rear portion 315a to the second major surface 220 of the body 220 at a second angle that is oblique to the transverse axis B-B.

The first and second angle of the first and second rear portions 315a, 315b may be equal in lateral width. In other embodiments, the first and second angle of the first and second rear portions 315a, 315b may be different in which the portion 315b may be wider.

As demonstrated by FIG. 11, a container 500 in the form of an elongated bottle may comprise a main liquid storage or body portion 512, a narrower elongated neck portion 510, and a top flange 508 at the mouth or opening of the container. Container 500 includes a bottom end 501 defined by main body portion 512 and an opposite top end 502 adjacent the top flange 508 which defines the mouth/opening for adding or extracting the liquid stored in the bottle. The body portion 512 and neck portion 510 may be generally cylindrical in shape in one embodiment as illustrated. Neck portion 510 is diametrically smaller than the body portion 512, and top flange 508 may be diametrically larger than the neck portion adjacent the top end 502. The neck portion 510 may have a greater length than the width of body 200 of the rack apparatus 100 as shown. This allows the neck portion and top flange 508 to be fully inserted through the openings in the body 200 for securing the containers 500 to the storage rack. It bears noting that in other embodiments of the bottle container, the main body portion 512 may have a shape other than cylindrical, such as for example without limitation polygonal (e.g. squared, hexagon, octagon, etc.). In such embodiments, neck portion 510 has a smaller cross-sectional area than that of the non-cylindrical body portions 512. The sidewalls of the body portion 512 may be straight as shown and/or have other profiles when viewed from the side such as bulbous or undulating configurations. The neck preferably remains cylindrical in shape in these alternate forms for engaging the container storage rack.

To put the rack apparatus 100 into use for storing containers, according to one non-limiting method, the top flange 508 and neck portion 510 of a container 500 (e.g. bottle) may be inserted laterally through the aperture 300 of the rack apparatus 100 such that the top flange 508 passes from the right first major surface 210 toward the left second major surface 220 of the body 200, and past the second major surface 220 of the body 200. Alternatively, for some of the apertures, the top flange 508 and neck portion 510 of another container may be inserted through the aperture 300 of the rack apparatus 100 such that the top flange 508 passes from the second major surface 220 toward the first major surface 210 of the body 200 and past the first major surface 210 of the body 200). The dimensions of the aperture 300 may be selected such that the passageway 150-1 has a diameter (or a height and width thought of another way) that is greater than the diameter of the top flange 508 and neck portion 510 of container 500. Having such diameter relationship allows for the top flange 508 to pass through the aperture 300 uninhibited. The aperture 300 however may have a diameter (height and width) which is smaller than the transverse cross-sectional area or diameter of the main storage portion 512 of the container (e.g. bottle).

Figure 6:
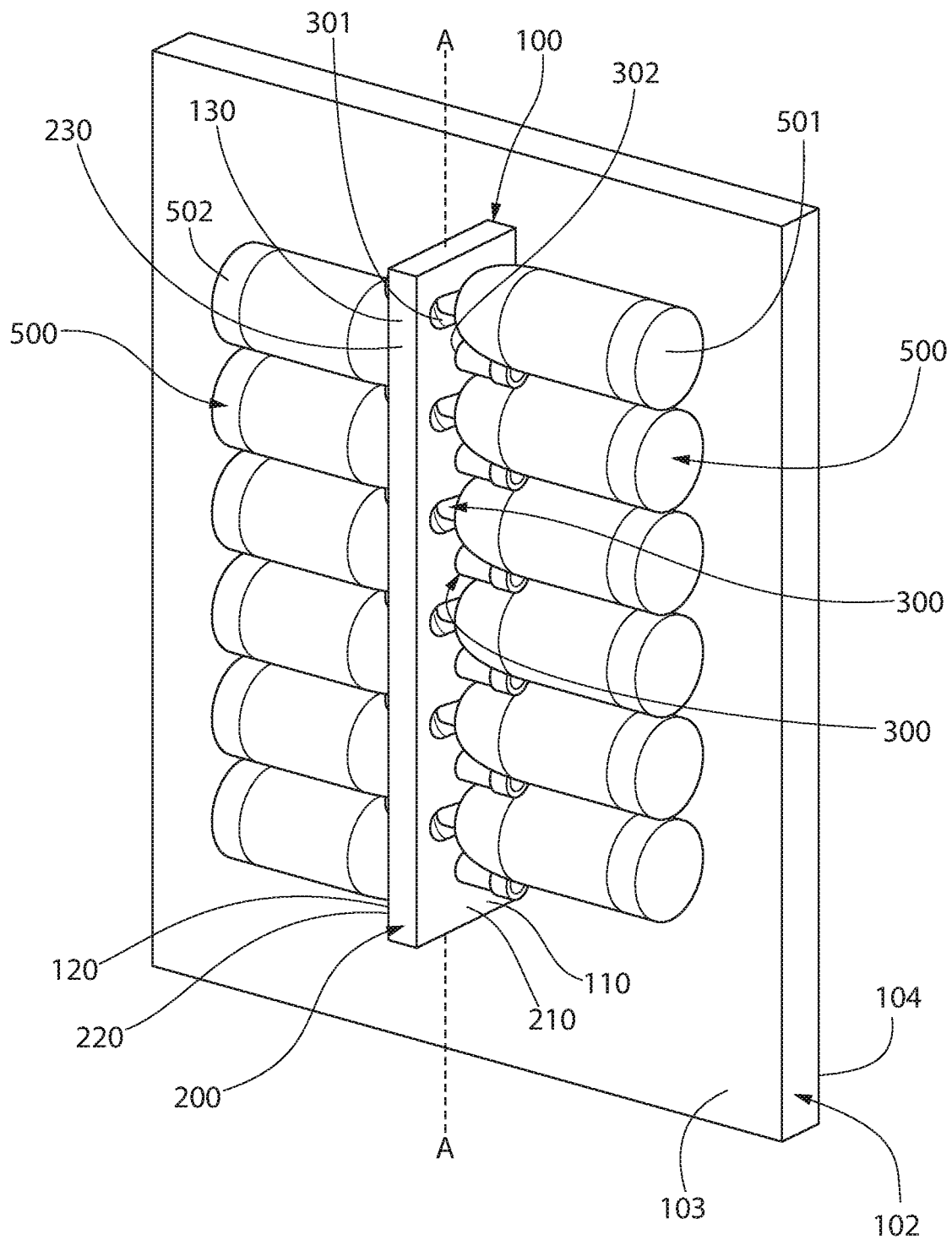
FIG. 6 is a perspective view of the rack apparatus of FIG. 1 in an in-use state.
Figures 7, 8:
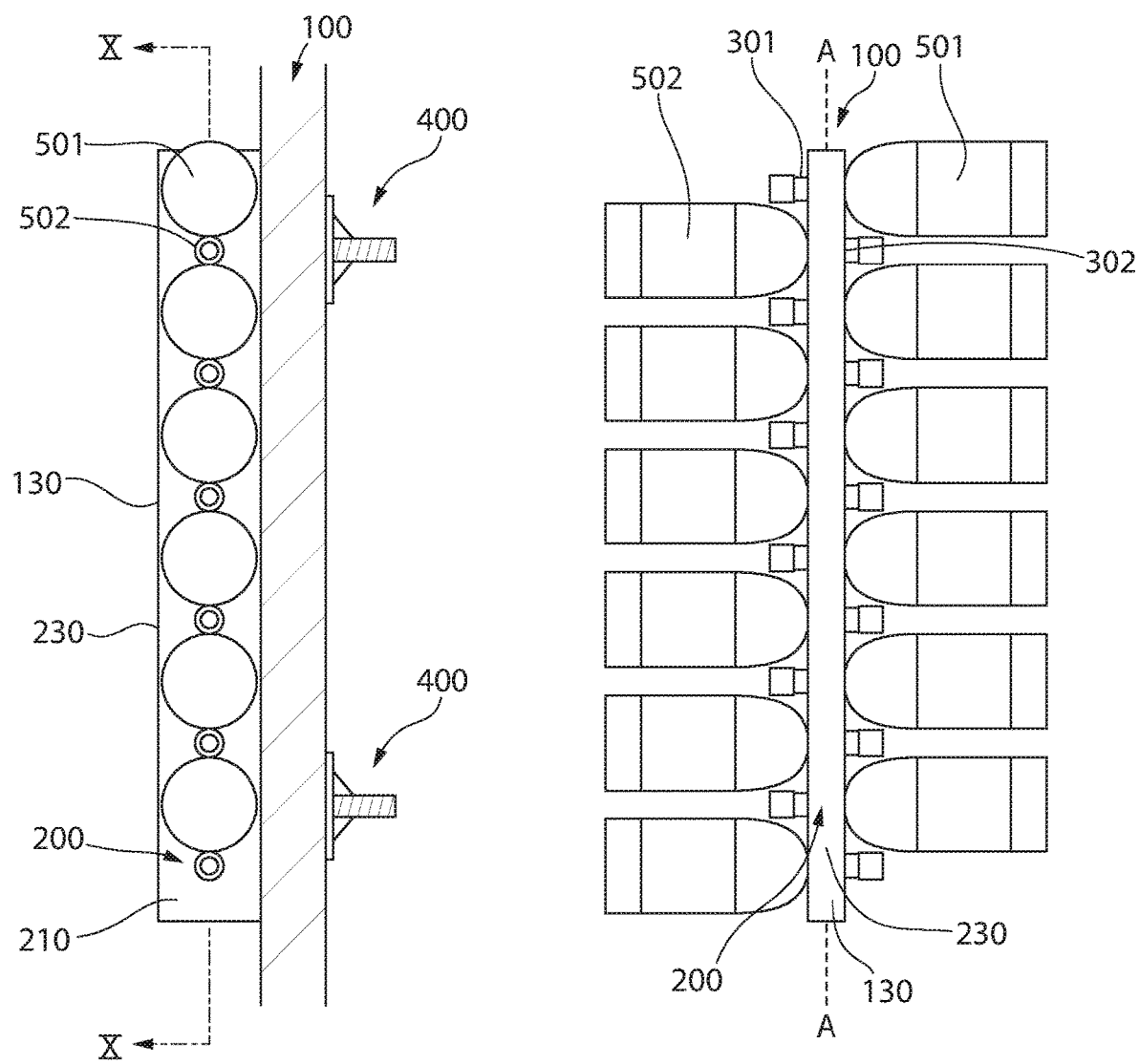
FIG. 7 is side view of the rack apparatus of FIG. 6 in the in-use state.
FIG. 8 is a front view of the rack apparatus of FIG. 6 in the in-use state.
Figure 9:
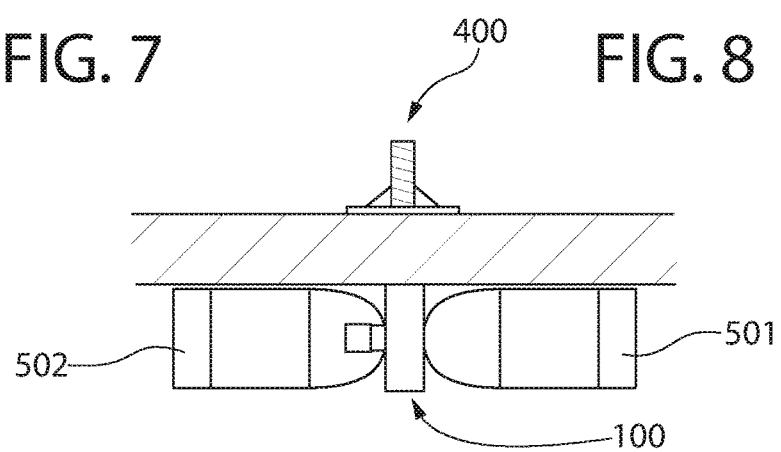
FIG. 9 is a top view of the rack apparatus of FIG. 6 in the in-use state.

During the insertion step, the container 500 is preferably inserted by passing its neck portion 510 through the larger obround entrance opening of mounting aperture 300 formed by the frustoconical shaped wall surface at one end of the mounting aperture rather than the smaller circular opening formed by the cylindrical shaped wall surface at the opposite end of the aperture (see, e.g. FIGS. 6 and 11). The obround entrance opening 300-1 thus may be considered to define an "entrance" opening 300-1 of each mounting aperture at one end having a larger transverse cross-sectional area than the transverse cross-sectional area of the smaller circular opening at the other end that defines an "exit" opening 300-2 through which the neck portion 510 of the container 500 is projected therethrough when the container is fully inserted through the mounting aperture 300. The entrance opening 300-1 gradually diminishes in cross-sectional area moving inwards from the lateral major surface it penetrates (i.e. right or left major surface 110 or 120 depending on the orientation of the mounting aperture 300) towards the central portion of the mounting aperture 300. The entrance opening 300-01 eventually merges with the exit opening towards the other end of the aperture 300 (see, e.g. FIG. 5). Thought of another way, the frustoconical shaped wall surface at one end of the mounting aperture merges with the cylindrical shaped wall surface at the opposite end of the aperture at a point between the major surfaces 110, 120 of the rack body 200.

Moreover, during the foregoing insertion step, the container 500 may be initially inserted into the aperture 300 in either a direction that is parallel to the transverse axis B-B, or for convenience and preferably oblique to the transverse axis B-B (and vertical plane defined by the wall surface 103 of wall 102). The larger entrance opening 300-1 of the mounting aperture 300 facilitates insertion of the container neck and guides the neck towards the smaller opposite exit opening 300-2 of the aperture. The asymmetric partial frustoconical wall surfaces of the entrance portion 300-1 may thus be though of as a funnel which guides the container neck portions 510 through the aperture towards the exit opening.

When inserted into the aperture 300 at an oblique angle, a pivot point $P_P$ is created where the neck portion 510 of the container 500 is located at a point between the first and second major surfaces 110, 120 of the rack apparatus 100. The bottle 500 may then be rotated about the pivot point $P_P$ in a rotational direction $R_D$ such that the body portion 512 of the bottle 500 moves closer to the second vertical side surface 232 of the body 200. Stated otherwise, the bottle 500 may be rotated about the pivot point $P_P$ in a rotational direction $R_D$ such that the body portion 512 of the bottle 500 moves closer to the outer surface 103 of the support structure 102 in the storage system 101. In moving about the rotational direction $R_D$ towards the wall 102, the bottle 500 may move about the vertical longitudinal axis A-A as well as the transverse axis B-B depending on the specific configuration of the aperture walls 310.

Figure 10:
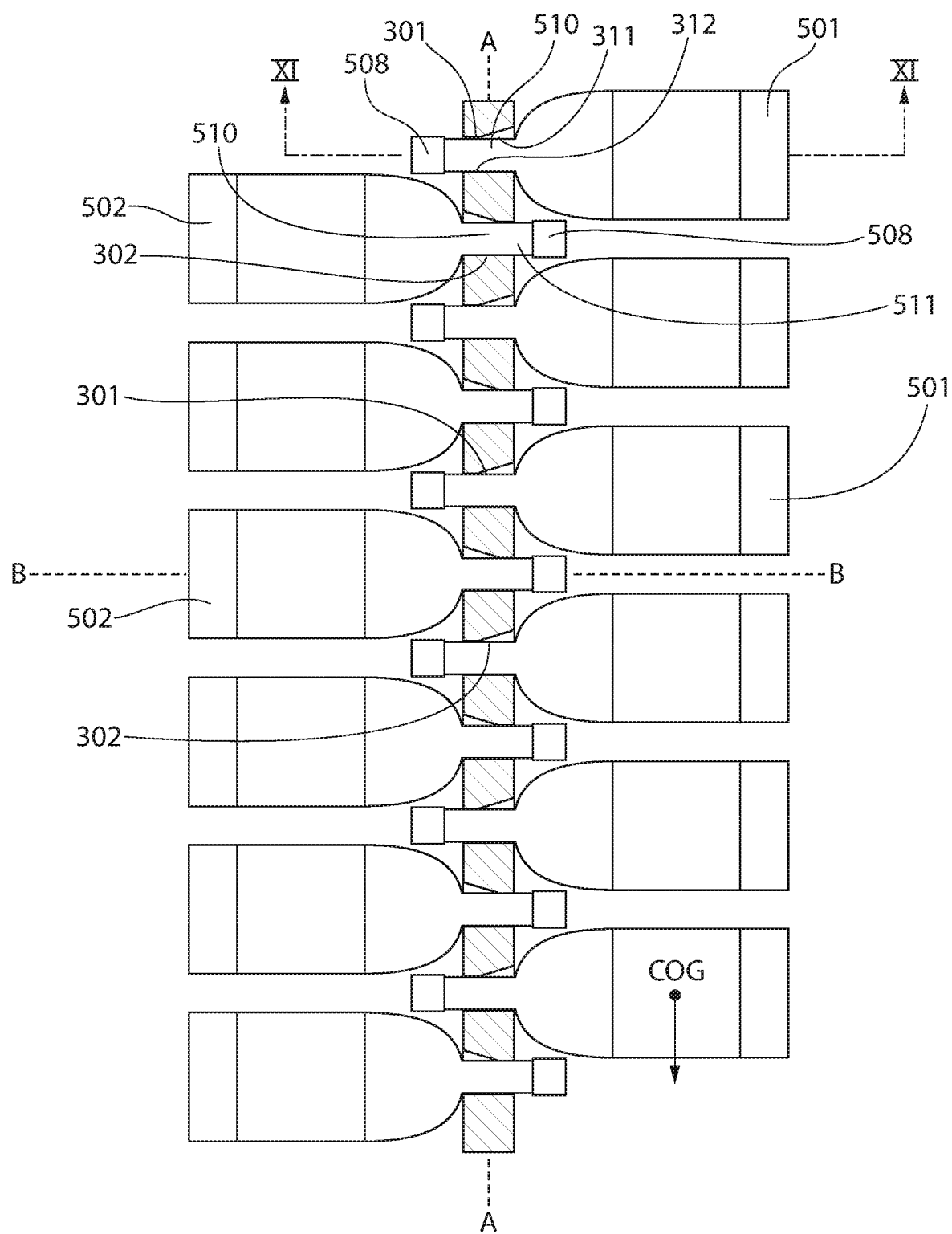
FIG. 10 is a cross-sectional view of the rack apparatus in the in-use state along line X-X of FIG. 7.

As demonstrated by FIGS. 10 and 11, once fully rotated about the pivot point $P_P$ along the rotational direction $R_D$, the upper wall 311 may engage a portion of the top outer surface 511 of the neck portion 510 of the container 500. Once fully rotated about the pivot point $P_P$ along the rotational direction $R_D$, the lower wall 312 may engage an opposite portion of the outer surface 511 of the neck portion 510 of the container 500. Once fully rotated about the pivot point $P_P$ along the rotational direction $R_D$, the front aperture side wall 314 and/or the rear aperture side wall 315 may engage a portion of the outer surface 511 of the neck portion 510 of the container 500.

The engagement between at least one of the aperture walls 310 with the outer surface 511 of the neck portion 510 of the container 500 stabilizes and retains the container 500 in a set position in the mounting aperture 300 and rack 100. The straight section 311a of upper aperture wall 311 of mounting aperture 300 (oriented parallel to transverse axis B-B) located in the smaller diameter cylindrical portion of the aperture adjacent the symmetrical exit opening 300-2 retains the container 500 in the rack 100 via engagement with the top surface 511 of the neck portion 510 of the container once fully inserted in mounting aperture 300 about the pivot point $P_P$. Correspondingly, the entire lower aperture wall 312 of the mounting aperture (i.e. both sections 312a and 312b oriented parallel to transverse axis B-B) engages the bottom surface 511 of the container neck portion 510. In the set or fully engaged position, the container 500 extends out laterally from the longitudinal axis A-A such that the container 500 is oriented substantially parallel to the transverse axis B-B of the rack apparatus 100 and supported in a cantilevered manner. Because the center of gravity COG of the container 500 associated with the bottle and its contents is located to laterally offset from to one side major side or the other of the rack (see, e.g. FIGS. 10 and 11), this creates a moment about the pivot point $P_P$ which increases engagement with the walls in the mounting aperture to keep the container in position. The COG may therefore laterally offset from either lateral major surfaces 110 or 120 of the storage rack depending on the orientation of the container as seen in FIG. 10.

The distance between the upper aperture wall 311 and the lower aperture wall 312 is greater than the largest external vertical dimension (i.e. outer diameter of the neck portion 510 of the bottle 500). The distance between the front aperture side wall 314 and the rear aperture side wall 315 is also greater than the largest external horizontal dimension of the neck portion 510 of the bottle 500. The distance between the upper aperture wall 311 and the lower aperture wall 312 is also be greater than the largest external dimension of the top flange 508 of the bottle 500 in bottles 500 which include a pronounced flange. The distance between the front aperture side wall 314 and the rear aperture side wall 315 may be greater than the largest external dimension of the top flange 508 of the bottle 500. Under this relationship, there is sufficient clearance between the aperture walls 310 of mounting aperture 300 and the top flange 508 and/or the neck portion 510 of the bottle 500 to allow the bottle to be fully inserted through mounting aperture 300 and into the rack apparatus 100.

It bears noting that the rack 100 may be used with containers/bottles which do not have a pronounced top flange 508 with equal benefit. The invention is expressly not limited for use with bottles having top flanges illustrated herein.

According to this embodiment, the distance between the upper aperture wall 311 and the lower aperture wall 312 may vary along the transverse axis B-B between the first and second major surface 210, 220 of the body 200 due to the obliquely angled portions 311b of the upper wall 311. This angled portion 311B of the upper aperture wall 331 does not generally engage the neck portion 510 of container 500 when fully seated and retained in the rack 100. Similarly, the obliquely angled portion 314a of front aperture wall 314 does not engage the neck portion of the container. According to this embodiment, the distance between the front aperture wall 314 and the rear aperture wall 315 may vary along the transverse axis B-B between the first and second major surface 210, 220 of the body 200 due to the presence of angled portion 314a of the front aperture wall 314.

Referring now to FIGS. 1, 2, 5, 6, and 10, the plurality of apertures 300 on the rack apparatus 100 of the present invention further comprises a first aperture section 301 and a second aperture section 302. In one embodiment, the first aperture sections 301 may be elongated slots in transverse configuration and the second aperture sections 302 may be round or circular in transverse configuration as shown. Accordingly, each aperture 300 may therefore include a first aperture section 301 forming an elongated obround or oval opening at one end to advantageously facilitate initial insertion of the container neck 510 into the aperture from one of the lateral major sides 210 or 220 of the rack body 200, and a circular opening at an opposite end configured for removably locking and securing the container 500 to the rack via the neck portion 510 and enlarged flange 508 at the top of the container (e.g. bottle).

Figure 2:
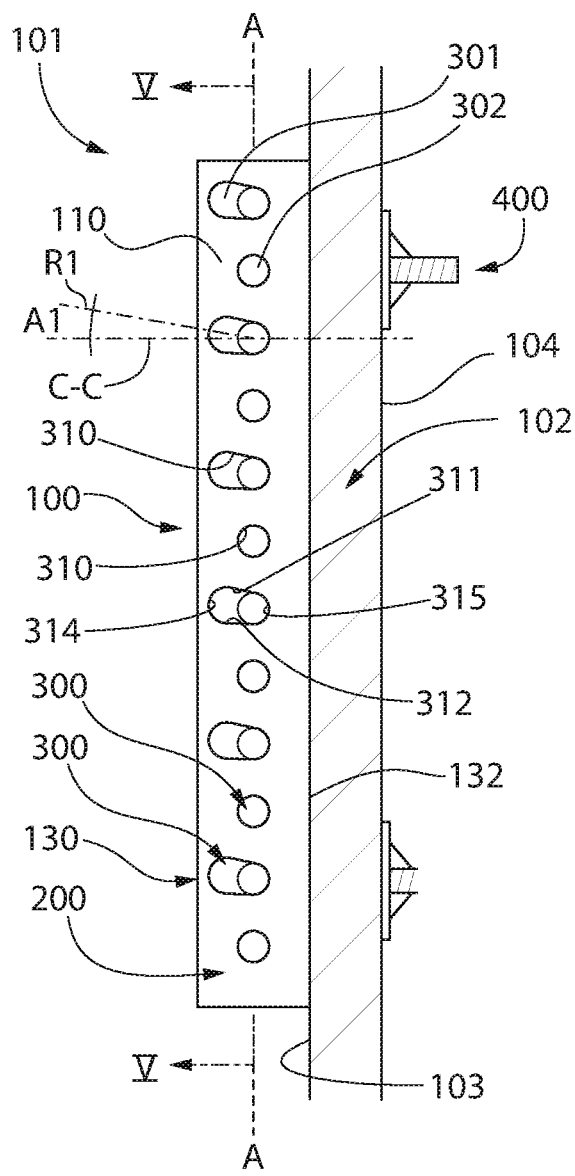
FIG. 2 is right side view of the rack apparatus of FIG. 1 in the installed state.
Figure 3:
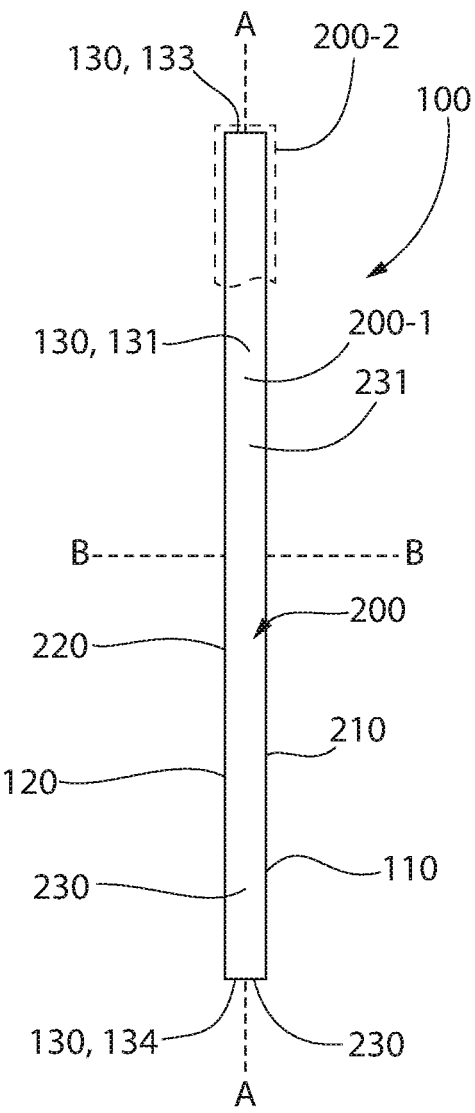
FIG. 3 is a front view of the rack apparatus of FIG. 1 looking towards the support structure.
Figure 4:
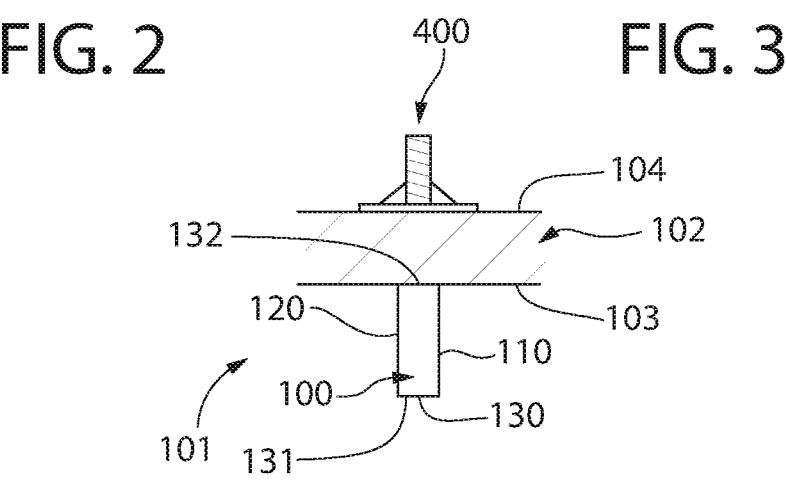
FIG. 4 is a top view of the rack apparatus of FIG. 1 in the installed state.

The slot-shaped first aperture sections 301 may be obliquely oriented in lateral side view rather than perpendicular to the longitudinal axis A-A and oblique to a horizontal axis C-C drawn front to rear of rack body 200 that extends through each slot (see, e.g. FIG. 2). Thus a reference line R1 drawn from the center of the rear wall 315 to the center of the front wall 314 is angled at an oblique angle A1 to the horizontal axis C-C. This obliquely angled orientation of slot-shaped aperture section 301 creates the obliquely angled portions 311b and 314b of each mounting apertures 300 previously described herein. It bears noting the arcuately curved surfaces of slot-shaped aperture sections 301 formed by oblique sections 311b, 314b are contiguous forming integral portions of the slots. Section 314b formed by front wall 314 extends upwards and then rearwards along the top wall 311 of each mounting aperture 300.

The mounting apertures 300 may be arranged in a spaced apart single linear array or column in rack 100 along longitudinal axis A-A. In one embodiment, the first and second aperture sections 301, 302 of each aperture 300 may be arranged array in an alternating pattern along longitudinal axis A-A in one embodiment as shown in FIG. 5. Every other mounting aperture 300 is laterally reversed in position horizontally as shown. For example, some of the apertures have the slot-shaped aperture sections 301 at the ends of the mounting apertures located at the right lateral major surface 110/210 of the rack, while every other one has the slot-shaped aperture sections at the left lateral major surface 120/220. The same applies by analogy to the circular-shaped second aperture sections 302. Because the circular shaped openings are configured to engage and retain the neck portions 510 (e.g. flange 508) of each bottle, this allows the bottles to be mounted in the alternating right-to-left arrangement as shown in FIG. 6. The larger main body portion 512 of each bottle will be located adjacent the slot-shaped section 301 of each mounting aperture 300, whereas the flange 508 at the top end of each bottle that defines the opening will be located adjacent to the circular shaped section 302 of the mounting aperture. The enlarged slot shaped sections 301 make it easier for the user to both insert and remove the bottles from the rack 100 with a minimal amount of accuracy.

The mounting apertures 300 each thus may have the same configuration and features described above, except that every other aperture moving in a vertical direction along the rack 100 has first and second aperture sections 301, 302 that are a mirrored image of the next adjacent mounting aperture along the longitudinal axis A-A (see, e.g. FIG. 5). The slot-shaped first aperture sections 301 have the greatest height the at open first end of the mounting apertures 300 and gradually diminish in height moving towards the opposite open second end of the aperture 300 having the circular aperture section 302 (see, e.g. FIG. 5). The upper wall 311b in the first section 310 of each aperture 300 is sloped and angled downwards at an oblique angle to transverse axis B-B moving between the lateral major surfaces 110, 120 from the first end towards the second end of the aperture. The upper wall 311b of the first section 301 of each aperture 300 is also sloped and angled downwards moving from the front surface 131 towards the rear surface 132 of the rack 100 (see, e.g. FIG. 2). The front wall 314a of the first section 301 of each aperture 300 is sloped or inclined rearwards moving from the open end at slot-shaped section 301 of the aperture towards the open end at circular-shaped section 302 (see, e.g. FIG. 11). The sloping/inclined upper and front walls 311, 314a wall collectively form the bell-shaped asymmetric partial-frustoconical shaped wall section and corresponding opening at one end of each container-mounting aperture 300 opposite the circular cylindrical shaped wall section and opening at the other end of the aperture, as previously described herein.

Under this foregoing configuration of the rack 100 and container mounting apertures 300, a plurality of containers 500 may be inserted into the first and second aperture sections 301, 302 of the rack apparatus 100, whereby the mirrored orientation of the first and second aperture sections 301, 302 allow for tight vertical packing of adjacent contains 500 along the longitudinal axis A-A. The phrase "tight vertical packing" refers to a first container 501 being inserted into the first aperture section 301 in a first direction along the transverse axis B-B and a second container 502 inserted into a second aperture section 302 in a second direction along the transverse axis B-B—whereby the first direction is a mirror of the second directions—and the body portion 512 of the first container 501 at least partially overlaps with the body portion 512 of the second container 502 in a direction orthogonal to the longitudinal axis A-A.

In some embodiments, the phrase "tight vertical packing" refers to two first containers 501 being inserted into first aperture sections 301 in the first direction and at least one second container 502 inserted into the second aperture section 302 in the second direction along the transverse axis B-B—whereby the body portion 512 of the second container 502 at least partially overlaps with the body portions 512 of the two first containers 501 in a direction orthogonal to the longitudinal axis A-A. Stated otherwise, each of the first and second containers 501, 502 being supported by the rack apparatus 100 such that the containers 501, 502 extend outward in a direction that is normal to the longitudinal axis A-A, and the neck portion 510 of a first container 501 may be located between two body portions 512 of two stacked second containers 502.

Under this foregoing arrangement, a vertical plane oriented substantially parallel to the longitudinal axis A-A and defined by either lateral major surface 110, 120 may intersect the neck portion 510 alone of a first container 501, and the larger main body portion 512 of an adjacent second container 502 when the container is fully inserted through the mounting aperture 300 in the rack 100 as seen in FIG. 10, or at least the neck portion adjoining the body portion if not fully inserted through the aperture.

As shown in FIGS. 10 and 11, it is important to note that in some case when mounting the containers 500 (e.g. bottles) in the rack 100, the diametrically enlarged top flanges 508 are not required to support and retain the containers in the container mounting apertures 300. If the containers were to become slightly dislodged from the illustrated positions such as by being bumped or during a seismic event, the flanges 508 act as failsafe mechanisms to catch the containers and prevent them from sliding out of the mounting apertures 300 in a lateral direction form either lateral major surfaces 110 or 120.

The vertical distance separating a first aperture section 301 and a second aperture section 302 of the next vertically adjacent mounting aperture 300 along the longitudinal axis A-A may be less than the largest width of the container 500 (i.e. at main portion 512). By emplacing the containers 500 in the rack 100 in opposing and alternating orientation as seen in FIG. 10, this allows tight packing of the containers to maximize the storage capacity of the rack and provide a visually interesting and attractive appearance suitable for public display in a restaurant or similar environment (as wall as for private use in a personal dwelling).

It bears special mention that in some embodiments, only the front aperture wall 314 may include an obliquely angled portion 314a or the upper aperture wall 311 may include the obliquely angled portion 311a. In preferred but non-limiting embodiments, as shown herein with respect to FIGS. 1-11, each mounting aperture includes both obliquely angled wall portions 314a and 311a to maximize convenience of container insertion into the rack 100 for the user.

Referring now to FIGS. 12-22D, a rack apparatus 1100 and corresponding storage system 1001 is illustrated in accordance with another embodiment of the present invention. The storage system 1001 and rack apparatus 1100 is similar to the storage system 101 and rack apparatus 100 except as described herein below. The description of the storage system 1001 and rack apparatus 1100 above generally applies to the storage system 1001 and rack apparatus 1000 described below except with regard to the differences specifically noted below. A similar numbering scheme will be used for the storage system 1000 and rack apparatus 1100 as with the storage system 101 and rack apparatus 100 except that 1,000-series numbers will be used.

According to this embodiment, the apertures 1300 comprise aperture walls 1310 that may include an upper aperture wall 1311 that is opposite a lower aperture wall 1312. The aperture walls 1310 may further comprise at least one aperture side wall 1313 extending between the upper aperture wall 1311 and the lower aperture wall 1312. The upper aperture wall 1311, the lower aperture wall 1312, and the aperture side walls 1313 may form a continuous surface that collectively defines a closed-perimeter boundary of the aperture 1300. Each of the lower aperture wall 1312, upper aperture wall 1311, and/or the aperture side wall 1313 may be independently planar or curved.

According to this embodiment, the distance between the upper aperture wall 1311 and the lower aperture wall 1312 may remain substantially constant along the transverse axis B-B between the first and second major surface 1210, 1220 of the body 1200. According to this embodiment, the distance between the front aperture wall 1314 and the rear aperture wall 1315 may remain substantially constant along the transverse axis B-B between the first and second major surface 1210, 1220 of the body 1200.

Referring now to FIGS. 23-32, a rack apparatus 2100 and corresponding storage system 2001 is illustrated in accordance with another embodiment of the present invention. The storage system 2001 and rack apparatus 2100 is similar to the storage system 101 and rack apparatus 100 except as described herein below. The description of the storage system 2001 and rack apparatus 2100 above generally applies to the storage system 2001 and rack apparatus 2000 described below except with regard to the differences specifically noted below. A similar numbering scheme will be used for the storage system 2000 and rack apparatus 2100 as with the storage system 101 and rack apparatus 100 except that 2,000-series numbers will be used.

According to this embodiment, the apertures 2300 comprise aperture walls 2310 that may include an upper aperture wall 2311 that is opposite a lower aperture wall 2312. The aperture walls 2310 may further comprise at least one aperture side wall 2313 extending between the upper aperture wall 2311 and the lower aperture wall 2312. The upper aperture wall 2311, the lower aperture wall 2312, and the aperture side walls 2313 may form a continuous surface. The continuous surface of this embodiment does not form a closed-perimeter encapsulating the aperture 2300—rather the continuous surface collectively defines a C-shaped channel having an open-end. Each of the lower aperture wall 2312, upper aperture wall 2311, and/or the aperture side wall 2313 may be independently planar or curved.

According to this embodiment, the open-end of the C-shaped channel may be present on one of the side surfaces 2130 of the body 2200 such that each of the upper aperture wall 2311 and the lower aperture wall 2312 intersect the side surface 2130 of the body 2200. The open-end of the C-shaped channel allows for a container 2500 to be inserted into the aperture 2300 along a direction that is substantially orthogonal to both the longitudinal axis A-A and the transverse axis B-B. Specifically, the container 2500 may be inserted into the aperture 2500 be inserting a neck portion 2510 through the open-end on the side surface 2130 in a direction extending from the first vertical side surface 2131 toward the second vertical side surface 2132 of the rack apparatus 3100.

According to this embodiment, the distance between the upper aperture wall 2311 and the lower aperture wall 2312 may remain substantially constant along the transverse axis B-B between the first and second major surface 2210, 2220 of the body 2200. According to this embodiment, the distance between the upper aperture wall 2311 and the lower aperture wall 2312 may be substantially equal to the largest external dimension of the neck portion 2510 of the container 2500. Additionally, according to this embodiment, the distance between the upper aperture wall 2311 and the lower aperture wall 2312 may be smaller than the largest external dimension of the top flange 2508 of the container 2500.

Referring now to FIGS. 33-42, a rack apparatus 3100 and corresponding storage system 3001 is illustrated in accordance with another embodiment of the present invention. The storage system 3001 and rack apparatus 3100 is similar to the storage system 101 and rack apparatus 100 except as described herein below. The description of the storage system 3001 and rack apparatus 3100 above generally applies to the storage system 3001 and rack apparatus 3000 described below except with regard to the differences specifically noted below. A similar numbering scheme will be used for the storage system 3000 and rack apparatus 3100 as with the storage system 101 and rack apparatus 100 except that 3,000-series numbers will be used.

According to this embodiment, the apertures 3300 comprise aperture walls 3310 that may include an upper aperture wall 3311 that is opposite a lower aperture wall 3312. The aperture walls 3310 may further comprise at least one aperture side wall 3313 extending between the upper aperture wall 3311 and the lower aperture wall 3312. The upper aperture wall 3311, the lower aperture wall 3312, and the aperture side walls 3313 may form a continuous surface. The continuous surface of this embodiment does not form a closed-perimeter encapsulating the aperture 3300—rather the continuous surface collectively defines a C-shaped channel having an open-end. Each of the lower aperture wall 3312, upper aperture wall 3311, and/or the aperture side wall 3313 may be independently planar or curved.

According to this embodiment, the open-end of the C-shaped channel may be present on one of the side surfaces 3130 of the body 3200 such that each of the upper aperture wall 3311 and the lower aperture wall 3312 intersect the side surface 3130 of the body 3200. The open-end of the C-shaped channel allows for a container 3500 to be inserted into the aperture 3300 along a direction that is substantially orthogonal to both the longitudinal axis A-A and the transverse axis B-B. Specifically, the container 3500 may be inserted into the aperture 3500 be inserting a neck portion 3510 through the open-end on the side surface 3130 in a direction extending from the first vertical side surface 3131 toward the second vertical side surface 3132 of the rack apparatus 3100.

According to this embodiment, the distance between the upper aperture wall 3311 and the lower aperture wall 3312 may remain substantially constant along the transverse axis B-B between the first and second major surface 3210, 3220 of the body 3200. According to this embodiment, the distance between the upper aperture wall 3311 and the lower aperture wall 3312 may be substantially equal to the largest external dimension of the neck portion 3510 of the container 3500. Additionally, according to this embodiment, the distance between the upper aperture wall 3311 and the lower aperture wall 3312 may be smaller than the largest external dimension of the top flange 3508 of the container 3500.

According to this embodiment, the position of the upper aperture wall 3311 and the lower aperture wall 3312 may vary along the longitudinal axis A-A when moving from the first vertical side surface 3131 toward the second vertical side surface 3132. Specifically, each aperture 3300 may comprise a front portion and a rear portion, whereby the front portion is adjacent to the first vertical side surface 3131 and the rear portion is adjacent to the second vertical side surface 3132. The rear portion may comprise the upper and lower aperture wall 3311, 3312 in a lower vertical position along the longitudinal axis A-A relative to the front portion for a single aperture 3300. The result is the rear portion being dropped below the front portion such that when a neck portion 3510 is inserted into the aperture 3300, the container is held in place both vertically and horizontally in the aperture 3300 by the vertical offset of the rear portion relative to the front portion.

Figure 58:
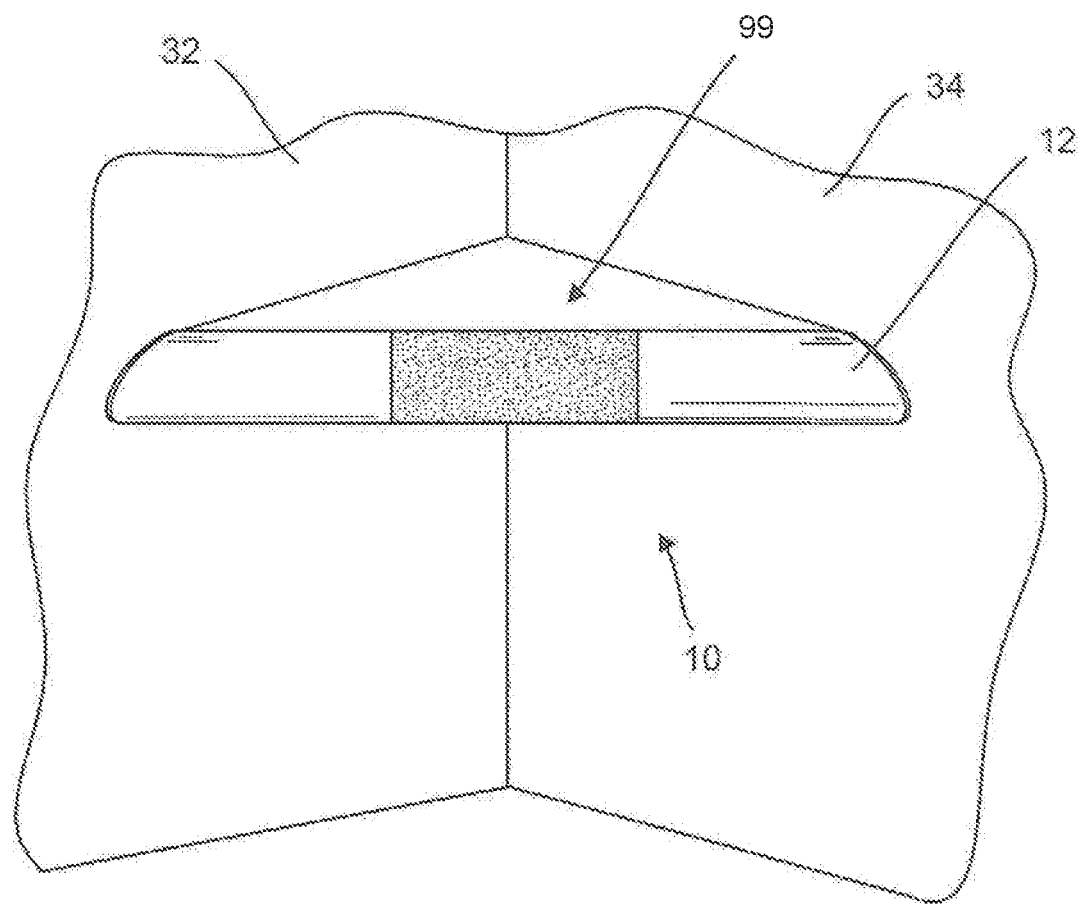
FIG. 58 is a perspective view of the support assembly in an assembled state, fixed to a structure that includes a cantilevered plate.
Figure 59:
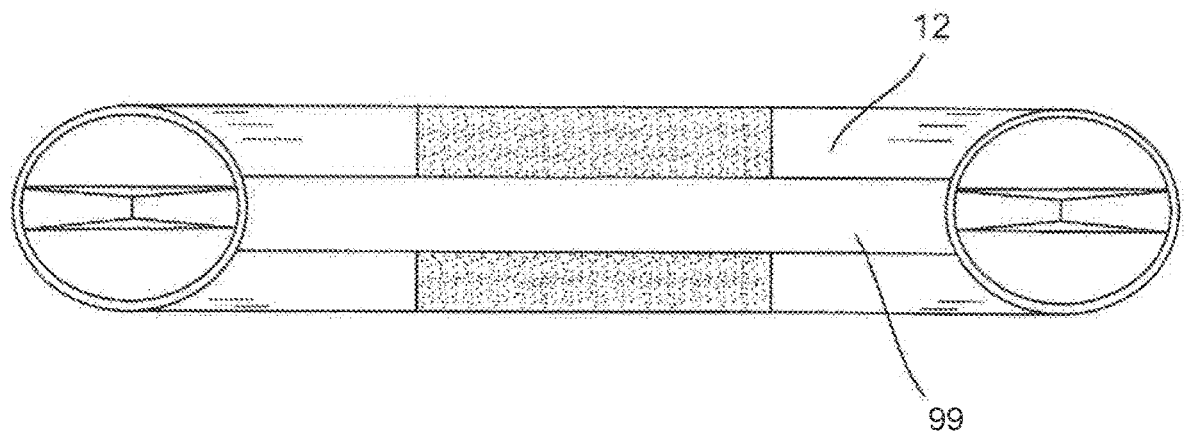
FIG. 59 is a rear view of FIG. 58.
Figure 60:
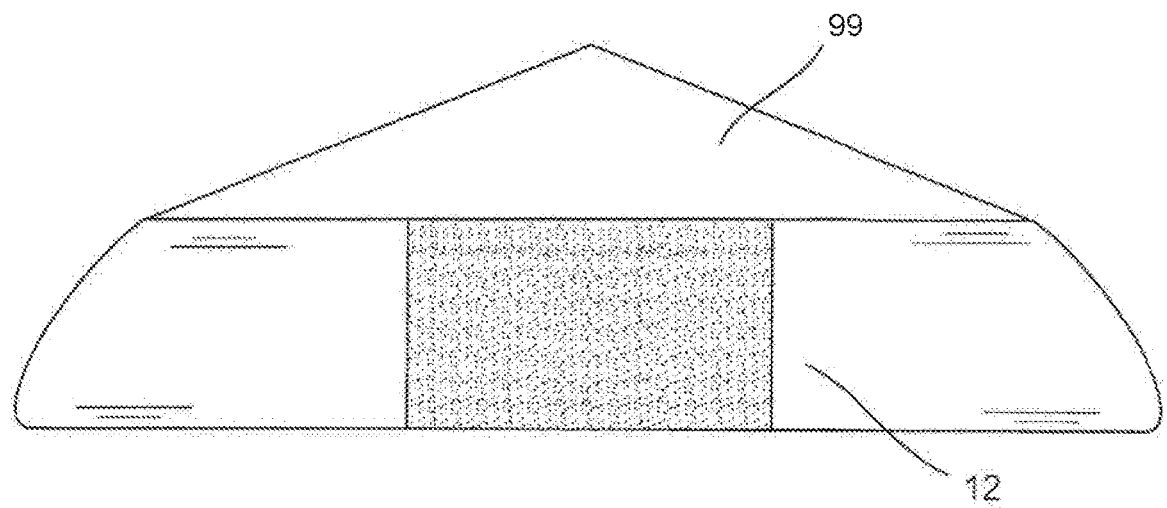
FIG. 60 is a front view of FIG. 58.

FIGS. 43-60 illustrate an embodiment of a support assembly, which is designated hereinafter by reference numeral 10. As will be described in more detail below, in general the support assembly 10 includes a substantially tubular member 12, a first insert 14, a second insert 16, a first end cap 18, a second end cap 20 and a plurality of fasteners 22A, 22B. The support assembly 10 can be used, for example, as a foot rest, a grab bar, a mounting structure in conjunction with bath accessories or as support for any structure (e.g., shelving). Although the support assembly 10 is shown as including a tubular member 12 that is substantially cylindrical, the tubular member 12 can be any supporting body of any shape that extends between at least a first end cap and a second end cap. For example, as shown in an embodiment in FIGS. 58-60, the support assembly includes a shelving support 99 that includes a cantilevered plate attached (e.g., welded) to a tubular member.

As shown in an embodiment in FIGS. 43-57, the tubular member 12 is an elongated hollow cylindrical structure that includes an outer surface 24 and an inner surface 26 and that is delimited between a first end 28 and a second end 30. The first end 28 and the second end 30 of the tubular member 12 are both angled such that a first plane extending along the first end 28 and a second plane extending along the second end 30 converge and intersect each other at a central point between the ends 28, 30 of the tubular member 12. As such, in an embodiment, the first angled end 28 and the second angled end 30 allow for the support assembly 10 to be mounted between two converging surfaces 32, 34 (See FIGS. 56 and 57) that are substantially perpendicular to each other. In an embodiment, the first end 28 and the second end 30 are both angled at approximately about 45 degrees.

As will be explained in more detail below, as shown in FIGS. 43, 44, and 47-50, a first opening 36 extends through the tubular member 12 substantially transverse to and near the first end 28 of the tubular member 12 and a second opening 38 extends through the tubular member 12 substantially transverse to and near the second end 30 of the tubular member 12.

Figure 44:
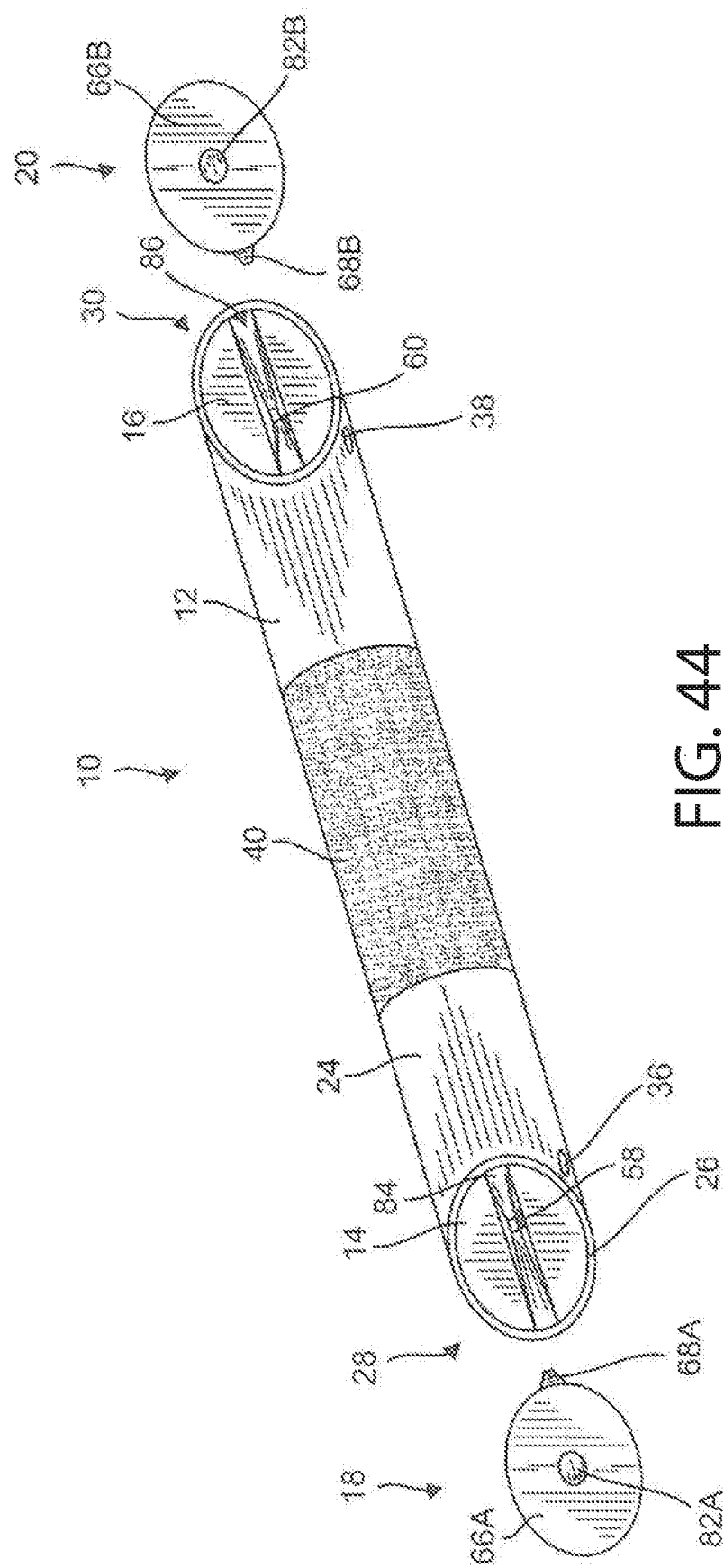
FIG. 44 is a perspective view of the support assembly of FIG. 43 with the end caps in an uninstalled state.
Figure 45:
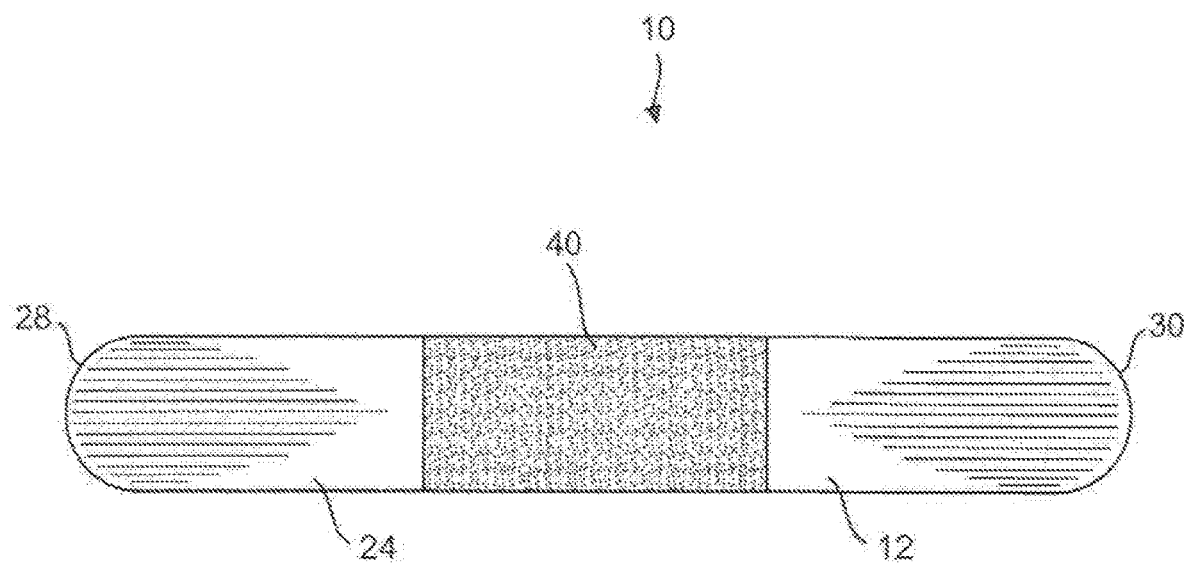
FIG. 45 is a front view of the support assembly of FIG. 43.
Figure 46:
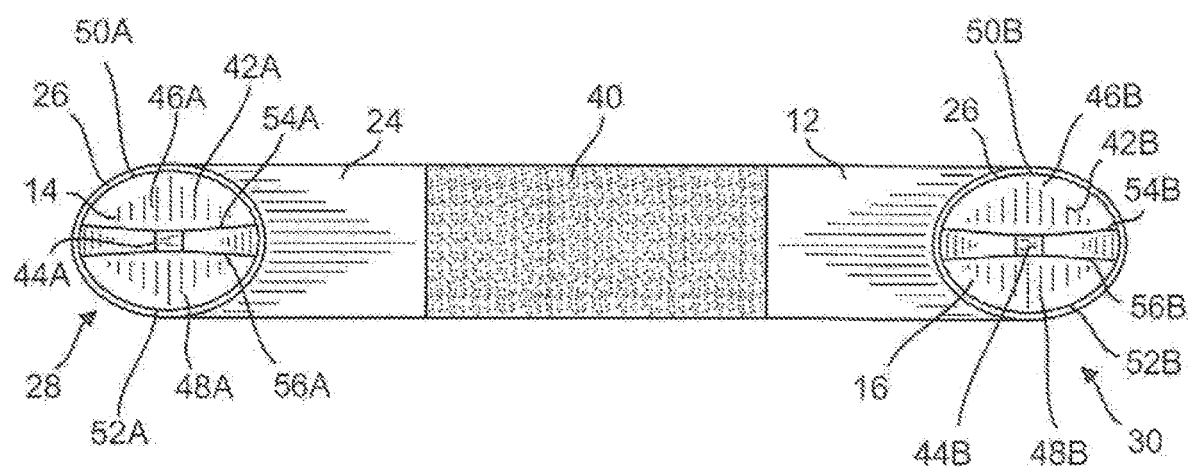
FIG. 46 is a rear view of the support assembly of FIG. 43.
Figure 47:
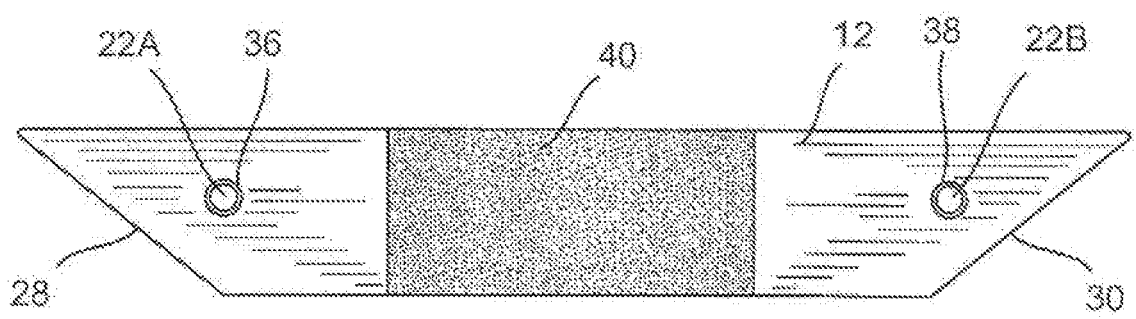
FIG. 47 is a bottom view of the support assembly of FIG. 43.
Figure 48:
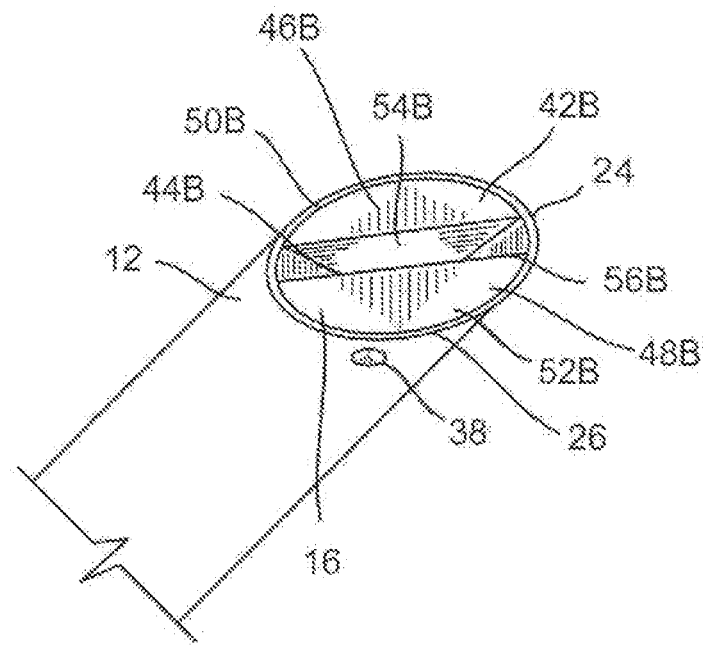
FIG. 48 is a first perspective view of an end of the support assembly of FIG. 43.

As shown in an embodiment in FIG. 44, the first end 28 and the second end 30 of the tubular member 12 are substantially ovoid. In an embodiment, the tubular member 12 is formed from metal such as stainless steel (e.g., 18/8 (304) stainless steel). However, the tubular member 12 can be formed from any material that is known or may become known that allows for sustaining a force to be applied thereto. As can be seen in an embodiment in FIG. 43, an anti-slip grip 40 can extend about at least a portion of the outer surface 24 of the tubular member 12.

As depicted, for example, in FIG. 44, the first insert 14 is fixed within the first end 28 of the tubular member 12 and the second insert 16 is fixed within the second end 30 of the tubular member 12. The first insert 14 and second insert 16 can be fixed within the tubular member by press fit, welding, bonding (e.g. using an adhesive), fastening or the like.

Figure 49:
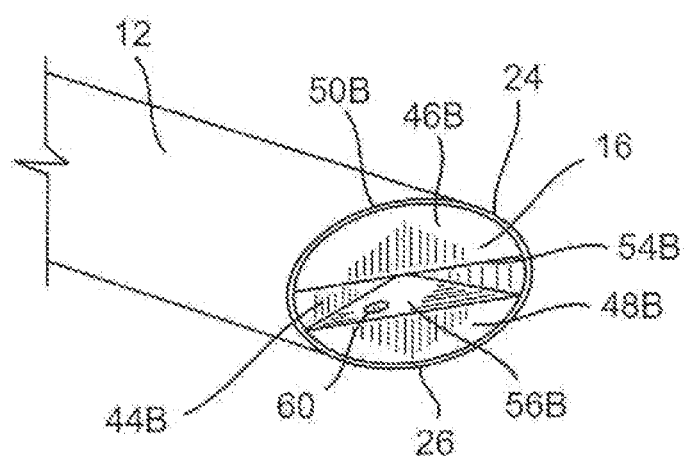
FIG. 49 is a second perspective view of an end of the support assembly of FIG. 43.
Figure 50:
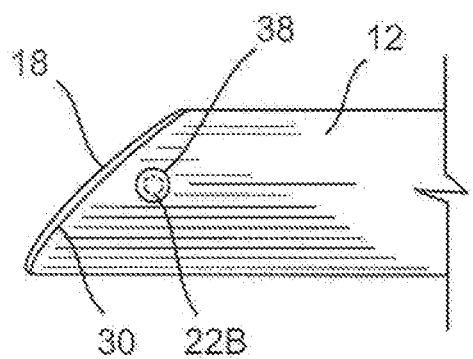
FIG. 50 is a partial bottom view of an end of the support assembly of FIG. 43.
Figure 51A:
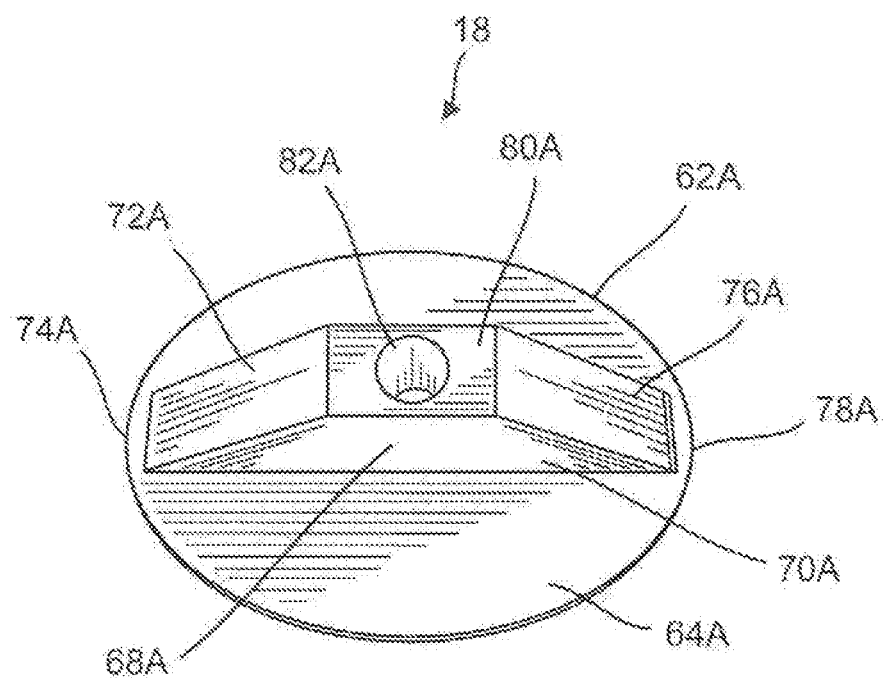
FIG. 51A is a perspective view of a first end cap of the support assembly of FIG. 43.
Figure 51B:
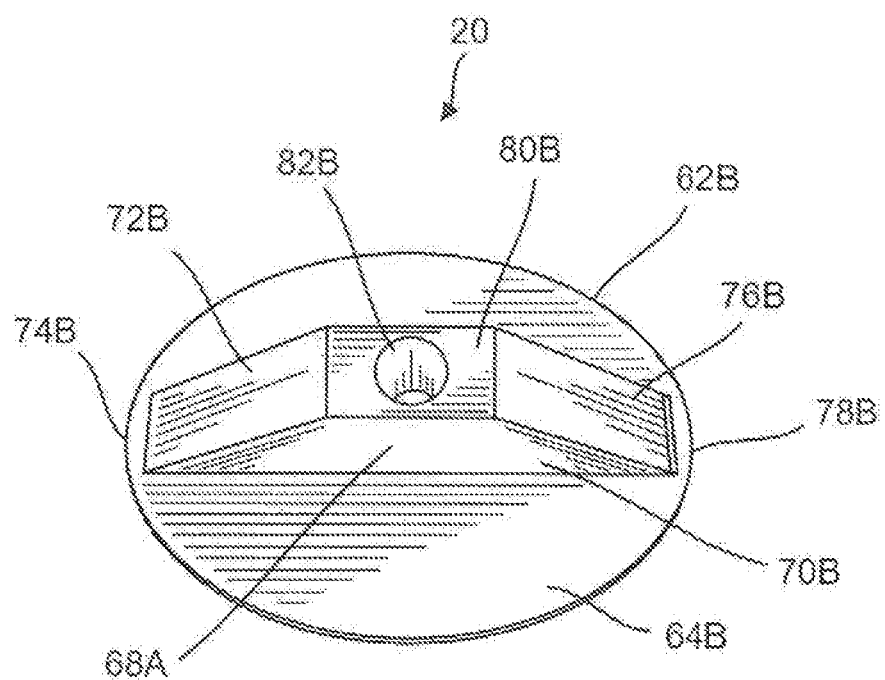
FIG. 51B is a perspective view of a second end cap of the support assembly of FIG. 43.
Figure 52A:
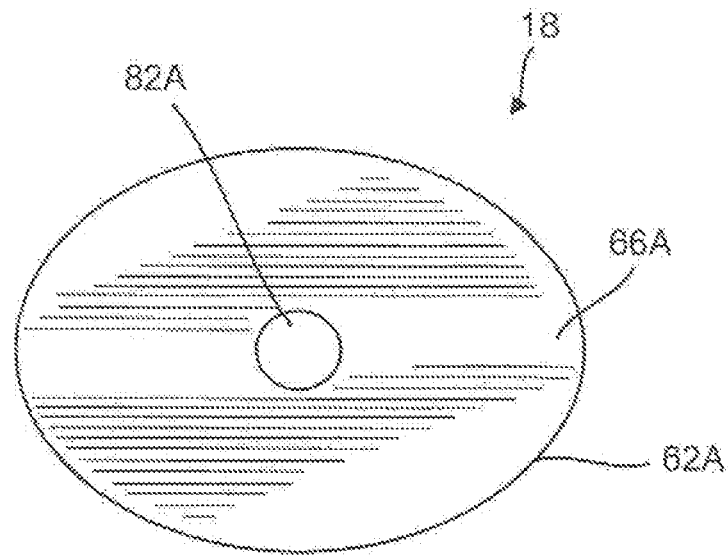
FIG. 52A is a front view of the first end cap of the support assembly of FIG. 43.
Figure 52B:
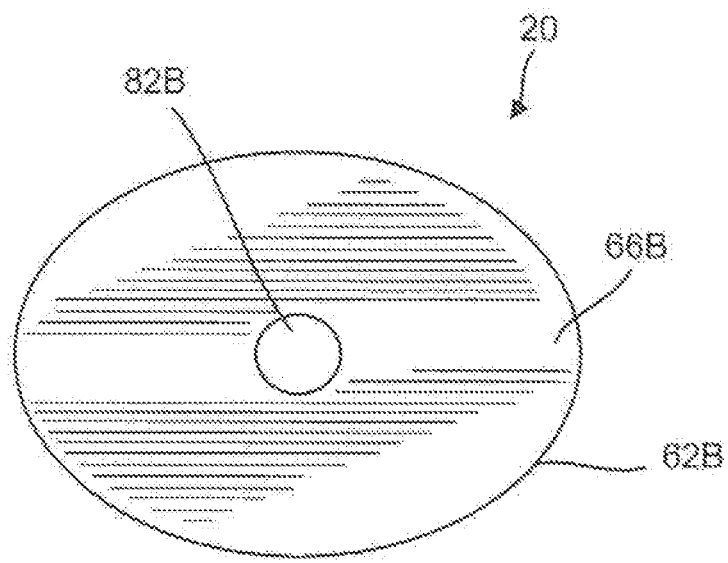
FIG. 52B is a front view of the second end cap of the support assembly of FIG. 43.
Figure 53A:
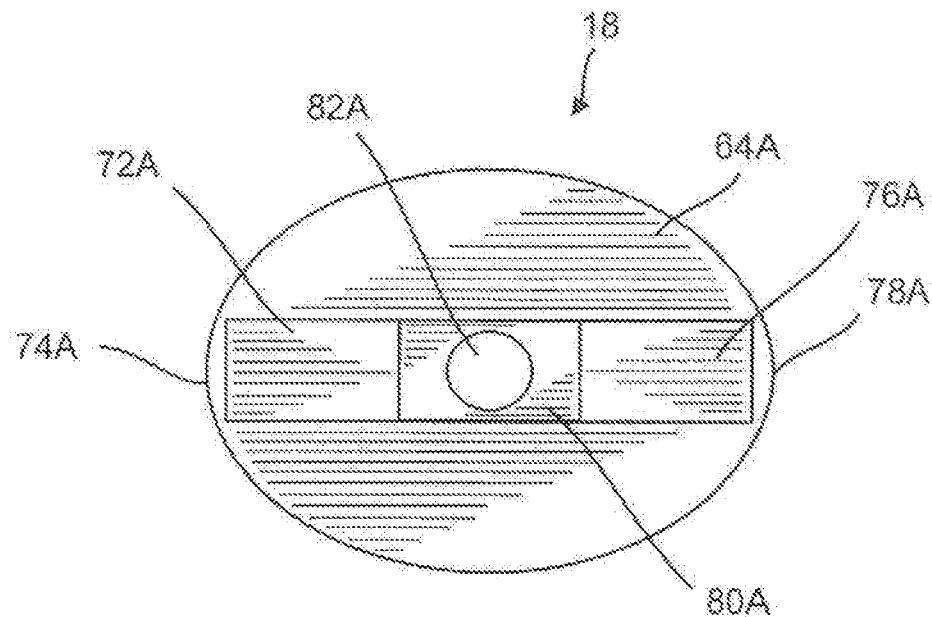
FIG. 53A is a rear view of the first end cap of the support assembly of FIG. 43.
Figure 53B:
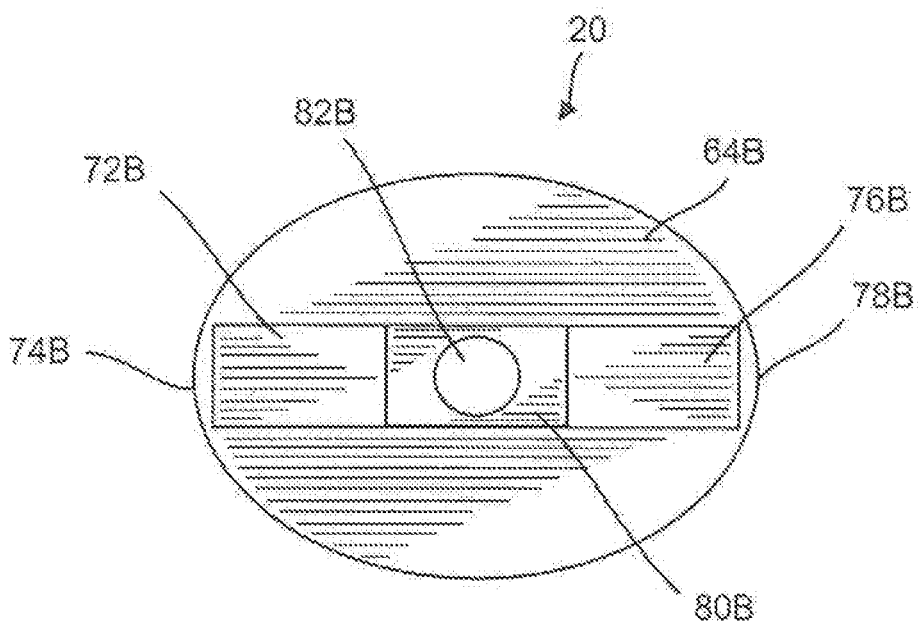
FIG. 53B is a rear view of the second end cap of the support assembly of FIG. 43.
Figure 54A:
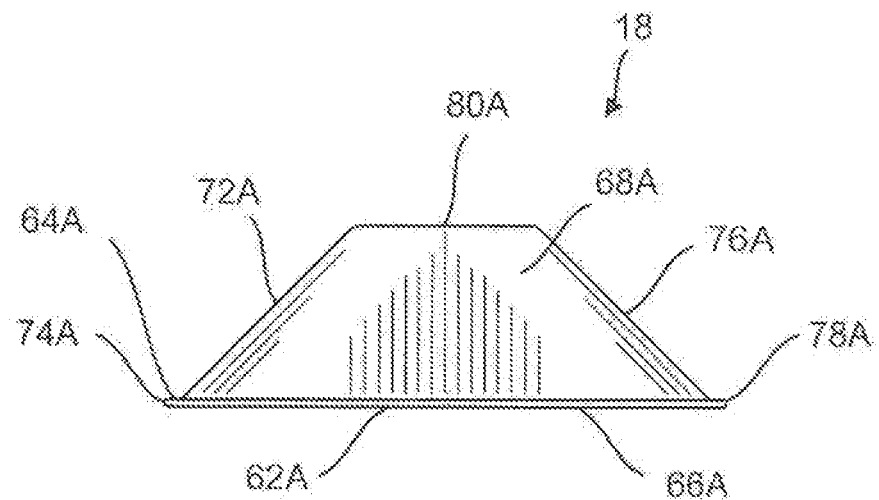
FIG. 54A is a top view of the first end cap of the support assembly of FIG. 43.
Figure 54B:
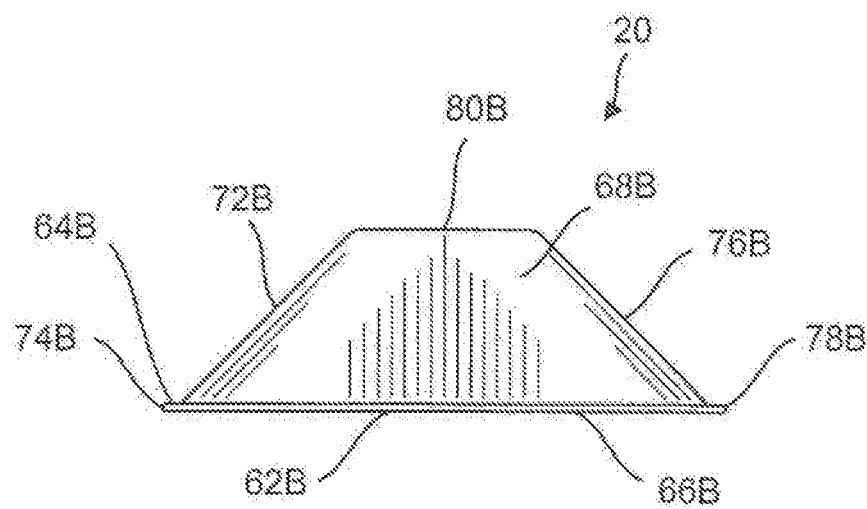
FIG. 54B is a top view of the second end cap of the support assembly of FIG. 43.
Figure 55A:
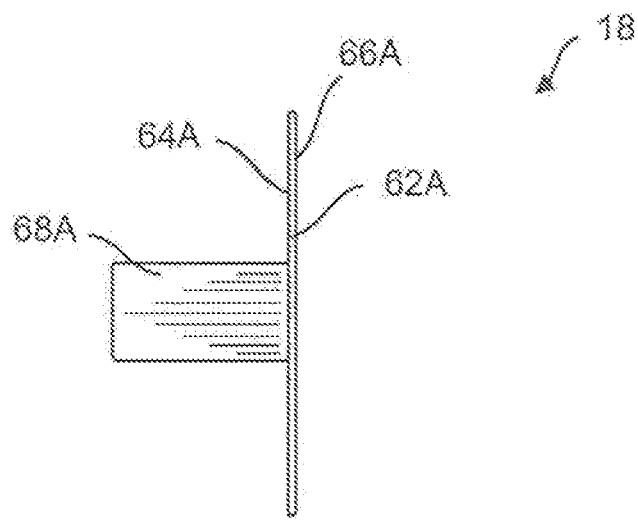
FIG. 55A is a side view of the first end cap of the support assembly of FIG. 43.
Figure 55B:
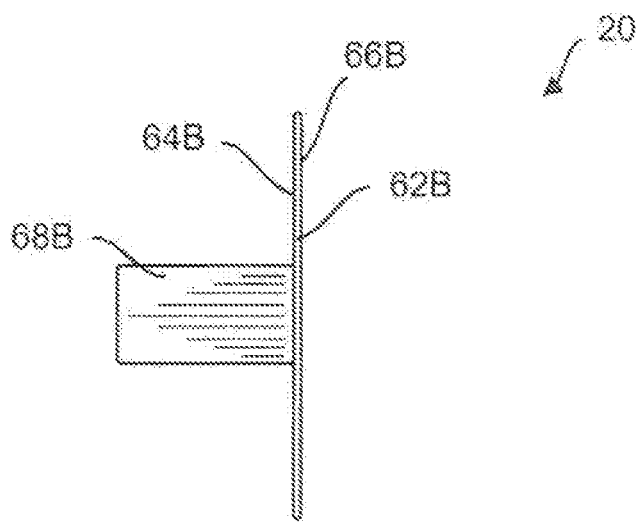
FIG. 55B is a side view of the second end cap of the support assembly of FIG. 43.

In an embodiment, the first insert 14 and the second insert 16, respectively include a body 42A, 42B that has a base 44A, 44B, a first projection 46A, 46B that extends from the base 44A, 44B in a first direction and a second projection 48A, 48B that is spaced from the first projection 46A, 46B and extends from the base 44A. 44B in the first direction as well. Both the first projection 46A, 46B and the second projection 48A, 48B include an outer surface 50A, 50B, 52A, 52B, respectively, that is contoured to be contactable with the inner surface 26 of the tubular member 12 and an inner surface 54A, 54B, 56A, 56B that extends substantially linearly from the base 44A, 44B of the first and second insert 14, 16, respectively. In an embodiment, the outer surfaces 50A, 50B, 52A, 52B of the inserts 14, 16 are substantially ovoid. As can be seen in FIG. 44, the first and second projections 46A, 46B 48A, 48B extend at an angle from the base 44A, 44B that is substantially the same as the angle of the first end 28 of the tubular member 12. As such, the inner surfaces 54A, 54B, 56A, 56B of the projections 46A, 46B, 48A, 48B are substantially triangular. In an embodiment as shown in FIG. 49, the inner surfaces 54A, 54B, 56A, 56B of the first and second projection 46A, 46B, 48A, 48B each form a right triangle. However, the inserts 14, 16 can be configured to be any shape and/or size to accommodate the end caps 18, 20.

As shown in an embodiment in FIG. 44, a first hole 58 extends through one of the first projection 46A and the second projection 48A of the first insert 14 with the first insert 14 adaptable such that the first hole 58 is in alignment with the first opening 36 formed in the tubular member 12. As shown in FIGS. 44 and 49, a second hole 60 extends through one of the first projection 46B and the second projection 48B of the second insert 16, which is adaptable so that the second hole 60 is in alignment with the second opening 38. In an embodiment, the first hole 58 can be formed in both the first projection 46A and the second projection 48A of the first insert 14 and the second hole 60 can be formed in both the first projection 46B and the second projection 48B of the second insert 16.

FIGS. 51-55 illustrate an embodiment the first end cap 18 and the second end cap 20 that are configured to be arranged within the first insert 14 and the second insert 16, respectively, to fix the tubular member 12 to a structure. The first end cap 18 and the second end cap 20, respectively include a body 62A, 62B that has a first surface, 64A, 64B and a second surface 66A, 66B, which opposes the first surface 64A, 64B. As shown in an embodiment in FIGS. 51-53, the body 62A, 62B of the first and second end cap 18, 20, respectively, is substantially ovoid. A trapezoidal element 68A, 68B extends, respectively, from the first surface 64A, 64B of the body 62A, 62B of the end caps 18, 20. In an embodiment, the body 62A, 62B is substantially ovoid. However, the end caps can be of any shape and the elements that extend from the end caps can also be of any shape that substantially matches the opening within the inserts 12, 14.

In an embodiment, the trapezoidal element 68A, 68B includes a first base 70A, 70B that substantially extends along longitudinal diameter from the first surface 64A, 64B of the body 62A, 62B of the end caps 18, 20, a first sidewall 72A, 72B extends at or near a first end 74A, 74B of the first base 70A, 70B at an angle, a second sidewall 76A, 76B extends at or near a second end 78A, 78B of the first base 70A, 70B at an angle and a second base 80A, 80B that is spaced from and substantially parallel to the first base 70A, 70B and that extends between the first sidewall 72A, 72B and the second sidewall 76A 76B. With the trapezoidal element 68A, 68B encompassing the end caps 18, 20 and interacting with the inserts 14, 16, respectively, rotational forces are substantially mitigated.

Figure 56:
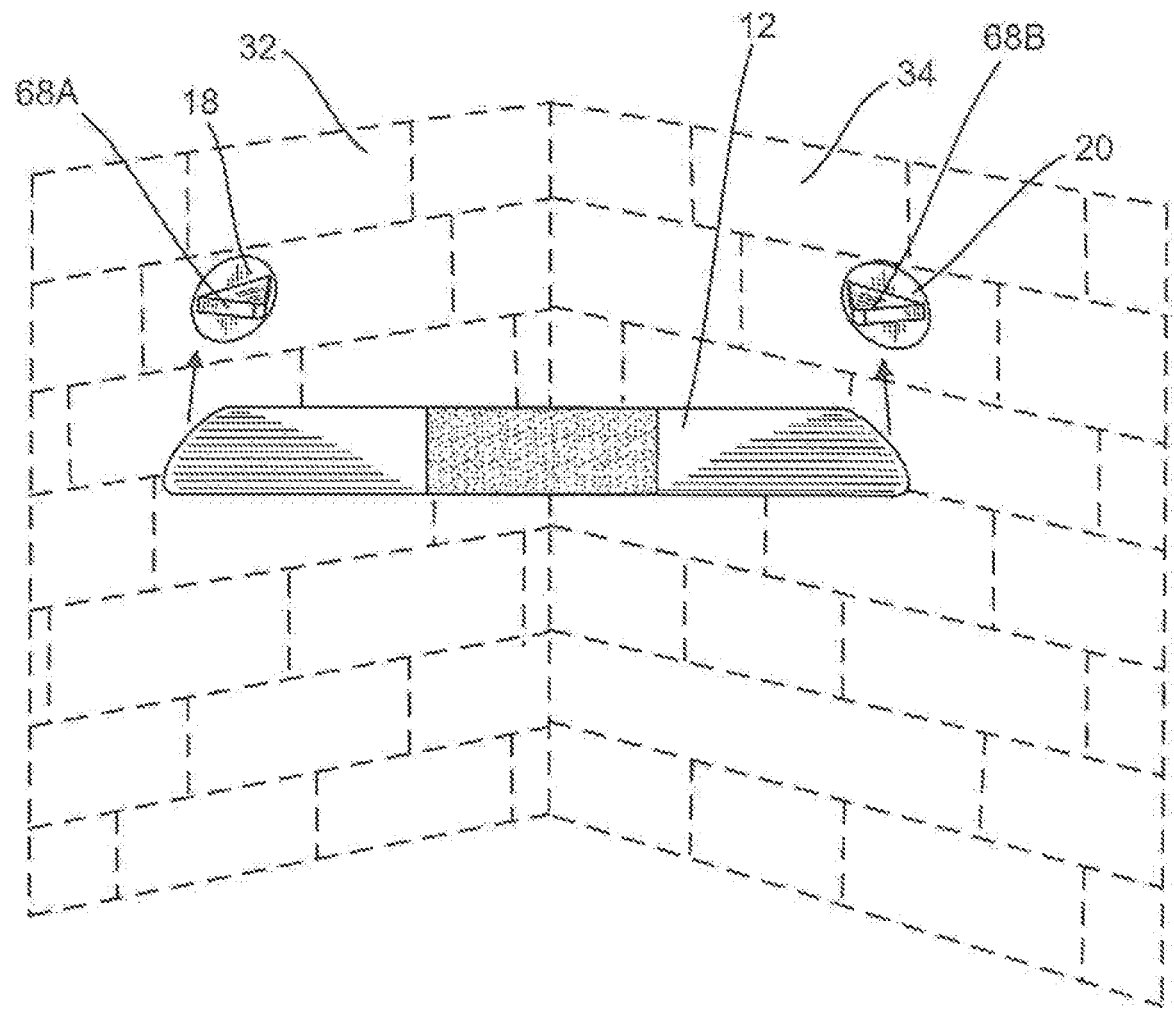
FIG. 56 is an installation view of the end caps and tubular member of the support assembly being fixed to a structure.
Figure 57:
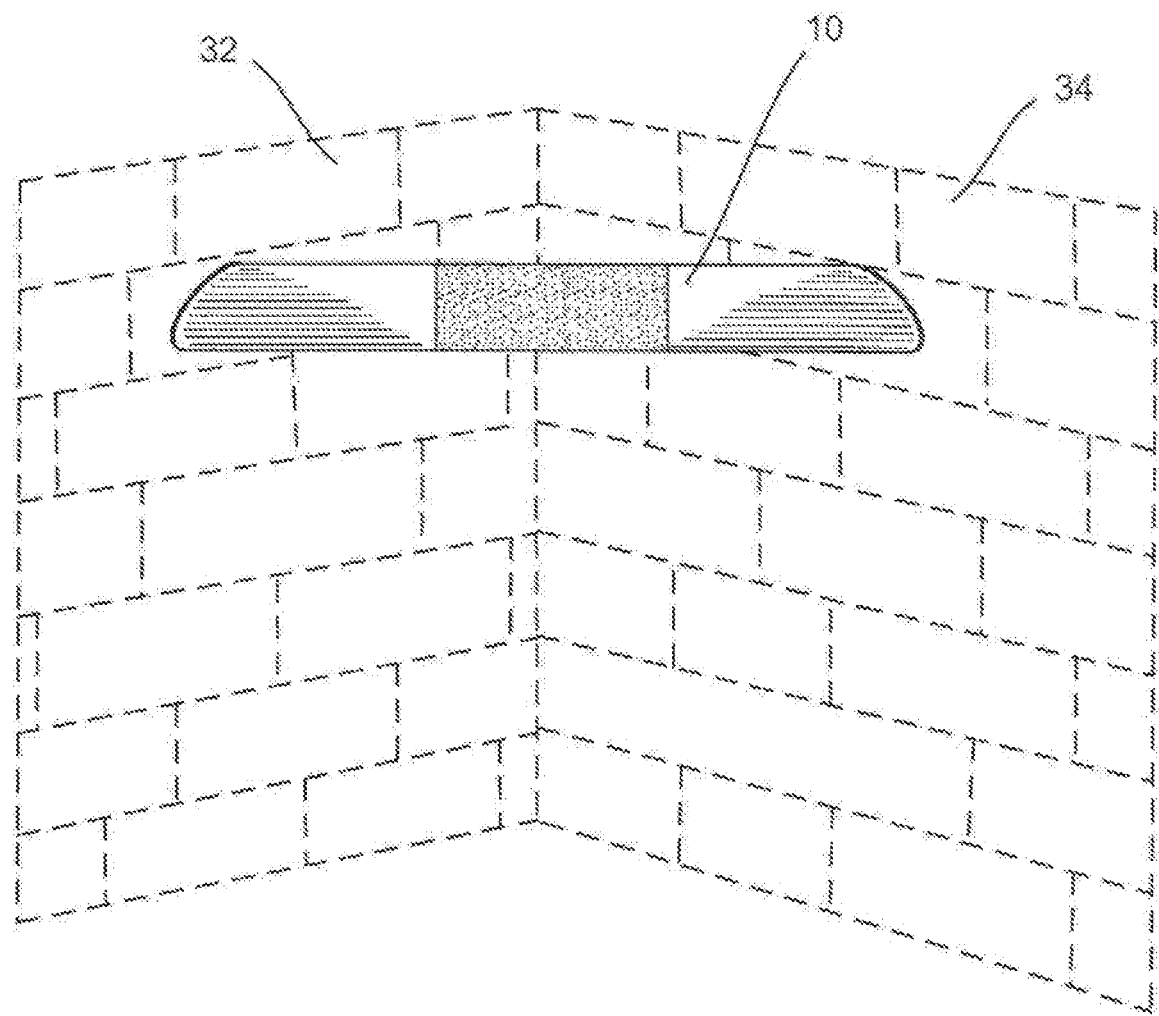
FIG. 57 is a perspective view of the support assembly in an assembled state, fixed to a structure.

In an embodiment, the trapezoidal element 68A, 68B includes an opening 82A, 82B through which a fastener (e.g., a screw) can extend to fix the trapezoidal element 68A, 68B to a structure (see e.g., FIGS. 56 and 57). As can be seen in an embodiment in FIGS. 51-53, the opening 82A, 82B extends centrally from the second surface 66A, 66B of the body 62A, 62B of each of the end caps 18, 20 through the first base 70A, 70B and second base 80A, 80B of the trapezoidal element 68A, 68B. The trapezoidal element 68A, 68B herein allow room for the head of a mounting screw.

As shown in FIG. 56, upon fastening the end caps 18, 20 to a structure, the tubular element 12 can be slide over the trapezoidal elements 68A, 68B, arranging the first trapezoidal element 68A within a slot 84 of the first insert 14 formed between the inner surface 54A, 56A of the first and second projections 46A, 48A and the second trapezoidal element 68B within the slot 86 formed between the inner surface 54B, 56B of the first and second projections 46B, 48B of the second insert 16. A first fastener 22A can be inserted through the first opening 36 in the tubular member 12 and the first hole 58 of the first insert 14 and contact the trapezoidal element 68A to fix the first end cap 18 within the tubular member 12 and a second fastener 22B can be inserted through the second opening 38 in the tubular member 12 and the second hole 60 of the second insert 48 and contact the trapezoidal element 68B to fix the second end cap 20 within the tubular member 12. In an embodiment, the first hole 58 of the first insert 46 and the second hole 60 of the second insert 48 include threading (not shown) extending about each opening 58, 60 and the fastener 22A, 22B is a set screw with threading that fixes the end caps 18, 20 within the inserts 46, 48 and to the tubular member 12.

Because the end caps 18, 20 are not mounted in parallel to each other the rotational axes of the end caps 18, 20 contrast each other and in turn stabilize the tubular element 12. The moment forces only exist in the area of the tubular element 12 that exceeds the axes of the end caps. As such, the moment forces are minimized and the torsion forces are negated by opposing each other resulting in an assembly that is stable and does not rotate upon a force being applied thereto.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. A support assembly comprising:
   a first end cap configured to be coupled to a first support surface;
   a second end cap configured to be coupled to a second support surface that is substantially perpendicular to the first support surface;
   each of the first and second end caps comprising a block element;
   a support member comprising a first end face and a second end face, the first end face lying in a first plane and the second end face lying in a second plane that is substantially perpendicular to the first plane;
   a first slot formed into the first end face of the support member and a second slot formed into the second end face of the support member; and
   wherein the support member is coupled to the first and second end caps so that the block element of the first end cap is positioned within the first slot and the block element of the second end cap is positioned within the second slot to mount the support member to the first and second support surfaces.

2. The support assembly according to claim 1 wherein the support member has a fixed length measured from the first end face to the second end face.

3. The support assembly according to claim 1 wherein the support member comprises a tubular member and a cantilevered plate.

4. The support assembly according to claim 3 wherein the cantilevered plate is triangular shaped.

5. The support assembly according to 1 wherein the block elements of the first and second end caps have a triangular or trapezoidal shape.

6. The support assembly according to claim 5 wherein the first and second slots have a triangular shape.

7. The support assembly according to claim 1 wherein the support member comprises a tubular member having a cylindrical shape.

8. The support assembly according to claim 1 wherein the first end cap comprises a body portion having a front surface and a rear surface opposite the front surface, the block element of the first end cap extending from the front surface of the body portion of the first end cap and the rear surface of the body portion of the first end cap contacting the first support surface, and wherein the second end cap comprises a body portion having a front surface and a rear surface opposite the front surface, the block element of the second end cap extending from the front surface of the body portion of the second end cap and the rear surface of the body portion of the second end cap contacting the second support surface.

9. A support assembly comprising:
a support member extending along a first axis and comprising a first end oriented at a first angle that is oblique to the first axis and a second end oriented at a second angle that is oblique to the first axis;
a first end cap being mountable to a first support surface, the first end cap comprising a first body having a front surface and a rear surface and a first block element extending from the front surface of the first end cap; and
a second end cap being mountable to a second support surface that is substantially perpendicular to the first support surface, the second end cap comprising a second body having a front surface and a rear surface and a second block element extending from the front surface of the second end cap; and
wherein the support member is coupled to the first and second end caps with the first block element of the first end cap disposed within the first end of the support member and the second block element of the second end cap is disposed within the second end of the support member to mount the support member to the first and second support surfaces.

10. The support assembly according to claim 9 wherein the support member has a fixed length measured from the first end to the second end.

11. The support member according to claim 10 wherein the support member has a constant outer diameter.

12. The support assembly according to claim 9 wherein top surfaces of the first and second block elements are planar.

13. The support assembly according to claim 9 wherein first and second sidewalls of the first and second block elements are angled to converge towards one another.

14. The support assembly according to claim 9 wherein each of the first and second block elements has a trapezoidal shape.

15. The support assembly according to claim 9 wherein the first end cap comprises a first opening extending from the rear surface of the first body to a distal end of the first block element through which a first fastener can extend to mount the first end cap to the first support surface, and wherein the second end cap comprises a second opening extending from the rear surface of the second body to a distal end of the second block element through which a second fastener can extend to mount the second end cap to the second support surface.

16. The support assembly according to claim 9 wherein the first and second end cap are configured to be mounted to the first and second support surfaces, respectively, prior to coupling the support member to the first and second end caps.

17. The support assembly according to claim 9 wherein the first and second bodies of the first and second end caps do not extend radially beyond an outer surface of a support structure.

* * * * *